United States Patent
Omotoso et al.

(10) Patent No.: US 11,124,706 B2
(45) Date of Patent: Sep. 21, 2021

(54) TREATMENT OF THICK FINE TAILINGS INCLUDING CHEMICAL IMMOBILIZATION, POLYMER FLOCCULATION AND DEWATERING

(71) Applicant: SUNCOR ENERGY INC., Calgary (CA)

(72) Inventors: Oladipo Omotoso, Calgary (CA); Adrian Revington, Calgary (CA); Marc Goranson, Calgary (CA); Patrick Sean Wells, Calgary (CA); Macoura Kone, Calgary (CA); Daryl Hockley, Vancouver (CA); Baha Elsayed Abulnaga, Abbotsford (CA); John Diep, Burnaby (CA); Benito Moyls, Burnaby (CA); Alan Melanson, Calgary (CA); Rodney Guest, Calgary (CA); Naveen Prathap, Calgary (CA); Babak Derakhshandeh, Burnaby (CA)

(73) Assignee: SUNCOR ENERGY INC., Calgary (CA)

( * ) Notice: Subject to any disclaimer, the term of this patent is extended or adjusted under 35 U.S.C. 154(b) by 153 days.

(21) Appl. No.: 16/079,455

(22) PCT Filed: Feb. 23, 2017

(86) PCT No.: PCT/CA2017/050227
§ 371 (c)(1),
(2) Date: Aug. 23, 2018

(87) PCT Pub. No.: WO2017/143441
PCT Pub. Date: Aug. 31, 2017

(65) Prior Publication Data
US 2019/0152823 A1    May 23, 2019
US 2019/0352207 A2    Nov. 21, 2019

(30) Foreign Application Priority Data
Feb. 24, 2016   (CA) .................................. CA2921835

(51) Int. Cl.
*C10G 1/04*    (2006.01)
*E21B 21/06*    (2006.01)
(Continued)

(52) U.S. Cl.
CPC ............ *C10G 1/045* (2013.01); *B09B 3/0033* (2013.01); *B09C 1/08* (2013.01); *B65G 5/00* (2013.01);
(Continued)

(58) Field of Classification Search
None
See application file for complete search history.

(56) References Cited

U.S. PATENT DOCUMENTS

2009/0020458 A1* 1/2009 Bozak ...................... B03D 1/02
                                                                208/390
2012/0138541 A1* 6/2012 Rennard ................. E21C 41/32
                                                                210/723
(Continued)

FOREIGN PATENT DOCUMENTS

CA    2820660 A1    12/2013
CA    2848257 A1    10/2014
(Continued)

OTHER PUBLICATIONS

Tenenbaum ("Oil Sands Development: A Health Risk Worth Taking", Environmental Health Perspectives, 2009, 117(4), pp. 1-9). (Year: 2009).*

(Continued)

*Primary Examiner* — Clare M Perrin
(74) *Attorney, Agent, or Firm* — BakerHostetler

(57) ABSTRACT

A process for the treatment of thick fine tailings that include constituents of concern (CoCs) and suspended solids is
(Continued)

provided. The process includes subjecting the thick fine tailings to treatments including chemical immobilization of the CoCs, polymer flocculation of the suspended solids, and dewatering. The chemical immobilization can include the addition of compounds enabling the insolubilization of the CoCs. Subjecting the thick fine tailings to chemical immobilization and polymer flocculation can facilitate production of a reclamation-ready material, which can enable disposing of the material as part of a permanent aquatic storage structure (PASS).

75 Claims, 55 Drawing Sheets

(51) Int. Cl.
| | |
|---|---|
| *B65G 5/00* | (2006.01) |
| *F17D 1/08* | (2006.01) |
| *B09C 1/08* | (2006.01) |
| *B09B 3/00* | (2006.01) |
| *C02F 11/148* | (2019.01) |
| *C08F 220/56* | (2006.01) |
| *E02B 8/06* | (2006.01) |
| *C02F 11/14* | (2019.01) |
| *C01F 7/76* | (2006.01) |
| *C01F 11/46* | (2006.01) |
| *C02F 101/10* | (2006.01) |
| *C02F 101/34* | (2006.01) |
| *C08F 220/18* | (2006.01) |
| *C02F 103/10* | (2006.01) |
| *C02F 11/147* | (2019.01) |
| *C02F 11/00* | (2006.01) |

(52) U.S. Cl.
CPC .......... *C02F 11/148* (2019.01); *C08F 220/56* (2013.01); *E21B 21/068* (2013.01); *F17D 1/088* (2013.01); *C01F 7/762* (2013.01); *C01F 11/46* (2013.01); *C02F 11/008* (2013.01); *C02F 11/14* (2013.01); *C02F 2101/103* (2013.01); *C02F 2101/106* (2013.01); *C02F 2101/34* (2013.01); *C02F 2103/10* (2013.01); *C08F 220/18* (2013.01); *C10G 2300/1033* (2013.01); *C10G 2300/208* (2013.01); *E02B 8/06* (2013.01)

(56) References Cited

U.S. PATENT DOCUMENTS

| | | | |
|---|---|---|---|
| 2012/0285893 | A1 | 11/2012 | Moore et al. |
| 2013/0153511 | A1* | 6/2013 | Smits ............... C02F 1/5227 210/731 |
| 2014/0069867 | A1* | 3/2014 | Rennard ............ E21C 41/31 210/650 |
| 2015/0041370 | A1* | 2/2015 | Lin .................. B01D 21/01 208/391 |
| 2017/0267557 | A1* | 9/2017 | Yuan ................. C02F 11/14 |

FOREIGN PATENT DOCUMENTS

| | | |
|---|---|---|
| CN | 103708591 A | 4/2014 |
| WO | 2011097367 A1 | 8/2011 |
| WO | 2013188982 A1 | 12/2013 |
| WO | WO-2013188982 A1 * 12/2013 | ............ B09C 1/08 |
| WO | 2014153431 A1 | 9/2014 |

OTHER PUBLICATIONS

Affinity Chemical "Aluminum Sulfate Composition and Uses", pp. 1-10, accessed online on Sep. 3, 2020 at https://www.affinitychemical.com/aluminum-sulfate-composition-and-uses/). (Year: 2020).*

Haihua Wang, "Overview of Comprehensive Treatment of Oil Sand Tails" Mineralogica Sinica, China, Dec. 11, 2015, pp. 824-825. [with machine-generated translation].

* cited by examiner

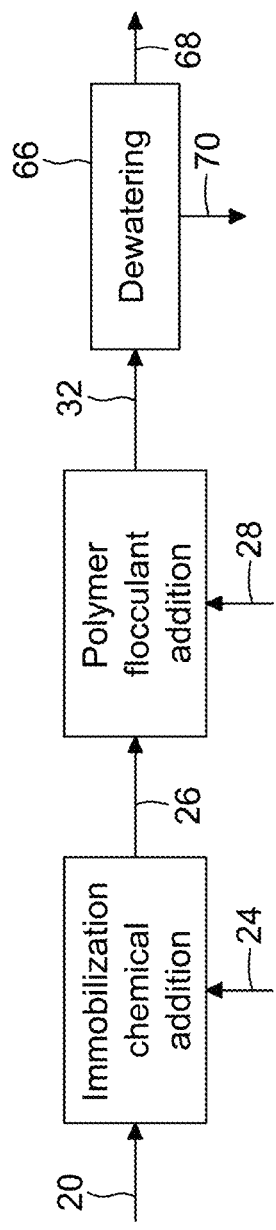
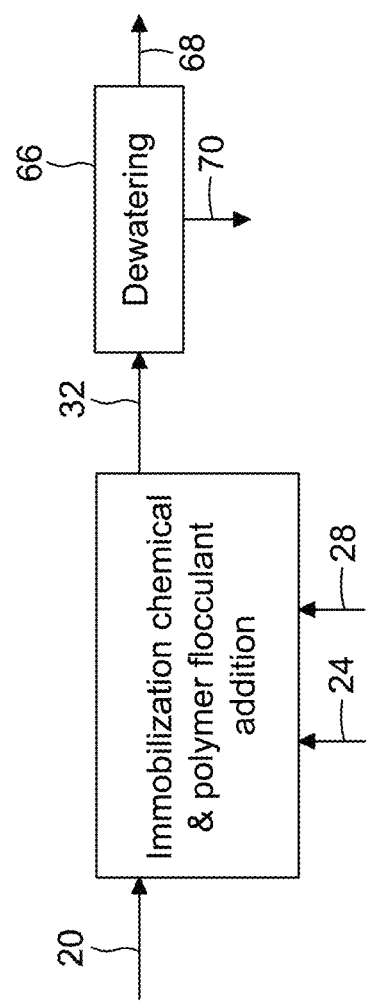
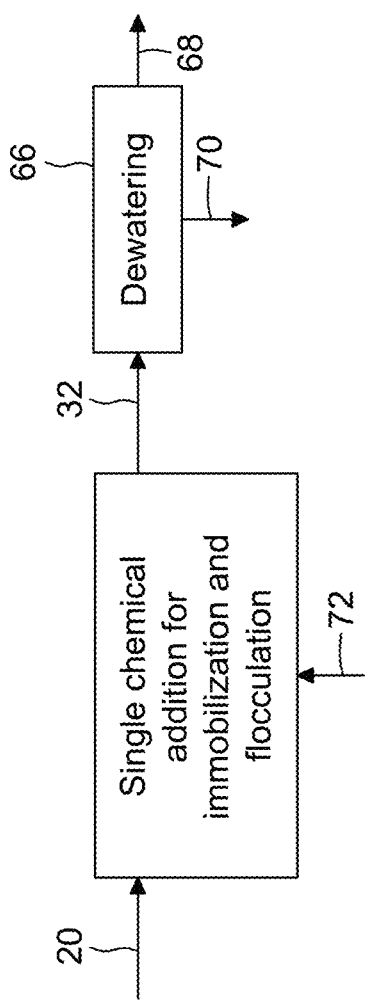
FIG. 2a
FIG. 2b
FIG. 2c

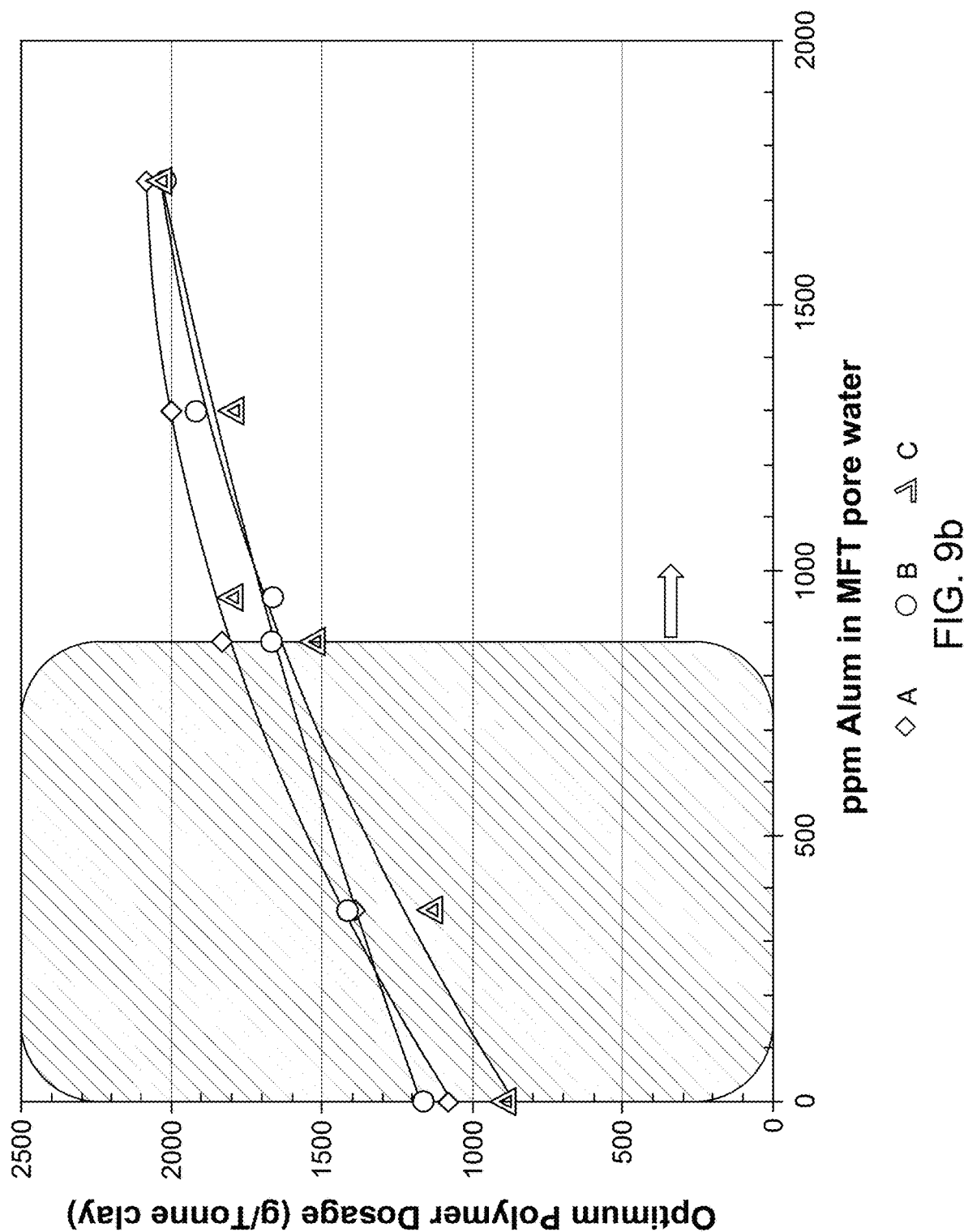

TREATMENT OF THICK FINE TAILINGS INCLUDING CHEMICAL IMMOBILIZATION, POLYMER FLOCCULATION AND DEWATERING

CROSS-REFERENCE TO RELATED APPLICATIONS

This application is a U.S. National Stage of International Patent Application No. PCT/CA2017/050227, filed Feb. 23, 2017, which claims priority to foreign Canadian Patent Application No. CA 2,921,835, filed on Feb. 24, 2016, the disclosures of which are incorporated by reference in their entirety.

TECHNICAL FIELD

The technical field generally relates to the treatment of thick fine tailings derived from mining operations, such as oil sands mining.

BACKGROUND

Tailings derived from mining operations are often placed in dedicated disposal ponds for settling. The settling of fine solids from the water in tailings ponds can be a relatively slow process and can form a stratum of thick fine tailings.

Certain techniques have been developed for dewatering thick fine tailings. Dewatering of thick fine tailings can include contacting with a flocculant and then depositing the flocculated material onto a sub-aerial deposition area where the deposited material can release water and eventually dry. Other techniques for treating thick fine tailings include addition of gypsum and sand to produce consolidating tailings.

In the context of dewatering thick fine tailings, there are a number of challenges related to processing the material to facilitate efficient reclamation.

SUMMARY

Several implementations of processes and systems for treating thick fine tailings, which can be used in the context of forming a permanent aquatic storage structure (PASS), are described herein.

In one implementation, there is provided a process for treating mature fine tailings (MFT) derived from oil sands extraction and including constituents of concern (CoC) comprising bitumen, naphthenic acid, arsenic and selenium. This process includes retrieving MFT from a tailings pond and providing an in-line flow of the MFT. The process further includes adding in-line an aqueous immobilization solution into the in-line flow of MFT and in-line mixing thereof with the MFT, thereby producing a pre-treated tailings flow. The aqueous immobilization solution includes an immobilization chemical selected from multivalent inorganic salts. The pre-treated tailings flow includes immobilized bitumen-clay complexes comprising multivalent cations forming cation bridges between negatively charged bitumen droplets and negatively charged clay particles; insolubilized naphthenic acid; insolubilized arsenic; and insolubilized selenium.

The process further includes adding in-line an aqueous flocculant solution into the pre-treated tailings flow to form a flocculating material; in-line conditioning and transport of the flocculating material to produce a flocculated material in a water release zone; depositing the flocculated material onto a sub-aerial deposition area, allowing release water to separate from a solids-enriched material; and forming a permanent aquatic storage structure (PASS) for retaining the solids-enriched material and a water cap. The forming of the PASS includes forming a consolidating solids-rich lower stratum below the water cap; and retaining the immobilized bitumen-clay complexes, the insolubilized naphthenic acid, the insolubilized arsenic and the insolubilized selenium to inhibit migration of the CoCs into the water cap.

In certain implementations related to in-line addition of an aqueous immobilization solution, the aqueous immobilization solution can be neutral or acidic. In addition, the immobilization chemical can be fully dissolved in the immobilization solution prior to the in-line addition into the in-line flow of MFT. In some implementations, the in-line addition and the in-line mixing of the immobilization chemical into the MFT are performed at concentration and mixing intensity sufficient to substantially inhibit aggregation of multivalent cation hydroxides and promote charge neutralization between the negatively charged bitumen droplets and the negatively charged clay particles. In this regard, it is noted that dosages and mixing can result in the formation of cation hydroxides, although the process and the immobilization effects are not tailored in accordance with such cation hydroxide formation. The process can include the use of dosage and mixing that minimize aggregation of such cation hydroxides such that it generally does not add to the immobilization mechanisms.

The immobilization chemical can include a divalent cation or a trivalent cation. The immobilization chemical can include an aluminum cation, a ferric cation, a calcium cation, or a sulphate anion. Alternatively, immobilization chemical can include or consist of gypsum and/or alum. In certain implementations related to the concentration of the immobilization chemical, the immobilization chemical can be added in a concentration below water saturation thereof. The immobilization chemical can be selected, formulated and/or added in a concentration so as to immobilize substantially all of the bitumen, naphthenic acid, arsenic and selenium present in the MFT, optionally so as to immobilize substantially all of the CoCs present in the MFT and further optionally so as to avoid increasing flocculant dosage more than 20% or more than 10% to achieve a same steady-state deposit clay-to-water ratio (CWR) as an equivalent process excluding addition of an immobilization chemical.

Regarding the process step of in-line addition of the aqueous flocculant solution, the aqueous flocculant solution can include an anionic polymer flocculant, that can be fully dissolved in the aqueous flocculant solution prior to addition to the pre-treated tailings flow. In some implementations, the anionic polymer flocculant includes a sodium-based polymer flocculant or a calcium-based polyacrylamide-polyacrylate co-polymer with high molecular weight.

Regarding the process step of in-line conditioning of the flocculating material, this step can consist of pipeline shearing that is managed to increase a yield strength of the flocculating material to a maximum, and then decrease the yield strength to achieve the water release zone while avoiding overshearing.

Regarding PASS implementations, the process can further include managing the PASS to render the water cap suitable to supporting aquatic life. In some implementations, the managing includes supplying fresh water into the water cap, optionally construction and maintenance of reclamation landforms, optionally comprising shorelines, littoral zones, water inlets and water outlets. The managing can also include monitoring composition of the water cap, and further optionally controlling water levels of the water cap. In addition, the process can include providing an intermediate layer of coke in between the water cap and the solids-rich lower stratum. In other implementations, the deposited solids-enriched material remains in-place after deposition and forms the consolidating solids-rich lower stratum of the PASS. Alternatively, the deposited solids-enriched material is not relocated after deposition.

In another implementation, there is provided a process for treating thick fine tailings that includes CoCs and suspended solids. Optionally, the thick fine tailings include mature fine tailings derived from oil sands extraction. The process includes subjecting the thick fine tailings to chemical immobilization and polymeric flocculation to chemically immobilize the CoCs and polymerically flocculate the suspended solids, to produce treated thick fine tailings; and dewatering the treated thick fine tailings. The dewatering thereby produces an aqueous component depleted in the CoCs and the suspended solids; and a solids-enriched component comprising the chemically immobilized CoCs and the flocculated solids.

Regarding immobilization and flocculation process step, subjecting the thick fine tailings to chemical immobilization and polymeric flocculation can include adding an immobilization chemical to the thick fine tailings to produce a pre-treated tailings; and adding a flocculant into the pre-treated tailings to form a flocculating material. Optionally, the immobilization chemical and the flocculant are added in-line. Further optionally, the immobilization chemical is added as part of an aqueous immobilization solution, and the flocculant is added as part of an aqueous flocculant solution. In some implementations, the chemical immobilization includes insolubilization of dissolved or soluble CoCs, and optionally formation of cation bridges between negatively charged CoCs and negatively charged mineral particles.

Regarding the dewatering process step, the dewatering can include depositing the treated thick fine tailings onto a sloped sub-aerial beach. In some implementations, the dewatering includes depositing the treated thick fine tailings into a pit, such as a mined out pit, which can also be called a mine pit.

In certain implementations of the above process, the latter can further include forming a permanent aquatic storage structure (PASS) for retaining the solids-enriched component. The PASS includes a water cap; and a consolidating solids-rich lower stratum below the water cap and inhibiting migration of the CoCs into the water cap.

In another implementation, there is provided a process for treating thick fine tailings that includes CoCs and suspended solids. The process includes subjecting the thick fine tailings to chemical immobilization to immobilize the CoCs and produce a pre-treated tailings material. The process further includes subjecting the pre-treated tailings material to polymeric flocculation to flocculate the suspended solids and produce a flocculated tailings material; and dewatering the flocculated tailings material. The dewatering thereby produces an aqueous component depleted in the CoCs and the suspended solids; and a solids-enriched component comprising the chemically immobilized CoCs and the flocculated solids.

In another implementation, there is provided a process for treating thick fine tailings that includes CoCs and suspended solids. The process includes subjecting the thick fine tailings to polymeric flocculation to flocculate the suspended solids and produce a flocculated tailings material; and dewatering the flocculated tailings material. The dewatering thereby produces an aqueous component depleted in the suspended solids and including CoCs; and a solids-enriched component comprising the flocculated solids. The process further includes subjecting the aqueous component to chemical immobilization to immobilize the CoCs and produce a contaminant-depleted water stream and a contaminant enriched stream including the immobilized CoCs.

In another implementation, there is provided a process for treating thick fine tailings that includes CoCs and suspended solids. The process includes subjecting the thick fine tailings to polymeric flocculation to flocculate the suspended solids and produce a flocculated tailings material; subjecting the flocculated tailings material to chemical immobilization to immobilize the CoCs; and dewatering the flocculated tailings material. The dewatering produces an aqueous component depleted in the CoCs and the suspended solids; and a solids-enriched component comprising the chemically immobilized CoCs and the flocculated solids.

In another implementation, there is provided a process for treating thick fine tailings that includes CoCs and suspended solids. The process includes simultaneously adding an immobilization chemical and a polymer flocculent into the thick fine tailings, inorder to chemically immobilize the CoCs and polymerically flocculate the suspended solids; and dewatering the thick fine tailings. The dewatering thereby produces an aqueous component depleted in the CoCs and the suspended solids; and a solids-enriched component comprising the chemically immobilized CoCs and the flocculated solids.

In another implementation, there is provided a process for treating thick fine tailings that includes CoCs and suspended solids. The process includes adding a polymeric compound to the thick fine tailings. The polymeric compound includes multivalent cation groups effecting chemical immobilization of the CoCs, and organic polymeric groups effecting the polymeric flocculation of the suspended solids. The process further includes dewatering the thick fine tailings to produce an aqueous component depleted in the CoCs and the suspended solids; and a solids-enriched component comprising the chemically immobilized CoCs and the flocculated solids.

In another implementation, there is provided a process for treating thick fine tailings that includes CoCs comprising surfactants and soluble metal, metalloid and/or non-metal compounds. The process includes adding an immobilization chemical into the thick fine tailings in order to immobilize the CoCs and produce a pre-treated tailings. The pre-treated tailings include insolubilized surfactants; and insolubilized metal, metalloid and/or non-metal compounds. The process further includes adding a flocculant into the pre-treated tailings to flocculate suspended solids and form a flocculating material; conditioning the flocculating material to produce a flocculated material; and dewatering the flocculated material. The dewatering produces an aqueous component depleted in the CoCs and suspended solids; and a solids-enriched component comprising the insolubilized surfactants, the insolubilized metal, metalloid and/or non-metal compounds and the flocculated solids.

In another implementation, there is a process for treating thick fine tailings that includes CoCs comprising hydrocarbons, surfactants and soluble metal, metalloid and/or non-metal compounds. The process includes adding an immobilization chemical into the thick fine tailings in order to immobilize the CoCs and produce a pre-treated tailings. The pre-treated tailings include immobilized hydrocarbon-mineral complexes; insolubilized surfactants; and insolubilized metal, metalloid and/or non-metal compounds. The process further includes adding a flocculant into the pre-treated tailings to flocculate suspended solids and form a flocculating material; conditioning the flocculating material to produce a flocculated material; and dewatering the flocculated material. The dewatering produces an aqueous component depleted in the CoCs and suspended solids; and a solids-enriched component comprising the immobilized hydrocarbon-mineral complexes, the insolubilized surfactants, the insolubilized metal, metalloid and/or non-metal compounds and the flocculated solids.

In another implementation, there is a process treating thick fine tailings that includes CoCs and suspended solids. The process includes adding an aluminum sulphate based compound into the thick fine tailings in order to immobilize the CoCs and produce a pre-treated tailings. The aluminum sulphate based compound is added at sufficient dosage and mixing so that aluminum cations form cation bridges between negatively charged immiscible CoCs and negatively charged clay particles, to produce immobilized complexes; and insolubilize dissolved CoCs to form insolubilized CoCs. The process further includes adding an anionic polyacrylamide based flocculant into the pre-treated tailings to flocculate the suspended solids and form a flocculating material; conditioning the flocculating material to produce a flocculated material; and dewatering the flocculated material. The dewatering produces an aqueous component depleted in the CoCs and suspended solids; and a solids-enriched component comprising the immobilized complexes, the insolubilized CoCs, and the flocculated solids.

In another implementation, there is provided a process treating thick fine tailings that includes CoCs and suspended solids. The process includes adding a calcium sulphate based compound into the thick fine tailings in order to immobilize the CoCs and produce a pre-treated tailings. The calcium sulphate based compound is added at sufficient dosage and mixing so that calcium cations form cation bridges between negatively charged immiscible CoCs and negatively charged clay particles, to produce immobilized complexes; and insolubilize dissolved CoCs to form insolubilized CoCs. The process further includes adding an anionic polyacrylamide based flocculant into the pre-treated tailings to flocculate the suspended solids and form a flocculating material; conditioning the flocculating material to produce a flocculated material; and dewatering the flocculated material. The dewatering produces an aqueous component depleted in the CoCs and suspended solids; and a solids-enriched component comprising the immobilized complexes, the insolubilized CoCs, and the flocculated solids.

In another implementation, there is provided a permanent aquatic storage structure (PASS) for storing thick fine tailings. The PASS includes a containment structure defining side walls and a bottom; a water cap within the containment structure; and a solids-rich lower stratum below the water cap. The solids-rich lower stratum includes polymercially flocculated solids and immobilized CoCs.

Regarding layering of the PASS, the solids-rich lower stratum can be formed from discharging thick fine tailings pre-treated by chemical immobilization and polymer flocculation into the containment structure. Optionally, the solids-rich lower stratum is from a deposited pre-treated material and remains in-place after deposition. In some implementations, the PASS includes an intermediate layer in between the water cap and the solids-rich lower stratum. The intermediate layer can be composed of coarse particulate material, such as coke. The coke can be derived from a bitumen processing operation.

In implementations related to the immobilized CoCs, the immobilized CoCs can include immobilized bitumen-clay complexes, insolubilized CoCs (such as insolubilized surfactants and/or insolubilized naphthenic acids, insolubilized arsenic, insolubilized selenium, and/or insolubilized heavy metals) and can further be selected from divalent and trivalent salts, including alum, gypsum or both.

In implementations related to the water cap, the PASS can include a fresh water line for introducing fresh water into the water cap; and/or a recycle water line for removing recycle water from the water cap. The water cap can have a composition suitable to support aquatic life. Optionally, the PASS includes reclamation landforms selected from shorelines and littoral zones, and/or monitoring systems configured form monitoring a composition of the water cap.

In another implementation, there is provided a system for treating thick fine tailings comprising CoCs and suspended solids. The system includes:
  a tailings supply pipeline for transporting the thick fine tailings;
  an immobilization addition line in fluid communication with the tailings pipeline for adding an immobilization chemical;
  a polymer flocculant injector in fluid communication with the tailings pipeline for injecting a polymer flocculant to produce a flocculation tailings material;
  a tailings conditioning pipeline in fluid communication with the polymer flocculant injector for transporting and conditioning the flocculation tailings material;
  a deposition outlet for receiving flocculation tailings material and depositing the same onto a sub-aerial deposition area; and
  a containment structure including the sub-aerial deposition area and configured to contain the flocculation tailings material and allow formation of a water cap and a solids-rich lower stratum below the water cap, the solids-rich lower stratum comprising polymercially flocculated solids and chemically immobilized CoCs.

In another implementation, there is provided a process for treating fine tailings that include CoCs that are water mobile and suspended solids. The process includes adding an immobilization chemical to react with the CoCs and enable immobilization of the same; and adding a polymer flocculant to flocculate the suspended solids. The process further includes producing a treated tailings material; and dewatering the treated tailings material. The dewatering produces a water component; and a solids-enriched component including the CoCs rendered water immobile and flocculated solids.

In implementations related to immobilization and flocculation, the immobilization chemical can include a divalent cation and/or a trivalent cation, optionally gypsum and/or alum. The immobilization chemical can be selected to immobilize bitumen by cation bridging with suspended clays, to immobilize naphthenic acids, to immobilize arsenic, and/or to immobilize and selenium. The immobilization chemical and the polymer flocculant can be each added in-line, and further optionally each added dissolved in a corresponding aqueous solution. In addition, the flocculant can include an anionic polymer flocculant, such as a sodium-based or a calcium-based polyacrylamide-polyacrylate co-polymer with high molecular weight.

In implementations related to dewatering, the dewatering can include continuously discharging the treated tailings material into a pit to allow an initial water release from the solids-enriched component; and compressing the solids-enriched component below subsequently deposited treated tailings and/or a water cap.

In certain implementations of the above process, the latter can further include forming a permanent aquatic storage structure (PASS), optionally contained in a mine pit, for retaining the solids-enriched component. The PASS includes a water cap; and a consolidating solids-rich lower stratum below the water cap and inhibiting migration of the CoCs into the water cap. The deposited solids-enriched component can remain in-place after deposition and can form the consolidating solids-rich lower stratum of the PASS.

Optionally, the process also includes managing the PASS to render the water cap suitable to supporting aquatic life. The managing can include supplying fresh water into the water cap; construction and maintenance of reclamation landforms; monitoring composition of the water cap; and/or controlling water levels of the water cap.

Regarding handling of the treated tailings material, the treated tailings material can be discharged so that the initial water release results in an initial clay-to-water ratio (CWR) in the solids-enriched component of at least 0.5, 0.6, 0.65, 0.70, 0.75, 0.80, 0.85, 0.90, 0.95 or 1. The treated tailings material can be discharged sub-aerially, and can be discharged to avoid overshearing flocs in the treated tailings material. Optionally, the treated tailings material is deliberately sheared to improve long term water release from the deposit at the expense of the initial water release, and further optionally to reach a target floc size between about 50 μm and about 200 μm to enhance long term water release. Floc size measurements can be made using various devices and techniques, such as a Focused Beam Reflectance Measurement (FBRM) device.

In another implementation, there is provided a process for treating thick fine tailings. The process includes adding an immobilization chemical to the thick fine tailings to form a pre-treated material; and subjecting the pre-treated material to pipeline shear conditioning to form a conditioned pre-treated material. The pipeline shear conditioning is provided such that the conditioned pre-treated material has target rheological characteristics. The process further includes adding a flocculant to the conditioned pre-treated material to produce a flocculated material; and dewatering the flocculated material.

In certain implementations related to shear conditioning, the pipeline shear conditioning of the process can be performed to modify a yield stress of the pre-treated material from an initial yield stress up to an upper crest yield stress, and then down to a lower yield stress that is in between the initial yield stress and the upper crest yield stress, such that the conditioned pre-treated material has the lower yield stress. Optionally, the pipeline shear conditioning is performed so that the lower yield stress represents a reduction in the yield stress of about 30% to 80% from the upper crest yield stress. Further optionally, the pipeline shear conditioning is performed so that the lower yield stress is at least about 25 Pa lower than the upper crest yield stress, or between about 10 Pa and about 15 Pa. The pipeline shear conditioning can also be performed so that the lower yield stress is on a generally flat plateau of yield stress versus time. In addition, the pipeline shear conditioning can be performed to produce a gel-state pre-treated material having increased yield stress; and then produce the conditioned pre-treated material having an ungelled state and a decreased yield stress compared to the gel-state pre-treated material. Optionally, the pipeline shear conditioning is performed such that the conditioned pre-treated material has a turbulent flow regime upon addition of the flocculant thereto. Further optionally, the pipeline shear conditioning is controlled according to shear intensity, shear duration and/or total shear energy imparted to the pre-treated material.

In certain implementations related to immobilization, adding the immobilization chemical to the thick fine tailings can be performed in-line via a pipe junction. The immobilization chemical and the thick fine tailings can be supplied through a static mixer to form the pre-treated material; and the pre-treated material can be supplied through a conditioning pipeline in order to impart all of the pipeline shear conditioning to the pre-treated material prior to addition of the flocculant. Optionally, the immobilization chemical includes alum, gypsum, or ferric sulphate.

In another implementation, there is provided a process for treating thick fine tailings. The process includes adding an acidic solution comprising an immobilization chemical to the thick fine tailings having an initial tailing pH to form a pre-treated material having a reduced pH; and subjecting the pre-treated material to pipeline shear conditioning to form a conditioned pre-treated material. The pipeline shear conditioning is provided such that the conditioned pre-treated material has at least a target pH that is greater than the reduced pH. The process further includes adding a flocculant to the conditioned pre-treated material to produce a flocculated material; and dewatering the flocculated material.

In some implementations of the process, adding the acidic solution to the thick fine tailings is performed in-line via a pipe junction; the immobilization chemical and the thick fine tailings are supplied through a static mixer to form the pre-treated material; the pre-treated material is supplied through a conditioning pipeline in order to impart all of the pipeline shear conditioning to the pre-treated material prior to addition of the flocculant.

In certain implementations related to shearing, the pipeline shear conditioning can be performed such that the target pH is at least 7.5 or at least 8. Optionally, the pipeline shear conditioning is performed such that the target pH is at least 15%, at least 25%, at least 50%, at least 75%, or higher, above a lowest pH obtained for the pre-treated material after addition of the acidic solution. The pipeline shear conditioning can also be performed such that the target pH within 10% of the initial tailings pH. The pipeline shear conditioning can further be performed to achieve the target pH that is based on optimal activity of the flocculant.

In certain implementations related to immobilization, the acidic solution includes sulphuric acid. The immobilization chemical can include alum, gypsum, or ferric sulphate. The immobilization chemical can be completely dissolved in the acidic solution prior to addition to the thick fine tailings.

In another implementation, there is provided a process for treating thick fine tailings. The process includes adding an immobilization chemical to the thick fine tailings and supplying the same to a mixer to form a pre-treated material. The immobilization chemical dosage is determined based on the mixer and density characteristics of the thick fine tailings. The process further includes subjecting the pre-treated material to pipeline shear conditioning to form a conditioned pre-treated material. The process also includes adding a flocculant to the conditioned pre-treated material to produce a flocculated material; and dewatering the flocculated material.

In certain implementations of the above process, the immobilization chemical is added to the thick fine tailings via a pipe junction, optionally a T junction, and the mixer is a static mixer located downstream and proximate to the pipe junction. The density characteristics of the thick fine tailings can be measured on-line prior to adding the immobilization chemical, and on-line density measurements are used to control the immobilization chemical dosage.

In another implementation, there is provided a process for treating thick fine tailings. The process includes adding an immobilization chemical to the thick fine tailings to form a pre-treated material; and subjecting the pre-treated material to shear conditioning to form a conditioned pre-treated material. The process further includes adding a flocculant to the conditioned pre-treated material to produce a flocculating material; and subjecting the flocculating material to shear conditioning to increase floc size up to an upper level and to then break down the flocs and decrease floc size to within a target floc size range, thereby forming a conditioned flocculated material. The process also includes discharging the conditioned flocculated material into a pit to enable settling and consolidation of the flocs and separation of water to form an upper water cap, thereby forming a permanent aquatic storage structure (PASS).

In some implementations of the above process, the target floc size range is pre-determined based on a minimum settling rate and a maximum settled volume within the PASS. Optionally, the target floc size range is between about 50 microns and about 200 microns. Further optionally, the target floc size range is sufficient to provide a minimum settling rate to achieve a clay-to-water ratio (CWR) greater than 0.65 within one year within the PASS; or the target floc size range is tailored to a starting CWR of the thick fine tailings to achieve the CWR greater than 0.65 within one year within the PASS.

In certain implementations related to shearing, subjecting the flocculating material to the shear conditioning can consist of pipeline shear conditioning, optionally pipe shear conditioning the flocculating material in a conditioning pipeline to form the conditioned flocculated material. Discharging of the conditioned flocculated material into the pit can be performed immediately after exiting the conditioning pipeline.

In certain implementations related to conveyance, the process further includes conveying the conditioned flocculated material from the conditioning pipeline to a discharge location. The conveying can be performed via a conveyance pipeline fluidly coupled to a downstream end of the conditioning pipeline. The conveyance pipeline can be located on a sloped side of the pit, and/or can be configured and operated such that the conditioned flocculated material flows therethrough under a non-turbulent flow regime. Alternatively, the conveyance pipeline can be configured and operated such that the conditioned flocculated material flows therethrough under a laminar flow regime. In addition, the conveying can be performed at shear conditions that are sufficiently low to substantially maintain flocs size within the target floc size range.

In another implementation, there is provided a process for treating thick fine tailings. The process includes adding an immobilization chemical to the thick fine tailings to form a pre-treated material; and subjecting the pre-treated material to shear conditioning to form a conditioned pre-treated material. The process also includes adding a flocculant to the conditioned pre-treated material to produce a flocculating material; and subjecting the flocculating material to shear conditioning to form a conditioned flocculated material. The process further includes conveying the conditioned flocculated material to a discharge location under a non-turbulent flow conditions and under shear rate and energy conditions that are lower than those of the shear conditioning used to form the conditioned flocculated material. The process then includes discharging the conditioned flocculated material at the discharge location into a pit to enable settling and consolidation of the flocs and separation of water to form an upper water cap, thereby forming a permanent aquatic storage structure (PASS).

In certain implementations related to shearing, subjecting the flocculating material to shear conditioning is performed in a conditioning pipeline to increase the yield stress of the flocculating material to an upper crest and then decrease the yield stress and enter a water release zone where water releases from flocs.

In certain implementations related to conveyance, the conveying is performed via a conveyance pipeline fluidly coupled to a downstream end of the conditioning pipeline. The conveyance pipeline can be located on a sloped side of the pit; and/or can be configured and operated such that the conditioned flocculated material flows therethrough under a laminar flow regime. The conveying can be performed at shear conditions that are sufficiently low to substantially maintain flocs size unchanged. The conveyance pipeline can have a pipe diameter greater than that of the conditioning pipeline, and can be operated such that a flow rate therethrough is lower than that of the conditioning pipeline. Optionally, the conveyance pipeline comprises multiple conveyance pipe sections arranged in parallel and in fluid communication with the conditioning pipeline. The multiple conveyance pipe sections can supply respective discharge units that are positioned for discharging the conditioning flocculated material at different locations in the pit. Optionally, the process can further include relocating the conveyance pipeline as fluid rises within the pit.

In certain implementations related to immobilization and flocculation, the steps of adding the immobilization chemical to the thick fine tailings, subjecting the pre-treated material to shear conditioning, adding the flocculant to the conditioned pre-treated material, and subjecting the flocculating material to shear conditioning are all performed at locations spaced away from the pit. Alternatively, these same steps can be all performed by equipment that is not relocated.

In another implementation, there is provided a process for treating thick fine tailings. The process includes adding an immobilization chemical to the thick fine tailings to form a pre-treated material, the immobilization chemical comprising a ferric cation; and subjecting the pre-treated material to shear conditioning to form a conditioned pre-treated material. The process also includes adding a flocculant to the conditioned pre-treated material to produce a flocculated material; and discharging the conditioned flocculated material into a pit to enable settling and consolidation of the flocs and separation of water to form an upper water cap, thereby forming a permanent aquatic storage structure (PASS). Optionally, the immobilization chemical includes ferric sulphate.

In another implementation, there is provided a process for treating thick fine tailings that includes constituents of concern (CoCs) and suspended solids. The process includes subjecting the thick fine tailings to chemical immobilization and polymeric flocculation to chemically immobilize the CoCs and polymerically flocculate the suspended solids, to produce treated thick fine tailings. The chemical immobilization includes the addition of ferric sulphate. The process further includes dewatering the treated thick fine tailings to produce an aqueous component depleted in the CoCs and the suspended solids; and a solids-enriched component comprising the chemically immobilized CoCs and the flocculated solids.

In another implementation, there is provided a process for treating mature fine tailings (MFT) derived from oil sands extraction and including constituents of concern (CoCs) comprising bitumen, naphthenic acid, arsenic and selenium. The process includes retrieving MFT from a tailings pond; providing an in-line flow of the MFT; adding in-line an aqueous immobilization solution into the in-line flow of MFT and in-line mixing therewith, thereby producing a pre-treated tailings flow. The aqueous immobilization solution includes an immobilization chemical comprising ferric sulphate. The pre-treated tailings flow includes immobilized bitumen-clay complexes comprising ferric cations forming cation bridges between negatively charged bitumen droplets and negatively charged clay particles; insolubilized naphthenic acid; insolubilized arsenic; and insolubilized selenium. The process further includes adding in-line an aqueous flocculant solution into the pre-treated tailings flow to form a flocculating material; and in-line conditioning of the flocculating material to produce a flocculated material in a water release zone. The process also includes discharging the flocculated material into a pit and allowing release water to separate from a solids-enriched material. The process additionally includes forming a permanent aquatic storage structure (PASS) in the pit for retaining the solids-enriched material and a water cap. The solids-enriched material forms a consolidating solids-rich lower stratum below the water cap; and retains the immobilized bitumen-clay complexes, the insolubilized naphthenic acid, the insolubilized arsenic and the insolubilized selenium to inhibit migration of the CoCs into the water cap.

BRIEF DESCRIPTION OF DRAWINGS

FIGS. 2a to 2e are flow diagrams illustrating optional examples of thick fine tailings dewatering operations.

FIG. 9b is a graph of optimum polymer dosage versus alum concentration for the three aPAMs.

DETAILED DESCRIPTION

Figure 1A:
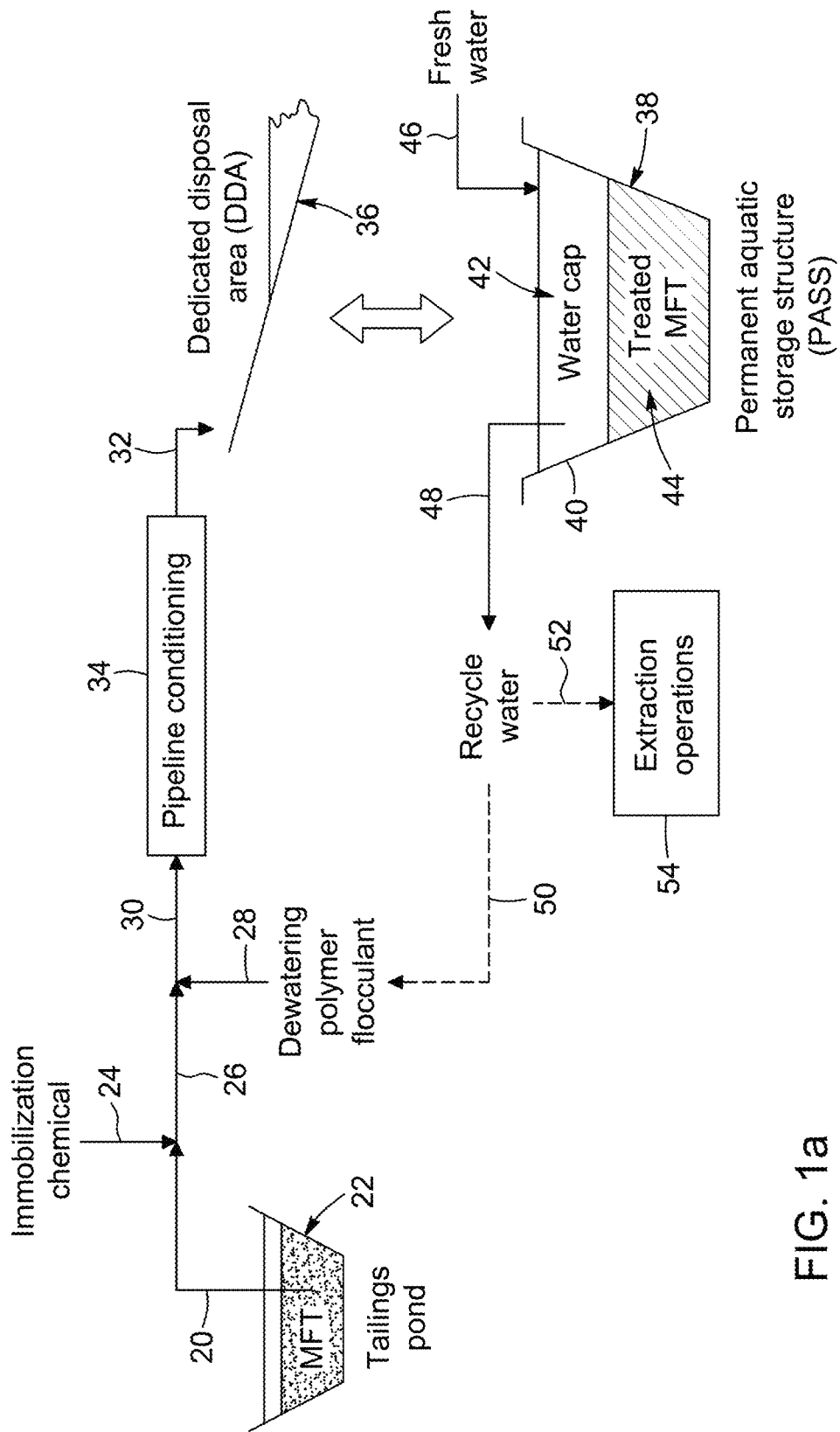
FIG. 1 is a flow diagram of an example thick fine tailings dewatering operation.

The techniques described herein relate to the treatment of thick fine tailings that include constituents of concern (CoCs) and suspended solids. The thick fine tailings can be subjected to treatments including chemical immobilization of the CoCs, polymer flocculation of the suspended solids, and dewatering.

The long-term result of treating the tailings can be a permanent aquatic storage structure (PASS) that includes a water cap suitable for supporting aquatic life and recreational activities. Techniques are described to facilitate the deposition of treated thick fine tailings at a deposition site that over time becomes the PASS. In some implementations, the solids separated from water during the dewatering of the thick fine tailings do not need to be relocated, e.g., from a drying area, as can be the case for other known techniques for dewatering thick fine tailings. Rather, the solids remain in place and form the basis of a sedimentary layer of solids at the bottom of the PASS. Previous techniques for treating tailings are known to use polymer flocculation for dewatering a stream of thick fine tailings. However, the PASS technique additionally provides for treating the thick fine tailings to provide chemical immobilization of CoCs that would otherwise remain in or transfer into the water, such that the water layer that inherently forms over the solid, sedimentary layer has CoCs removed allowing for the water cap to be of such a quality it can support aquatic life. Although the size of a PASS can vary, in some implementations the PASS can contain a volume of 100,000,000 to 300,000,000 cubic metres and can be approximately 100 metres deep at its greatest depth. With a PASS of this scale, flocculated material from the treated thick fine tailings can be directly deposited onto a sub-aerial deposition area that is proximate and/or forms part of the PASS footprint. Within a relatively short period of time following closure of a mine that is feeding treated thick fine tailings into the PASS, e.g., 10 years, reclamation of the tailings is complete. That is, the solids are contained in the base of the PASS and CoCs are immobilized within the solid layer. The water cap is of a quality to support aquatic life and recreational activities.

For example, in the context of oil sands mature fine tailings (MFT) that include CoCs such as dissolved metals, metalloids and/or non-metals, naphthenic acids and bitumen, the chemical immobilization can include the addition of compounds enabling the insolubilization of the metals, metalloids and/or non-metals, as well as naphthenic acids, in addition to chemical bridging of bitumen droplets with suspended clays. The MFT can also be subjected to polymer flocculation, which can include the addition of a polymer flocculant solution followed by pipeline conditioning. The MFT that has been subjected to immobilization and flocculation can then be dewatered. The dewatering can be performed by supplying the flocculated tailings material to a dewatering device and/or a sub-aerial deposition site. While MFT derived from oil sands extraction operations will be discussed and referred to in herein, it should be noted that various other contaminant-containing tailings and slurry streams can be treated using techniques described herein.

It should be noted that the term "constituents" in the expression "constituents-of-concern" (CoC) can be considered to include or correspond to substances that are considered as "contaminants" by certain institutions, regulatory bodies, or other organizations, which can vary by jurisdiction and by evaluation criteria.

In some implementations, subjecting the thick fine tailings to chemical immobilization and polymer flocculation facilitates production of a reclamation-ready material, which can enable disposing of the material as part of a permanent aquatic storage structure (PASS).

Tailings are left over material derived from a mining extraction process. Many different types of tailings can be treated using one or more of the techniques described herein. In some implementations, the techniques described herein can be used for "thick fine tailings", where thick fine tailings mainly include water and fines. The fines are small solid particulates having various sizes up to about 44 microns. The thick fine tailings have a solids content with a fines portion sufficiently high such that the fines tend to remain in suspension in the water and the material has slow consolidation rates. More particularly, the thick fine tailings can have a ratio of coarse particles to the fines that is less than or equal to one. The thick fine tailings have a fines content sufficiently high such that polymer flocculation of the fines and conditioning of the flocculated material can achieve a two-phase material where release water can flow through and away from the flocs. For example, thick fine tailings can have a solids content between 10 wt % and 45 wt %, and a fines content of at least 50 wt % on a total solids basis, giving the material a relatively low sand or coarse solids content. The thick fine tailings can be retrieved from a tailings pond, for example, and can include what is commonly referred to as "mature fine tailings" (MFT).

MFT refers to a tailings fluid that typically forms as a layer in a tailings pond and contains water and an elevated content of fine solids that display relatively slow settling rates. For example, when whole tailings (which include coarse solid material, fine solids, and water) or thin fine tailings (which include a relatively low content of fine solids and a high water content) are supplied to a tailings pond, the tailings separate by gravity into different layers over time. The bottom layer is predominantly coarse material, such as sand, and the top layer is predominantly water. The middle layer is relatively sand depleted, but still has a fair amount of fine solids suspended in the aqueous phase. This middle layer is often referred to as MFT. MFT can be formed from various different types of mine tailings that are derived from the processing of different types of mined ore. While the formation of MFT typically takes a fair amount of time (e.g., between 1 and 3 years under gravity settling conditions in the pond) when derived from certain whole tailings supplied from an extraction operation, it should be noted that MFT and MFT-like materials can be formed more rapidly depending on the composition and post-extraction processing of the tailings, which can include thickening or other separation steps that can remove a certain amount of coarse solids and/or water prior to supplying the processed tailings to the tailings pond.

In one implementation, the thick fine tailings are first subjected to chemical immobilization, followed by polymer flocculation, and then dewatering to produce a solids-enriched tailings material in which CoCs are immobilized. CoCs can sometimes be referred to as contaminants in the sense that the presence of certain constituents can be undesirable for various reasons at certain concentrations, within certain matrices, and/or in certain chemical forms. Various tailings treatments including chemical immobilization, polymer flocculation and dewatering, are described in further detail below.

Chemical Immobilization

Thick fine tailings can include a number of CoCs depending on the nature of the mined ore and processing techniques used to extract valuable compounds from the ore. Thick fine tailings can include dissolved CoCs, dispersed CoCs that are immiscible in water, as well as fine suspended solids.

For example, thick fine tailings derived from oil sands mining can include metals (e.g., heavy metals), polyatomic non-metals (e.g., selenium), metalloids (e.g., arsenic), surfactants (e.g., naphthenic acids), residual bitumen, as well as other CoCs. The CoCs can exist in various forms and as part of various compounds in the tailings material. In order to reclaim the thick fine tailings, the CoCs can be treated so that the eventual landform that includes the treated tailings meets regulatory requirements.

In some implementations, a process for treating thick fine tailings includes immobilization of bitumen; removal of toxicity due to surfactants, metals, non-metals and/or metalloids; and polymer flocculation of the slurry material to reduce hydraulic conductivity of the resultant treated fine tailings landform.

In some implementations, the thick fine tailings can be treated with an immobilization chemical, which can include multivalent cations (e.g., trivalent or divalent). The multivalent cation can be added as part of an inorganic salt. The multivalent salts can be added to the thick fine tailings pre-dissolved in an aqueous solution, which can be acidic or neutral for example. Various multivalent inorganic salts can be used as immobilization chemicals. For example, aluminum sulphate (e.g., in acid solution which can be sulfuric acid), aluminum potassium sulphate, iron sulphate, or chloride or hydrated calcium sulphate (gypsum) can be used for chemical immobilization of certain CoCs. For example, the trivalent cation $Fe^{3+}$ can be added as part of iron (III) sulphate $Fe_2(SO_4)_3$. Addition of ferric sulphate to the thick fine tailings can provide certain advantages, such as lower potential $H_2S$ emissions.

The multivalent cation added to thick fine tailings can perform various functions. One function is that the multivalent cation can form a cation bridge between negatively charged bitumen droplets and negatively charged clay particles in the fine tailings. This bitumen droplet bridging can help immobilize the bitumen within the solids-enriched material that is formed after dewatering of the treated tailings. Chemical bridging of bitumen droplets with clays can decrease the potential for gas bubbles to adsorb onto bitumen and migrate out of the solids-enriched material; or chemical bridging of bitumen droplets with clays can increase the density and viscosity of the bitumen droplet and prevent upward migration in the deposit through buoyancy effects as the deposit densifies. Thus, the bitumen can remain immobilized within the solid material and thus inhibiting its migration into adjacent water regions.

Another function of the multivalent inorganic salt is to insolubilize certain CoCs present in the thick fine tailings. For instance, surfactants, metals, non-metals, metalloids and other compounds can be present in soluble form in the water of the fine tailings material. In thick fine tailings derived from oil sands, surfactants such as naphthenic acids are considered CoCs in terms of water toxicity. In addition, compounds such as selenium and arsenic can also be present and subject to certain regulatory requirements. The addition of the multivalent inorganic salt enables such dissolved CoCs to be precipitated and to remain insolubilized so that the CoCs cannot re-solubilize. Insolubilization decreases the risk of the CoCs migrating out of the solid material or entering the water column.

In some implementations, chemical immobilization is performed with addition of a coagulant that destabilizes particles in the thick fine tailings through double-layer compression and modifies the pore water chemistry. In this sense, the immobilization chemical can include or be a coagulant for coagulating CoCs from the thick fine tailings to form coagulated CoCs. The coagulant can include a multivalent inorganic salt as described above and can include other various conventional coagulant species. Chemical immobilization by addition of the coagulant to the thick fine tailings can be performed before, during or after flocculation as will be further described in relation to FIGS. 2a to 2e, although pre-addition can be a preferred mode of operation in many cases.

Certain chemicals referred to herein can be known as coagulants in the field of water treatment and can therefore can be referred to as "coagulants" in the present application. However, it should be noted that such chemicals are used herein for the purpose of immobilization in PASS techniques rather than mere coagulation as would be understood in the water treatment industry, for example. In this sense, the terms "coagulant" and "immobilization chemical" can be used interchangeably as long as the coagulant performs the function of immobilization as described in the present application. It should still be noted that certain immobilization chemicals described herein can or can not perform the function of coagulation. In some implementations, the so-called coagulant is added to the fine tailings in quantities superior to what is known in the water treatment industry for coagulation, e.g., superior to 350 ppm, which is used for purpose of mere coagulation rather than immobilization. It is noted that in many cases the immobilization chemical that is added will in effect cause some or substantial coagulation. It is also noted that immobilization chemicals that generally do not cause coagulation can be used in conjunction with a separate coagulant chemical that provides coagulation effects.

Immobilization Chemical Addition and Mixing into Thick Fine Tailings

When the immobilization chemical is added upstream prior to flocculation, certain features of the immobilization chemical injection and the subsequent mixing can be provided for enhancing the pre-treatment (e.g., pre-coagulation) prior to flocculation. For example, the immobilization chemical injector, subsequent mixers, as well as pipeline length and diameter leading up to the flocculant injector can be designed and provided to ensure a desired immobilization chemical mixing and coagulation time to facilitate benefits of pre-coagulation. In some scenarios, the immobilization chemical injector can be an in-line addition unit, such as a T or Y pipe junction, and at least one static mixer can be provided downstream of the immobilization chemical injector. It should nevertheless be noted that the immobilization chemical injector can take other forms and have alternative constructions for adding the immobilization chemical. For example, the immobilization chemical injector can be configured for injecting an immobilization chemical solution that includes immobilization chemical species in solution (e.g., in an aqueous acid-containing solution), and can thus be adapted for liquid-phase injection of the immobilization chemical solution into an in-line flow of the thick fine tailings. Alternatively, certain immobilization chemicals can be added in dry form (e.g., powders) and the immobilization chemical addition unit can in such cases be designed for dry addition. The immobilization chemical addition unit can include an in-line dynamic mixer (e.g., paddle mixer type) or other types of mixer units.

In some implementations, immobilization chemical dosage can be determined based on various factors, including properties of the thick fine tailings and the configuration of the immobilization chemical addition unit and subsequent mixer devices that can be present. For example, in some implementations, the immobilization chemical can be added as an immobilization chemical solution by in-line addition into the in-line flow of the thick fine tailings followed immediately by a mixer, such as a static mixer. Immobilization chemical dosage can be determined and provided based on the solids content and/or density of the thick fine tailings as well as the given mixer design (e.g., number and type of static mixers). For example, the mixer effects can be pre-determined in terms of the shear imparted to the immobilization chemical-tailings mixture, which can depend on thick fine tailings properties and other operating parameters, such as flow rate and temperature of the fluid.

Immobilization chemical dosage determination can take various forms. For example, given a particular thick fine tailings density and a given mixer design, a range of effective immobilization chemical dosages can be determined along with an optimal immobilization chemical dose. Such determinations can be based in laboratory experiments (e.g., using batch mixers units, such as stirred vessels) and/or small scale pilot experiments (e.g., small continuous in-line addition and mixing units). In addition, immobilization chemical dispersion targets for dispersing the immobilization chemical upon addition into the thick fine tailings can be determined and used to provide an appropriate pipe length and diameter leading up to the immobilization chemical injector to ensure turbulent flow of the tailings at the immobilization chemical injector. For example, target dispersion shear rates can be tested on laboratory and/or small-scale units, and the pipeline leading to the immobilization chemical injector as well as the operating conditions (e.g., flow rate) for larger scale operations can be determined accordingly. For example, should a certain Reynolds Number (Re) of the thick fine tailings flow be targeted for immobilization chemical addition, the pipeline diameter and flow rate can be provided to ensure a minimum turbulence level based on density and viscosity of the thick fine tailings to be treated. Once the system is operational and the pipeline diameter is fixed, the minimum turbulence level can be achieved by controlling certain operating variables, such as flow rate (e.g., regulated by an upstream pump) and potentially the density and/or viscosity of the thick fine tailings (e.g., regulated by dilution or heating).

In some scenarios, immobilization chemical dosage and dispersion requirements can be determined in part or primarily based on thick fine tailings density and a given mixer design. It should also be noted that other methods can be used to design the system for immobilization chemical addition, dispersion and subsequent transportation to the flocculation step. In some implementations, the flow regime of the thick fine tailings is turbulent at the immobilization chemical addition point and a static mixer is provided just downstream of the immobilization chemical addition point to produce a thoroughly mixed coagulating material (which can also be referred to as a pre-treated material in general as coagulation can or cannot be present), which is then transported via pipeline toward the flocculation step.

Pipeline design, flow rate control and determining properties of the thick fine tailings can be used to achieve a first turbulent flow regime at the immobilization chemical addition point, while mixer design downstream of the immobilization chemical addition point can be used to achieve a second turbulent flow regime at that point in the process. The first and second turbulent flow regimes can have different minimum target thresholds or target ranges.

It should also be noted that a single immobilization chemical addition point or multiple immobilization chemical addition points can be used. Each immobilization chemical addition point can have a subsequent mixer arrangement, and the dosage at each addition point can be determined based on the properties of the incoming tailing stream as well as the downstream mixer design.

Pipelining Pre-Treated Thick Fine Tailings to Flocculation

After addition of the immobilization chemical, a series of kinetics-limiting reactions occurs between the immobilization chemical and components of the thick fine tailings. In some implementations, these reactions result in pH and rheology changes in the coagulating thick fine tailings (which can also be referred to as the pre-treated TFT) during pipeline transportation. It should be noted that the changes in pH and rheology can further affect the subsequent process steps, in particular the flocculation stage. Impacts of the mixing intensity on pH and rheology are further discussed below and also described in the experimentation section.

Figure 23:
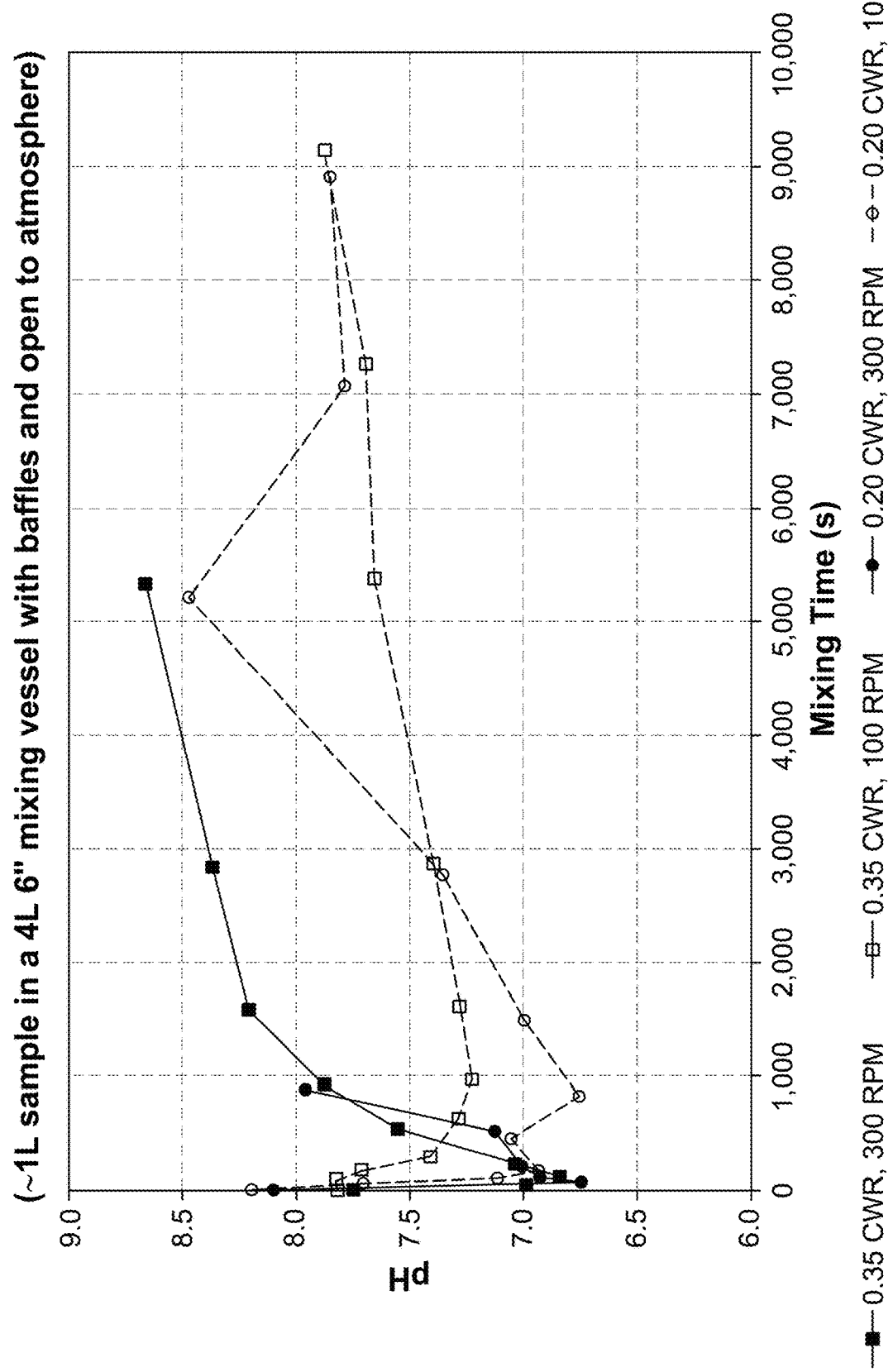
FIG. 23 is a graph of pH versus mixing time for two types of tailings and mixing speed.
Figure 24:
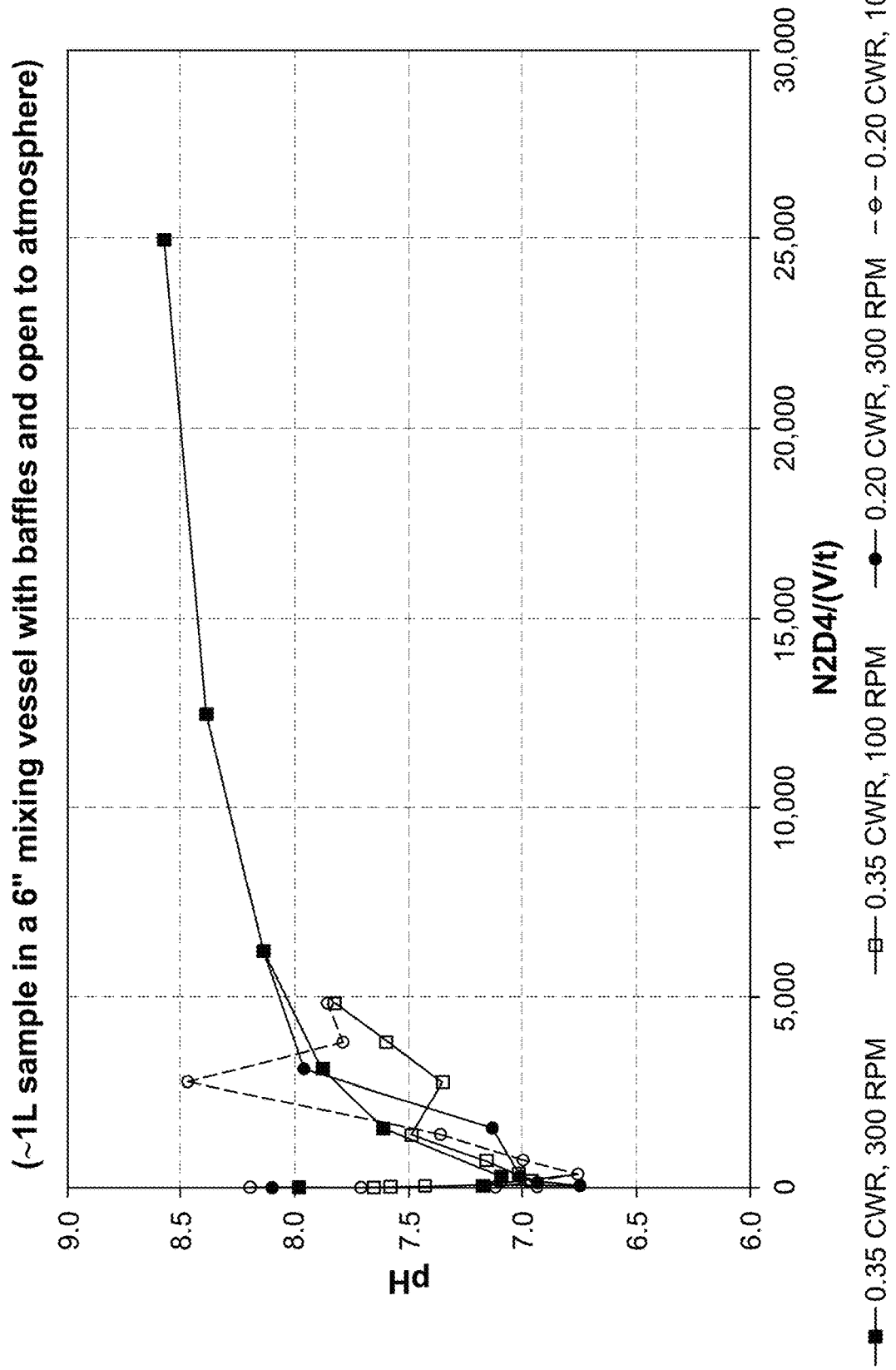
FIG. 24 is a graph of pH versus $K_c$ for two types of tailings and mixing speed.

In terms of pH, when the immobilization chemical is a basic compound that is added as part of an acid-containing solution (e.g., alum in a sulfuric acid solution), the pH of the resulting immobilization chemical-tailings mixture can show an initial decrease followed by an increase as the mixture buffers back to a higher pH. FIGS. 23 and 24 illustrate this pH decrease and subsequent increase. Other tests have shown pH can go down as low as 4.5 or 5 after addition of an immobilization chemical acidic solution.

In some implementations, the pipeline that transports the coagulating material to flocculation can be configured and operated to impart at least a target pipe-mixing level to the coagulating material prior to flocculation. For example, the pipeline can be provided with sufficient length and diameter to impart pipe-shear mixing so that the pH of the material has bounced back to a minimum target value or within a target range. The target pH bounce-back value can be, for example, the initial pH of the thick fine tailings or a desired pH based on optimal activity of the flocculant. In some scenarios, the target pH bounce-back value can be between 7.5 and 8.5. The target pH bounce-back value can also be based on the lowest pH that is obtained, e.g., a pH increase of 5%, 10%, 15%, 20%, 25%, 35%, 45%, 55%, 65%, 75%, 85%, 95% or higher based on the lowest pH value that is obtained from the initial decrease after immobilization chemical addition.

In addition, the pipeline transporting the coagulating material can be configured in terms of mixing intensity and/or total mixing energy imparted to the material. For example, higher mixing intensities can result in a more rapid pH decrease followed by a more rapid pH increase (see FIGS. 23 and 24). Thus, the flow rate and pipeline diameter, which can impact mixing intensity, can be considered in addition to the pipeline length in order to provide the dimensions and conditions to impart adequate mixing energy over an adequate time scale to achieve the target pH bounce back values when the coagulated material reaches the flocculant injector.

Furthermore, properties of the thick fine tailings (e.g., CWR) can also be measured and used to configure the pipeline transporting the coagulating material. As can be seen in FIG. 23, lower CWR can at some mixing intensities result in more rapid pH decrease and bounce-back, notably at the tested 100 RPM mixing intensity where the pH changes for 0.2 CWR were faster compared to 0.35 CWR. Thus, CWR or other properties (e.g., density) of the thick fine tailings can be used to determine desired pipeline configurations and dimensions to achieve target pH bounce back values.

In some implementations, when the coagulating material is subjected to pipeline transportation and pipe-shear based mixing certain rheological changes can occur. For example, pipeline mixing can be performed for a sufficient time and under shear conditions that cause the coagulating material to reach a post gel-stage state, which can reduce polymer flocculant dosage in the subsequent step. More particularly, the pipeline mixing can be conducted to cause the coagulating material to increase in yield strength and reach a generally gel-like state having gel-like properties, and then the pipeline mixing can be continued so that this gel-like material returns to an ungelled state having slurry-like fluid properties. In this manner, the pipeline mixing can be conducted to ensure adequate progression of the coagulation/immobilization reactions between the immobilization chemical and components of the thick fine tailings while avoiding the difficulties that would occur if the flocculant were mixed with a gelled, high yield strength material. In this regard, it should be noted that gel-like materials have higher yield strength and would be more difficult to mix with the flocculant. Therefore, adding the flocculant to the coagulated slurry after the gel-like material has been "broken" and the yield strength has decreased significantly, can facilitate rapid and thorough mixing of the flocculant and reduced flocculant dosage requirements. Imparting sufficient pipeline shear energy to the coagulating material can be done to achieve such a post gel-stage material prior to flocculation. Shear intensity and duration as well as total mixing energy can be assessed in order to provide a pipeline configuration and operating conditions (e.g., pipeline diameter and length, flow rates, etc.) which can also be based on properties of the material (e.g., density, CWR, viscosity, yield strength, etc.).

In some implementations, the pipeline mixing of the coagulating material can also be provided to ensure a turbulent flow regime or a target turbulence level of the coagulated slurry at the flocculant addition point. The coagulating material can thus have different flow regime properties along the pipeline due to its changing properties. The pipeline diameter and length as well as the flow rate can be provided such that the thick fine tailings have turbulent flow regimes at the immobilization chemical addition point and at the flocculant addition point while the flow regime of the coagulating material at certain points in between these two addition points can be non-turbulent or laminar. In order to provide such flow regime properties, a number of factors can be manipulated including flow rates, pipe sizes (length and diameters), immobilization chemical mixer type and operation, immobilization chemical dosage, and incoming thick fine tailings properties (e.g., viscosity or density, which can be manipulated by pre-dilution, for example).

It should be noted that different flow regimes can be used upon injection of the immobilization chemical and/or flocculant depending on the mixing requirements of the corresponding injected chemical at the initial mixing state. Laminar flow regime can be therefore used for initial mixing upon injection of certain chemicals.

In an in-line system, it should be noted that timing of the flocculant injection is related to the distance between the immobilization chemical and flocculant injection points. The distance between those injection points can also be characterized by the mixing of the pre-treated fine tailings between the immobilization chemical and flocculant injection points, in terms of intensity and time. Thus, mixing time and mixing distance can both be used to assess the impact of mixing on the coagulating material and the flocculant addition point. As mentioned above, the immobilization chemical pipeline mixing and the flocculant injection point can be provided such that the flocculant is added once the coagulated material has left a gel-stage and/or experienced pH bounce back. In another example, injecting the polymer flocculant downstream of the immobilization chemical injection point such that pipeline mixing is within a critical mixing range can facilitate enhanced flocculation. Critical mixing ranges can be determined for open-pipe configurations by using various empirical and/or computational methods. In addition, in dynamic paddle mixers it has been found that the optimum polymer flocculant dosage decreases as the critical mixing constant ($K_c$) increases (e.g., ($K_c$) of 20 to 12,000). $K_c$ values determined for batch or in-line stirred tank impeller vessels may be used to help predict critical mixing ranges for in-line open-pipe operations, and Camp Number-based scaling methods can be used.

In some implementations, pre-shearing is performed to enhance uniform shearing within the coagulated tailings before injection of the flocculant. In addition, one or more in-line high-shear static mixer(s) (or other in-line shear devices) can be used to enhance or ensure mixing of the core of the coagulated tailings within the pipe to further reduce the yield stress within the pipe.

Figure 25:
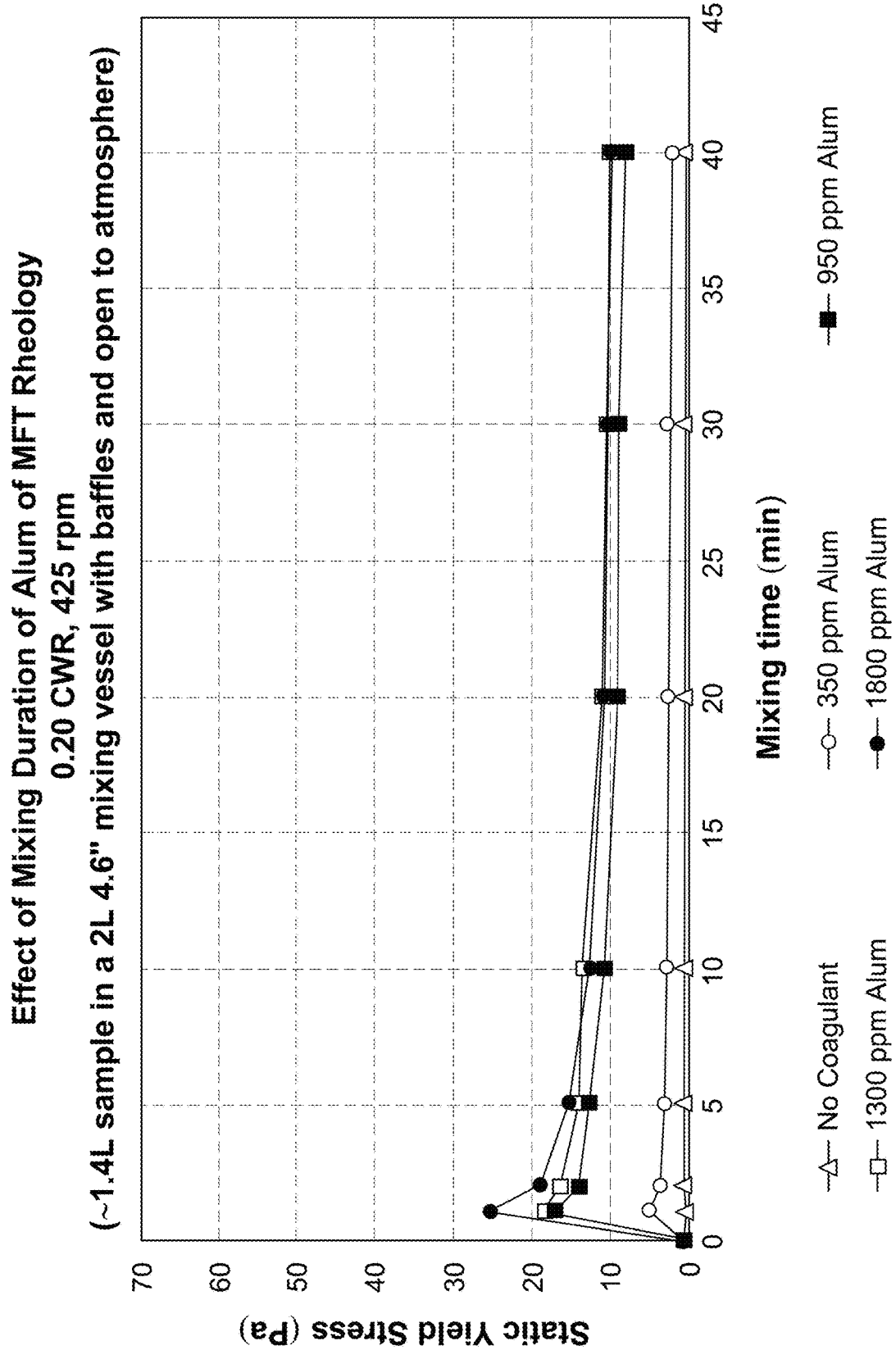
FIG. 25 is a graph of static yield stress versus mixing time for several immobilization chemical dosages in MFT with feed CWR of 0.2 and mixing speed of 425 rpm.
Figure 26:
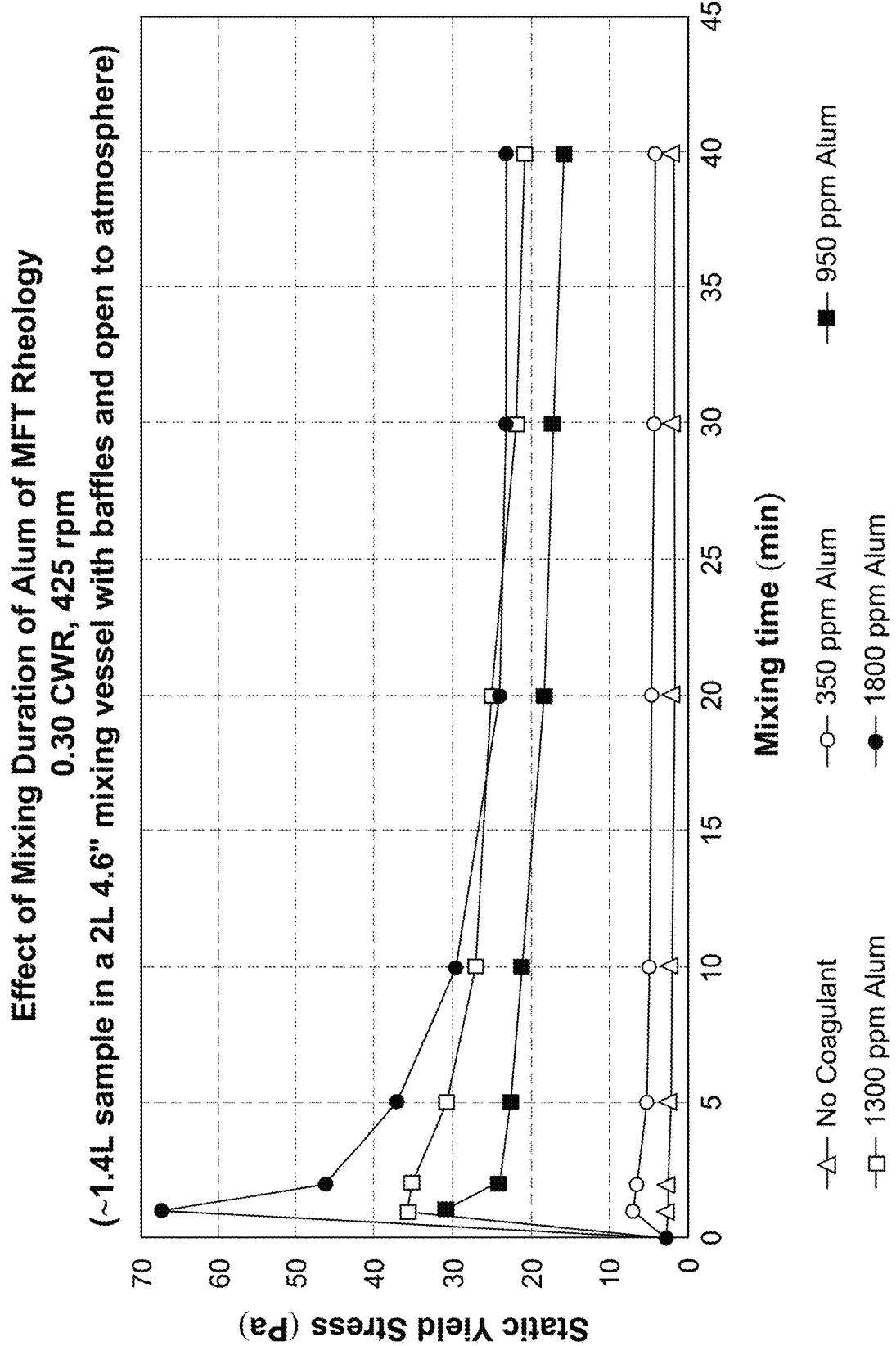
FIG. 26 is a graph of static yield stress versus mixing time for several immobilization chemical dosages in MFT with feed CWR of 0.3 and mixing speed of 425 rpm.

In some implementations, the coagulating material is subjected to sufficient mixing (e.g., pipeline shear mixing) to reach a generally stable yield stress plateau after descending from a crest in terms of its yield stress properties. FIGS. 25 to 28 illustrate example curves of yield stress evolution for mixing of the immobilization chemical-tailings mixture. In some scenarios, the mixing is conducted to reach a target yield stress value or range or to reach a target yield stress reduction based on the maximum or average crest value of yield stress (e.g., 30% to 80%, 40% to 70%, or 50% to 60% reduction of the maximum or average crest value). For example, as shown in FIG. 25, with alum dosage of 1800 ppm the maximum yield stress is about 25 Pa which decreases to a plateau value of about 10 Pa to 12 Pa which represents a reduction of 52% to 60% of the maximum.

It should be noted that certain polymer flocculants can be sensitive to pH and rheology variation. Consequently, both polymer flocculant consumption and deposit performance can be impacted by the polymer flocculant injection location downstream of the immobilization chemical injection location. In some implementations, timing of the flocculant injection can be enhanced based on properties including yield strength and/or pH of the pre-treated thick fine tailings that is subjected to flocculation. Certain enhancement techniques and details related thereto will also be discussed in the experimentation section. It should also be noted that the pipeline transporting the coagulating material can have various arrangements, including a single pipeline composed of a series of pipe sections or a pipeline network that includes a splitter leading into multiple parallel pipelines that can rejoined into a single pipeline prior to flocculation. Such pipeline networks can be configured to increase pipeline shear imparted to the material, and can also be controlled and operated to impart different levels of shear to the material when desired. It is also noted that the pipeline can include one or more shear devices (e.g., static mixer) arranged along its length to impart part of the desired shear to the material, and such shear devices and pipeline can be arranged so that the material can either pass through or bypass the shear devices.

Thus, various pipeline configurations can be provided in order to produce a pre-treated coagulated material that is ready for flocculation. For example, mixing intensity, mixing time, pipeline length and diameter, immobilization chemical dosage, yield stress of the material, and flow rate are relevant interconnected factors that can be managed to produce the pre-treated coagulated material having target pH, yield stress and flow regime characteristics at the flocculation point. For in-line systems that include a simple pipeline from the immobilization chemical mixer to the flocculant injector, pipeline length and diameter can be designed in view of flow rate and tailings properties (notably density) in order to impart pipe shear energy in an intensity and over a time period that enable the target pH, yield stress and flow regime characteristics.

This pipeline can have a single diameter along most or all of its length, or it can have different diameters at particular locations along its length to achieve desired effects at certain locations. For example, the pipeline can include a pipe section proximate the immobilization chemical addition point with a first, relatively small diameter to impart higher shear rates (i.e., higher shear intensity) to cause a sharp pH reduction and/or a sharp yield stress increase at that upstream location. The pipeline can also include a subsequent intermediate pipe section that has a second, larger diameter and a pipe length that provide a desired shear energy and residence time for the coagulating material. This intermediate pipe section can be configured to impart a desired mixing energy and intensity to achieve the desired pH and yield stress characteristics, but is not necessarily concerned in a direct manner with turbulence or flow regime. Next, the pipeline can include a downstream pipe section that feeds into the flocculant injector, and this downstream pipe section can have a third, smaller diameter to ensure turbulence as the material contacts the flocculant. This downstream pipe section could be relatively short in length as it simply has to ramp up the turbulence of the material to a desired level prior to flocculant addition and is not necessarily designed for imparting a given amount of energy for the pH or yield stress evolution. Various other pipeline configurations are also possible for achieving desired pH, yield stress and flow regime characteristics. For example, alternatively, pipe section can be increased to ensure laminar flow.

Flocculation

A polymer flocculant can be added to the fine tailings in order to flocculate suspended solids and facilitate separation of the water from the flocculated solids. The polymer flocculant can be selected for the given type of fine tailings to be treated and also based on other criteria. In the case of oil sands MFT, the polymer flocculant can be a medium charge (e.g., 30%) high molecular weight anionic polymer. The polymer flocculant can be a polyacrylamide-based polymer, such as a polyacrylamide-polyacrylate co-polymer. The polymer flocculant can have various structural and functional features, such as a branched structure, shear-resilience, water-release responsiveness to fast-slow mixing, and so on.

It should be noted that polymer flocculant is not limited to a medium charge, as altering the pH can influence the charge requirements. In some implementations, the polymer flocculant charge is selected in accordance with pH.

In some implementations, the overall flocculation and dewatering operations can include various techniques described in Canadian patent application No. 2,701,317; Canadian patent application No. 2,820,259; Canadian patent application No. 2,820,324; Canadian patent application No. 2,820,660; Canadian patent application No. 2,820,252; Canadian patent application No. 2,820,267; Canadian patent application No. 2,772,053; and/or Canadian patent application No. 2,705,055. Such techniques—including those related to flocculant selection; rapid dispersion; pipeline flocculation and water-release condoning; Camp Number-based design and operation; injector design and operation; sub-aerial deposition and handling; pre-shearing; pre-thinning; and pre-screening—can be used or adapted for use with techniques described herein related to chemical immobilization, polymer flocculation and dewatering. The above documents are incorporated herein by reference. It should also be noted that various techniques described in such documents can be adapted when included with techniques described in the present application, such as chemical immobilization and coagulation as well as post-flocculation handling, discharging and management.

In some implementations, the polymer flocculant is added as part of an aqueous solution. Alternatively, the polymer flocculant can be added as a powder, a dispersion, an emulsion, or an inverse emulsion. Introducing the polymer flocculant as part of a liquid stream can facilitate rapid dispersion and mixing of the flocculant into the thick fine tailings.

In some implementations, the polymer flocculant can be injected into the pre-treated thick fine tailings using a polymer flocculant injector. For example, static injectors and/or dynamic injectors can be used to perform flocculant addition. The injection can be performed in-line, that is, into the pipeline for example. A length of the pipeline downstream of the flocculant injection point can be dedicated to dispersion of the polymer flocculent into the pre-treated thick fine tailings, thereby producing treated thick fine tailings that is ready for conditioning and eventual dewatering.

As mentioned further above, the incoming pre-treated thick fine tailings that has been subjected to coagulation can arrive at the flocculant injector with certain pH, yield stress, and flow regime characteristics that facilitate flocculant dispersion, mixing and reaction with suspended solids.

Immediately after flocculant injection (e.g., via a co-annular injector where flocculant inlets are spaced away from the pipe side wall and are distributed around an annular ring through which the pre-treated tailings flow), there can be a dispersion pipe section that receives the flocculating material and imparts pipe shear energy to the material. The dispersion pipe length as well as polymer flocculant dosage can be provided based on various factors, which can include the density and/or clay content of the thick fine tailings as well as the flocculant injector design. In some scenarios, for a given injector design and density of the thick fine tailings, optimum ranges of polymer flocculant dosage and dispersion pipe length can be determined, particularly when the target pH, yield stress, and flow regime characteristics have been provided. More regarding process modelling will be discussed in further detail in the experimentation section below.

Pipeline Conditioning and Transport after Flocculation

In some implementations, the process includes pipeline conditioning of the treated thick fine tailings after flocculant addition and dispersion. The pipeline conditioning can notably be adapted to the type of dewatering, deposition and disposal that will be conducted (e.g., ex situ dewatering devices, sub-aerial deposition in thin lifts, or discharging into a pit to form a permanent aquatic storage structure (PASS), as will be discussed in greater detail below). For dewatering by sub-aerial deposition in thin lifts, the pipeline conditioning can be conducted to increase the yield stress of the flocculated material to a crest or maximum where the material presents gel-like characteristics, and then reduce the yield stress and effect floc breakdown to form a flocculated material in a water release zone yet still having relatively large flocs. For dewatering within a PASS, the pipeline conditioning can be modified such that the floc breakdown reduces the flocs to smaller sizes that provide settling time and settled volume characteristics for formation of the PASS. The floc size for thin lift dewatering can be provided to promote rapid initial water release a separation from the flocculated solids, while the floc size for the PASS implementation can be provided to promote both fast settling time and small settled volumes. For example, the target floc size for dewatering by sub-aerial deposition in thin lifts can be greater than about 100 μm, about 150 μm, about 200 μm, or about 250 μm; while the target floc size for dewatering via the PASS implementation can be between about 50 μm and about 200 μm, between about 50 μm and about 150 μm, or between about 75 μm and about 125 μm. The target floc size can be treated as an average floc size for process control and measurement. The floc size for the PASS implementation can be provided in order to balance competing effects of settling speed and settled volumes, which will depend on the starting CWR of the thick fine tailings, in order to achieve a CWR of at least 0.65 within one year after discharge into the PASS containment structure. The target floc size depends on polymer dosage of the thick fine tailings, regardless of the starting CWR. For example, with a starting CWR of about 0.1, the target floc size can be provided to achieve above 80% volume reduction within one year of discharge, whereas with a starting CWR of about 0.4, the target floc size can be provided to achieve above 32% volume reduction within one year of discharge.

Floc size reduction can be achieved by subjecting the treated thick fine tailings to pipeline shear sufficient to break down larger flocs to form smaller flocs while avoiding over-shearing the material where the flocs would be substantially broken down and the material would generally return to its initial slow settling characteristics. The pipeline shear can include high shear rates and/or sufficiently small pipe diameters in the conditioning section. The conditioning pipeline can be configured and implemented based on pre-determined target values for shear rates and total shear energy to impart to the material, based for example on empirical and/or modelling information. It should also be noted that the system can include monitoring equipment for measuring the approximate floc size (e.g., in-line, at-line or off-line) so that the conditioning pipeline can be adapted and/or regulated based on the measured floc size to provide the shear necessary to be within a target floc size range.

In some implementations, the conditioning pipeline terminates at a discharge point where the treated thick fine tailings are supplied to the dewatering device or site. In alternative implementations, the conditioning pipeline feeds into a conveyance pipeline that transports the treated thick fine tailings to the discharge location under reduced shear conditions. The conditioning and conveyance pipelines can be configured together to provide a target total shear energy to the material prior to deposition as well as high initial shear (i.e., in the conditioning pipeline) followed by lower shear (i.e., in the conveyance pipeline).

In some implementations, the total shear energy imparted to the treated thick fine tailings prior to discharge is sufficiently high to reach the target floc breakdown and yet within a range to facilitate water clarity and settling characteristics within the PASS. For example, it was found that, at optimum polymer dosage an average shear rate within 150 $s^{-1}$ for 30 minutes could be imparted after flocculant addition to coagulated thick fine tailings. Based on this value, a conditioning and conveyance pipelines can be designed and implemented to operate within this envelope. More regarding conveyance will be discussed below.

Water separation from the flocs within the PASS can include several physical mechanisms. Settlement can be understood as volume reduction of the flocculated material, such that settlement is obtained by settling, consolidation and other volume reduction mechanisms. For example, during water separation, settling mechanisms where solid flocs and grains fall downward through the liquid phase can evolve into consolidation mechanisms. Modeling settlement within the PASS can combine various input data including settling data, consolidation data and other water-separation data.

Conveyance and Discharge of Treated Thick Fine Tailings

As mentioned above, the system can include a conveyance pipeline that is sized and configured for imparting a reduced or minimum shear to the material from the conditioning pipeline until discharge. This can be particularly advantageous when the distance from the flocculant injector to the discharge point is substantial or sufficiently great such that simple continuation of the conditioning pipeline would impart excess shear and risk over-shearing the material prior to discharge. The conveyance pipeline can be provided to have a larger diameter compared to the conditioning pipeline in order to reduce shear during this transportation step. Alternatively, the conveyance step can include other methods or systems that do not necessarily involve increasing pipe diameter, such as splitting the flow of treated thick fine tailings coming from a single conditioning pipeline into multiple conveyance lines and operating the conveyance lines at reduced flow rates, thereby reducing shear imparted to the material prior to discharge.

Flow rate and pipe diameter can be controlled in tandem in order to reduce the shear sufficiently to substantially maintain the floc size during conveyance (i.e., from conditioning to discharge). In some scenarios, the floc size change during conveyance is kept within 150 μm while keeping the floc size within 50 μm to 200 μm. Thus, if the initial floc size prior to conveyance is at the maximum target size of 200 μm, then the maximum floc size change should be 150 μm such that the floc size upon discharge is at least 50 μm. If the initial floc size is smaller than 200 μm, then the maximum floc size change should be kept at a lower level to ensure a minimum floc size of 50 μm upon discharge. Alternatively, when the initial floc size prior to conveyance is above 200 μm, then the floc size change can be greater than 150 μm. In general, the floc size prior to conveyance and after conveyance can be targeted and the process conditions (e.g., shear conditions) can be managed such that the floc size upon discharge is within the desired range.

Figure 21:
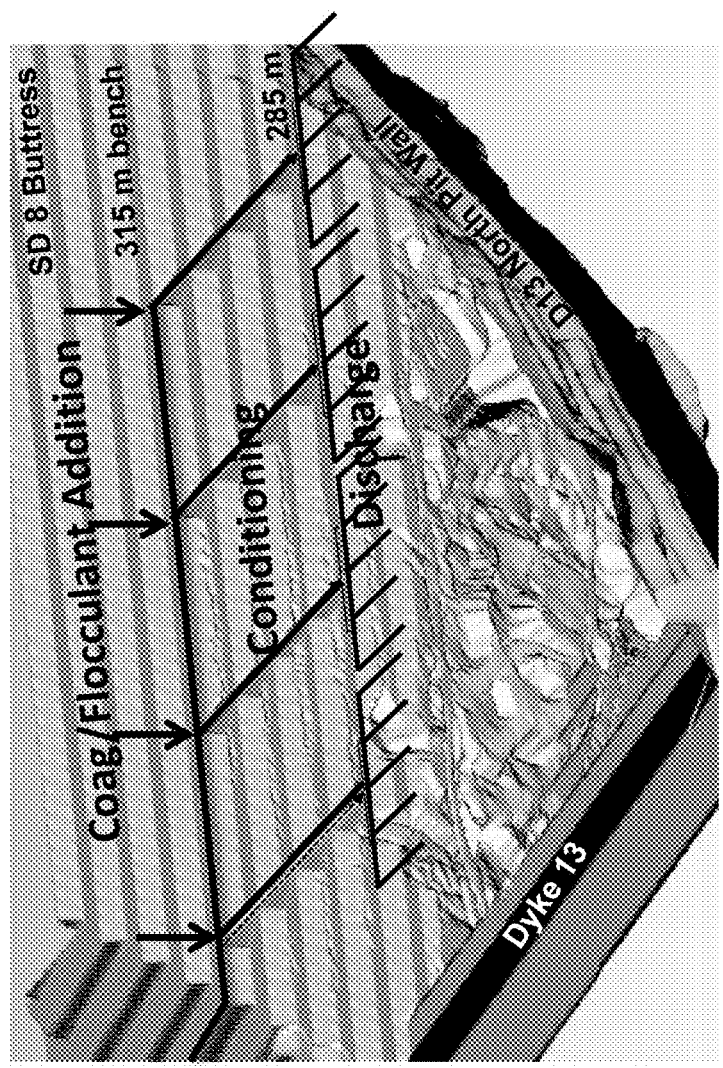
FIG. 21 is a schematic representation of an in-line operation from chemical immobilization to discharge into the permanent aquatic storage structure PASS.
Figure 22:
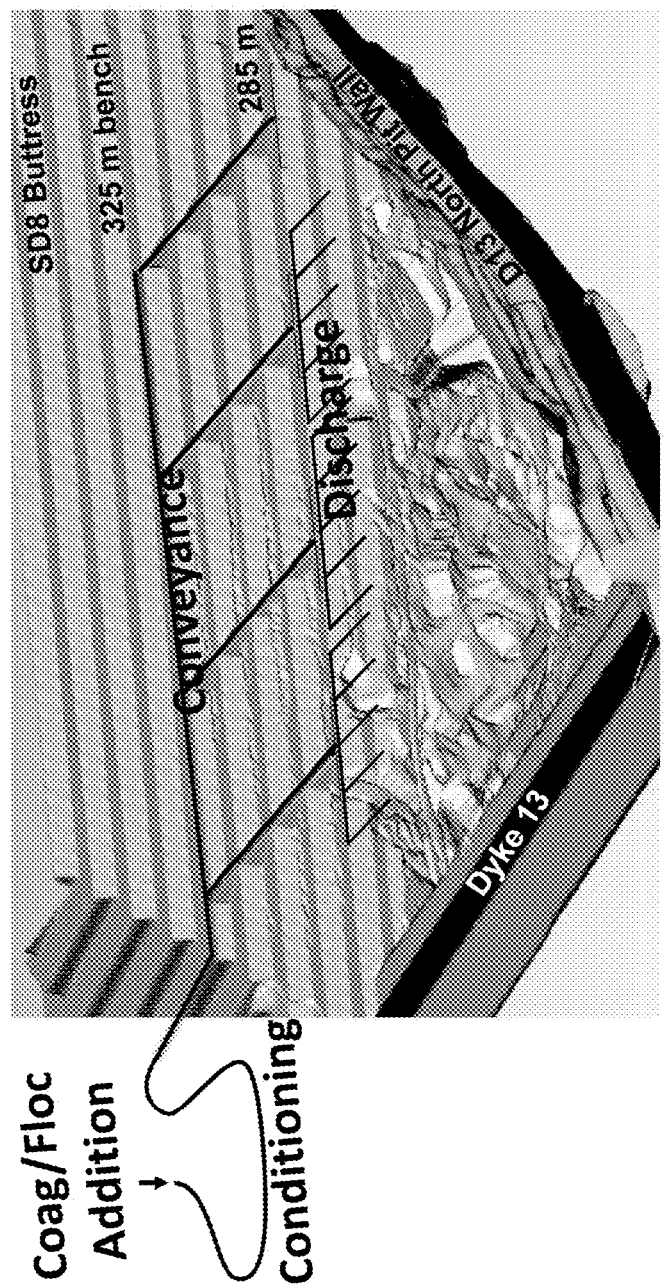
FIG. 22 is a schematic representation of another in-line operation chemical immobilization to discharge into the permanent aquatic storage structure PASS.

Referring to FIGS. 21 and 22, two potential implementations are shown for transporting and discharging the treated thick fine tailings into a pit.

In a first implementation shown in FIG. 21, the treated thick fine tailings is discharged into the containment structure of the PASS directly after the pipeline conditioning stage. The discharge section of the pipeline is in direct fluid communication with the conditioning section of the pipeline. In this dewatering scenario, the in-line injection of the immobilization chemical (e.g., coagulant) and the flocculant can be located on a buttress, upstream of the conditioning pipeline which can be provided sloping down from the buttress toward the discharge location. In this scenario, the chemical injection assets (e.g., immobilization chemical injector and flocculant injector) can have to be relocated repeatedly as the level of the PASS rises with time, e.g., to maintain the slope of the conditioning section of the pipeline. The treated thick fine tailings are then discharged into the pit of the PASS to allow the flocs to settle and the water to separate and form an upper layer, thereby forming the water cap. Without a conveyance pipeline there can be certain challenges and constraints in terms of operation and relocation of the chemical injection units.

In a second implementation, as illustrated in FIG. 22, the treated thick fine tailings are conveyed to the discharge location after the pipeline conditioning stage. The pipeline geometry can be adapted to include a conveyance pipe section or arrangement, which is in fluid communication with the conditioning pipeline. In addition, the chemical injection assets can be provided in a central location that would not require relocation as the level of the PASS rises, as opposed to the implementation of FIG. 21. In addition, the conditioning section of the pipeline can also be located off the buttress, which can enhance accessibility and operational aspects of that step. The conditioning can be performed to condition the flocs and the treated thick fine tailings to a state where continuing pipeline shear would not have a significant or beneficial impact on the terminal floc sizes or settling behavior of the discharged material in the PASS. The flocculated and conditioned thick fine tailings can then be sent to the discharge section of the pipeline, via the conveyance section. The conveyance section of the pipeline can be located on a sloped ramp or earthwork to facilitate distribution to the discharge section. The presence of a conveyance section therefore facilitates efficient relocation of system assets over time (e.g., as only conveyance and discharge assets can have to be relocated) as well as centralization of chemical injection units in more suitable locations for operation, maintenance, chemical supply, and so on. The conveyance system facilitates stable operation of the chemical addition and conditioning steps for reliable production of treated thick fine tailings with desired characteristics, while the low-shear conveyance system provides enhanced adaptability and flexibility for transporting ready-to-deposit material to a variety of different discharge points operating at any given time and different discharge points that can change location over time.

In terms of the conveyance method, in an in situ or ex situ dewatering case, conveyance of the flocculated and conditioned thick fine tailings can be controlled to maintain the floc size at an optimal value or within an optimal range for dewatering until deposition into the containment structure of the PASS. For example, lengths and diameters of the pipes can be chosen in accordance with various parameters including the distance to the discharge section and the attrition resistance of the flocs from the treated fine tailings. In addition, the conveyance pipes can be configured, positioned and operated such that no additional pumping is required to transport the material to the discharge locations. For example, the conveyance pipes can be positioned on a clopped section of the PASS containment structure having an inclination sufficient for the material to flow under gravity and remaining head provided by upstream pumps to the discharge locations.

In terms of discharge methods, in an in situ dewatering case, the treated thick fine tailings can be discharged continuously into the subaerial pit over a relatively long period of time (e.g., rise rate of about 20 meters per year) with the release water coming to the surface and the solids settling to the bottom. The discharge points can sometimes be submerged in the water or within the underlying tailings deposit, but the primary discharge method would include discharging the material onto the top of the fluid and/or onto a solid earth surface proximate to the fluid surface. The discharge should be designed and managed to avoid over-shearing or destroying the flocs in order to facilitate initial high water release and good settling rates. Thus, the discharge points should not be located at a significant height above a solid surface which could lead to a high-energy impact causing over-shearing.

In some implementations, floating pipe sections with discharge ends can be used to gain access to underutilized areas of discharge. The floating can be equipped with floating devices or can be supported by other means.

In an ex situ dewatering case, where the bulk of the water has been removed prior to deposition, the discharge method can be modified, such as distributing the discharge to prevent water pooling and modifying the pipe sections and discharge ends to accommodate higher-solids material.

It should also be understood that similar principles can apply to both the conveyance section and the discharge section to maintain the floc size in an optimal range for the desired water release and settling characteristics. For example, the conveyance section can be designed to include a plurality of pipes for splitting the flow of treated fine tailings coming from the conditioning section. Similarly, the discharge section can be designed to include a plurality of pipes for splitting the flow of treated fine tailings coming from the conditioning section or the conveyance section.

Dewatering

As mentioned above, various dewatering techniques described in several Canadian patent applications can be used in the context of the techniques described herein. It should be noted that the overall process can include several dewatering steps, which will be discussed in greater detail in relation to FIGS. 1a and 1b, for example. In general, dewatering can be done by a solid-liquid separator (SLS) or by sub-aerial deposition/discharge. A combination of SLS and sub-aerial dewatering can also be performed.

Various types of SLS's can be used. For example, belt filters and/or thickeners can be used to separate a solids-depleted water stream from a solids-enriched tailings material, both of which can be subjected to further processing after dewatering.

In the case of dewatering by sub-aerial deposition, various dewatering mechanisms can be at work depending on the deposition and post-deposition handling methods that are used. For instance, thin lift deposition can promote release water flowing away from the deposited material followed by dewatering by freeze-thaw, evaporation, and permeation mechanisms. For deposition that is performed to promote the formation of a much thicker lower stratum of treated fine tailings with an upper water cap, the lower stratum can dewater with consolidation as a significant dewatering mechanism. More regarding this will be discussed in relation to forming and managing the permanent aquatic storage structure (PASS) for the fine tailings and CoCs.

Characteristics of PASS Landform

In some implementations, as mentioned above, a permanent aquatic storage structure (PASS) can be built via in situ and/or ex situ dewatering of thick fine tailings that has been subjected to chemical immobilization and flocculation. A summary of some characteristics of the PASS landform is provided below.

The containment structure of the PASS can be a former mine pit, which can include various in-pit structural features such as benches and in-pit dykes. After closure of a mine pit, preparation of in-pit structures and landforms (e.g., dykes, dumps, temporary dams, pit walls) can be undertaken. Placement of the treated fine tailings can then begin. The treated fine tailings can be discharged in various ways at different stages of forming the PASS. The treated fine tailings can be discharged within the pit in accordance with tailings management and reclamation considerations. During or after placement of the treated fine tailings, additional landforms, surface water inlets and outlets, and operational infrastructure can be constructed as part of the overall PASS system.

The PASS can be seen as a type of end pit lake—but how it is formed and its target characteristics are different than a conventional end pit lake. For example, the discharged fine tailings are pre-treated before depositing into the landform that will become the end pit lake, to enhance dewatering and stability of the landform. Conventional end pit lakes are formed by placing tailings into the mine pit (i.e., the landform), capping with water, and treating the water within the landform. In an oil sands application, a conventional end pit lake directly deposits untreated MFT into the landform. In contrast, the PASS is formed from pre-treated material such that the MFT is dewatered at deposition and the water released from the MFT is pre-treated to chemically immobilize CoCs in the solids layer formed at the base of the PASS. Thus the PASS has several advantages over conventional end pit lakes, such as more consistent immobilization characteristics throughout the sediment layer, accelerated dewatering, and mitigation of long-term risks related to CoCs in the tailings.

In a PASS, the CoCs are immobilized prior to deposition in the landform. Fresh water dilution can be used in the aquatic reclamation process, in addition to the chemical immobilization of CoCs in the sedimentary layer. Note that fresh water dilution, meaning dilution of the already present pre-treated water cap, is different than relying on a fresh water cap to overlay fluid fine tails that were deposited untreated into the landform (i.e., as in a conventional end pit lake). The PASS in a reclaimed state will have no persistent turbidity, no (or negligible) bitumen in the water cap and toxicity and metals below guidelines required to support aquatic life. By contrast, a conventional end pit lake uses a fresh water cap and microbial activity as the aquatic reclamation process, and steps are not taken specifically to remove bitumen from water released from the fine tailings. A conventional end pit lake will have low persistent turbidity.

Process Implementations

Figure 1B:
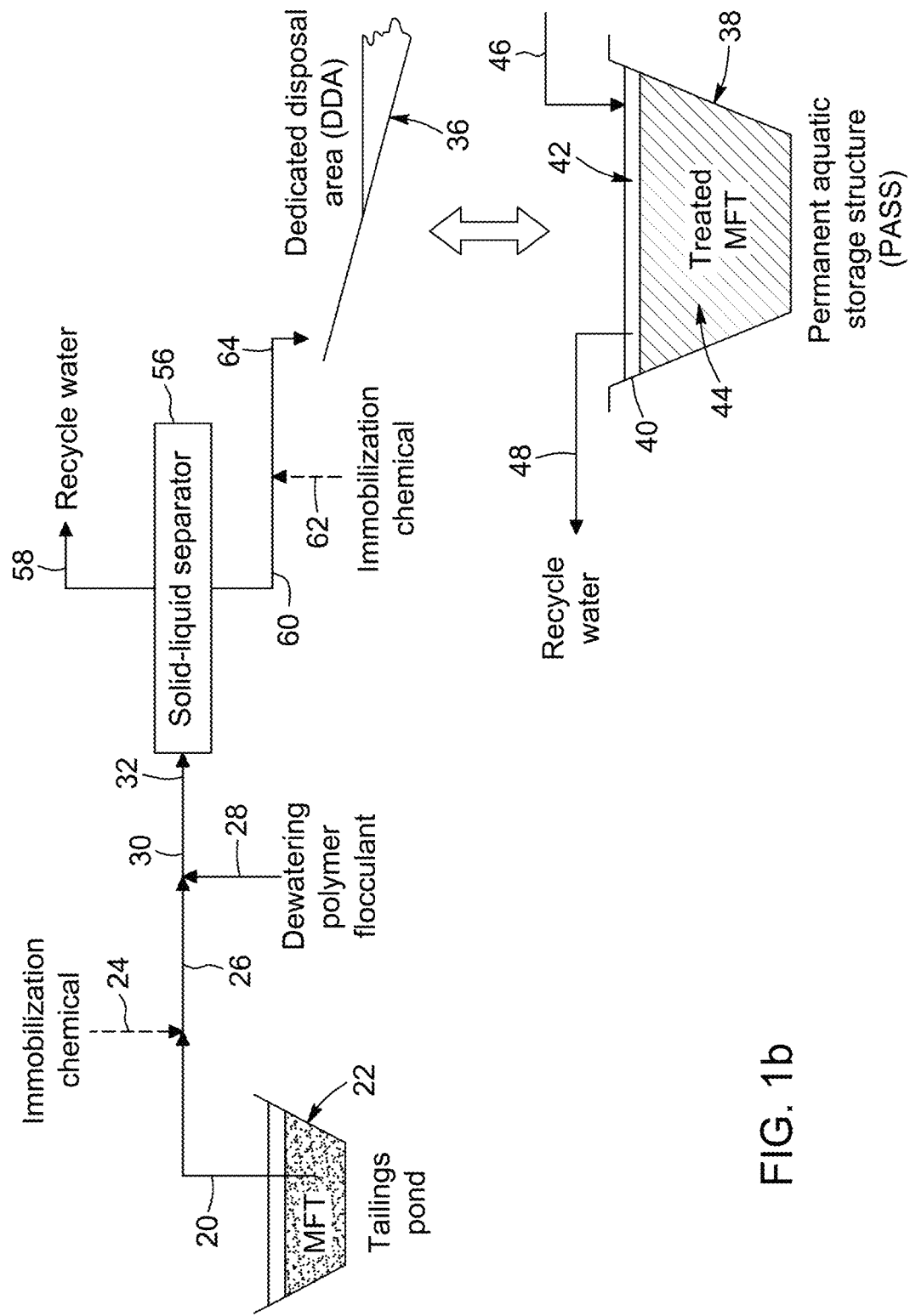

Referring to FIGS. 1a to 1b, there are two main process implementations particularly in terms of the dewatering of the flocculated tailings material. FIG. 1a illustrates an in situ process where the dewatering includes depositing the flocculated tailings material onto a dedicated disposal area and optionally forming a permanent aquatic storage structure (PASS), while FIG. 1b illustrates an ex situ process wherein the dewatering includes supplying the flocculated tailings material to solid-liquid separator (SLS).

The processes illustrated in FIGS. 1a and 1b have several common elements. The thick fine tailings (e.g., MFT) 20 is retrieved from a tailings pond 22 and supplied by pipeline to various processing units. An immobilization chemical 24 is added to the MFT stream 20 to produce a pre-treated tailings stream 26. It should be noted that the MFT stream 20 can be subjected to various preliminary treatments before addition of the immobilization chemical 24, such as dilution, coarse debris pre-screening, pre-shearing, thinning and/or chemical treatments to alter certain chemical properties of the MFT stream. The pre-treated tailings stream 26 is then combined with a polymer flocculant 28, which can be added in-line via a co-annular injector. The polymer flocculant 28 can be added so as to rapidly disperse into the tailings, forming a flocculating tailings material 30. The flocculating tailings material 30 can then be subjected to shear conditioning in order to develop a flocculated material 32 suitable for dewatering.

In some implementations, as illustrated in FIG. 1a, the flocculating tailings material 30 is subjected to pipeline conditioning 34, which can be the only conditioning that causes the flocculated material 32 to attain a state in which release water readily separates and flows away from the flocs. Alternatively, other shear mechanisms can be provided. The flocculated material 32 can then be dewatered. FIG. 1a illustrates a scenario where the dewatering includes depositing the flocculated material 32 onto a sub-aerial DDA 36, which can be a beach or built using earthwork techniques. Each DDA 36 can have a deposition region that has a sloped base to facilitate release water flowing away from the deposited material and promote such rapid separation of the release water from the flocs.

Still referring to FIG. 1a, over time the structure and operation of the DDAs 36 can be managed such that a PASS 38 is formed. The PASS 38 includes containment structures 40 for containing the material, a water cap 42, and a solids-rich stratum 44 below a water cap. During formation of the PASS 38, the water cap 42 results from the dewatering of the treated material. The release water separating from the flocs can be the primary source of water for the water cap 42 such that the quality of the water in the water cap is directly related to the immobilization of CoCs. It is also possible to add fresh water or another source of water into the PASS as it is forming such that the water cap includes water from sources other than the pore water of the tailings. The solids-rich stratum includes flocculated solids as well as the immobilized CoCs, which can include bitumen-clay complexes, insolubilized surfactants (e.g., naphthenic acids), insolubilized metals (e.g., arsenic and selenium) and thus inhibits migration of the CoCs into the water cap or water column. Once the PASS 38 is substantially formed, a fresh water stream 46 can be added to the PASS and an outlet water stream can be withdrawn from the PASS, so as to create a flow-through with the water cap 42 in order to maintain the water level and/or gradually reduce certain CoC levels to facilitate supporting freshwater plants and/or phytoplankton. In some implementations, the PASS 38 can be formed by expelling treated tailings therein for a period of time (e.g., 20 years) in order to fill the PASS to a desired level. During this formation period, the water cap 42 can be substantially composed of tailings pore water that has separated out, as well as precipitation and optionally some other water sources that can be used to account for evaporation. Then, after the formation period (e.g., 20 years), water flow-through is implemented. The water flow-through can include connecting the PASS 38 with existing waterways. The water flow-through provides certain inlet and outlet flows of water into and out from the water cap, and gradually reduces salt levels in the water cap. The water flow-through can be provided such that the water cap has a certain salt content below a threshold in a predetermined period of time (e.g., below a desired value within 10 years after initiating the flow-through), and salt levels can be monitored in the water cap, the inlet flow and the outlet flow.

A recycle water stream 48 can be withdrawn from the PASS for recycling purposes. In addition, recycle water 48 is withdrawn from the water cap 42 and can be supplied to various processing units, e.g., as polymer solution make-up water 50 and water 52 for use in extraction operations 54.

Referring now to FIG. 1b, the flocculated material 32 can be supplied to an SLS 56 instead of a DDA for the main dewatering step. The SLS 56 can be various different types of separators. The SLS 56 produces a water stream 58 and a solids-enriched stream 60. In some implementations, the immobilization chemical can be added upstream of the SLS 56, as stream 24 for example. In other implementations, a downstream immobilization chemical stream 62 can be added into the solids-enriched stream 60, to produce a depositable tailings material 64 that can be deposited into a DDA 36. It should also be noted that the immobilization chemical can be added at both upstream and downstream points (e.g., streams 24 and 62). In the scenario illustrated in FIG. 1b, the DDA 36 can be managed such that over time a PASS 38 is formed. Due to the upstream separation of water 58 in the SLS 56, the water cap 42 of the PASS in the ex situ dewatering scenario can be thinner than that of the in situ scenario. Indeed, in the ex situ scenario, a portion of the release water, which can be the primary source of water for the water cap 42, is withdrawn from the solid-liquid separator as recycle water 58, thereby reducing the water level of the water cap 42 in comparison to the in situ scenario. Depending on a desired water cap depth, water from other sources can be added to the water cap in the ex situ implementation if there is insufficient water from the remaining tailings pore water.

Turning now to FIGS. 2a to 2e, there are several potential process implementations for effecting contaminant immobilization as well as polymer flocculation of suspended solids present in the thick fine tailings. In general, chemical immobilization and polymer flocculation can be effected at different points in the process and by using different chemical addition approaches.

Referring to FIG. 2a, the MFT stream 20 can be combined with the immobilization chemical 24 to produce the pre-treated tailings 26, which is then combined with the polymer flocculant 28 so that a flocculated tailings material 32 is produced and then subjected to dewatering 66. The dewatering step 66 results in a water stream 68 and a solids-enriched stream 70. It can be noted that the scenario of FIG. 2a is a generalized version of the process similar to that of FIGS. 1a and 1b insofar as the immobilization chemical 24 is added to the thick fine tailings prior to the flocculant 28.

Referring to FIG. 2b, the immobilization chemical 24 and the flocculant 28 are added simultaneously into the MFT 20. The resulting flocculated tailings material 32 is then supplying to the dewatering step 66. The co-addition of the immobilization chemical 24 and flocculant 28 can be done by introducing the two additives via a single addition line or injector, or by introducing the two additives via separate lines or injectors at a single point of the MFT flow 20 such that the two additives undergo mixing and reaction with the MFT at substantially the same time.

Referring to FIG. 2c, the MFT stream 20 can be subjected to chemical immobilization and polymer flocculation by introducing a single additive 72 that has both immobilization groups and polymer flocculation groups. For example, a calcium-based anionic polymer flocculant, including calcium cation groups and polymer flocculant groups, could be used to enable both chemical immobilization and polymer flocculation. Polymer flocculants based on multivalent cations instead of monovalent cations, such as sodium, can provide the additional immobilization functionality. The anionicity, calcium content, molecular weight, mixing properties, and other polymer properties can be adapted according to the characteristics of the thick fine tailings to obtain desired immobilization and flocculation functionalities. Thus, in some implementations, a single additive that includes a multivalent cation and an anionic polymer can be used. It should be noted that such additives could be introduced as part of an aqueous solution where the additive is fully dissolved, for example.

Figure 2D:
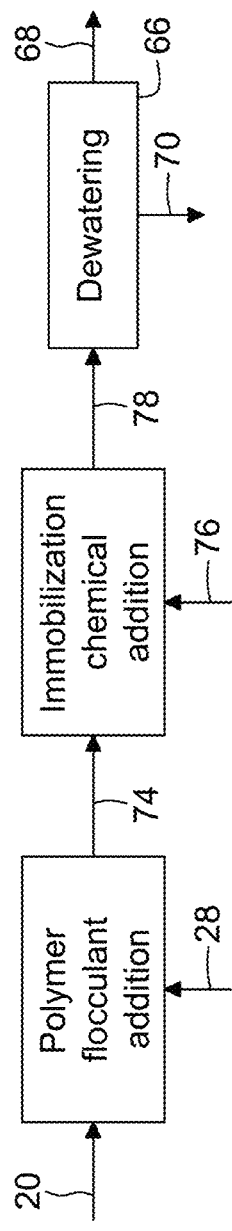

Referring to FIG. 2d, the MFT stream 20 can first be subjected to flocculation to produce a flocculation stream 74 that is then subjected to chemical immobilization by addition of a downstream immobilization chemical 76, thereby producing a treated tailings stream 78 which can be supplied to the dewatering step 66. In such scenarios, shear and mixing imparted to the tailings between the flocculant addition and the dewatering can be adapted to provide suitable shear to flocculate the tailings, mix the immobilization chemical to enable the desired insolubilization and immobilization reactions, while avoiding overshearing the flocs.

Figure 2E:
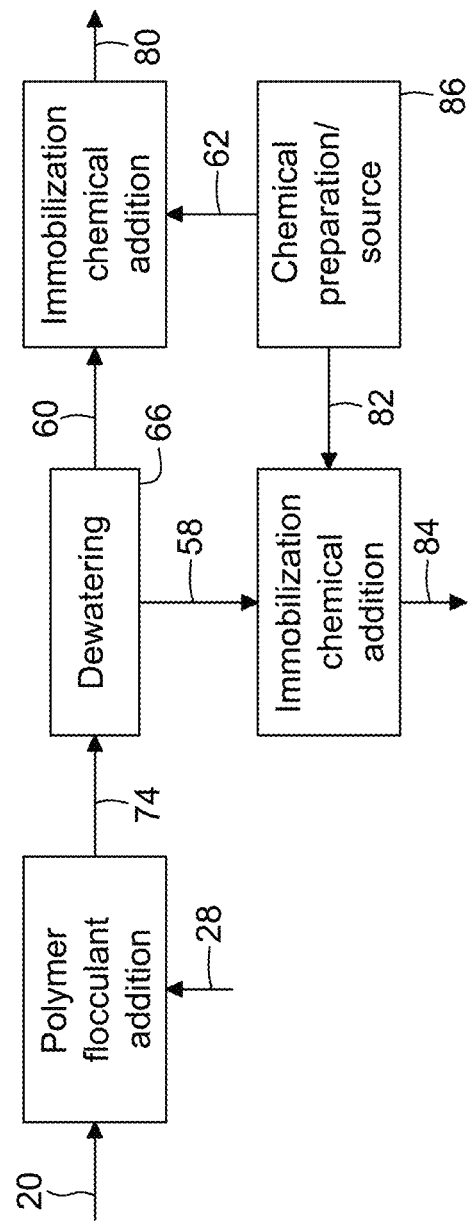

Referring now to FIG. 2e, the MFT stream 20 can first be subjected to flocculation to produce a flocculation stream 74 that is then subjected to dewatering 66 to produce the water stream 58 and the solids-enriched stream 60. This scenario is similar to that illustrated in FIG. 1b insofar as a dewatering step 66 (e.g., using an SLS 56 as in FIG. 1b) is performed prior to addition of downstream immobilization chemical 62. Thus, the solids-enriched stream 60 can be subjected to downstream immobilization prior to disposal or further treatment of the resulting solids-rich stream 80 (e.g., further dewatering such as via beaching or deposition into the PASS). In addition, the water stream 58 can also be subjected to an immobilization treatment by addition of an immobilization chemical stream 82 to produce a treated water stream 84 for recycling or deposition into a holding tank, pond, or as part of the water cap of the PASS. The immobilization chemical stream 82 added to the water stream 58 can include the same or different compounds and can have the same or different concentration profile as the immobilization chemical 62 added to the solids-enriched stream 60. In some implementations, the immobilization chemical streams 62 and 82 are prepared or obtained from a common chemical source 86 and can be formulated differently for their respective applications.

It should be noted that various other scenarios beyond those illustrated in FIGS. 2a to 2e are possible in order to subject MFT and/or its derivative streams to both chemical immobilization and polymer flocculation. The process implementation can be selected depending on various factors, such as the characteristics of the thick fine tailings and its CoCs, the properties of the immobilization chemical and polymer flocculant in terms of reactivity and mixing with the tailings (e.g., dewatering device or via deposition, weather, deposition variables such as lift thickness and surface slopes), make-up water chemistry, pipeline configurations, and deposition or PASS capacity.

It should be noted that the techniques described herein can be used to treat MFT derived from oil sands extraction operations as well as various other thick fine tailings or slurries that include CoCs such as surfactants, metal compounds and/or hydrocarbons or other compounds immiscible in the water phase of the slurries. Whether applied to oil sands MFT or other types of MFT or thick fine tailings, various implementations described herein enable effective and efficient conversion of the thick fine tailings into a viable aquatic landform and facilitates permanent storage of thick fine tailings in a reclaimed landscape. In addition, in some implementations, a number of operational and environmental compliance constraints can be dealt with such as facilitating large scale storage of legacy and newly generated fine tailings in a permanent aquatic landform that is ready for reclamation within a relatively short timeframe (e.g., 10 years) from the end of mine life, while enabling efficient overall tailings management.

Experimentation, Results & Calculations

Various experiments and calculations were conducted to assess chemical immobilization compounds, flocculation, and other process parameters related to treating and dewatering MFT.

Chemical Immobilization

Several multivalent salts were evaluated to assess reduction of CoCs in the release water to levels dictated by performance metrics. Chemicals tested include alum ($Al_2(SO_4)_3.14H_2O$), gypsum ($CaSO_4.2H_2O$), iron (II) sulphate ($FeSO_4$ and also referred to as ferrous sulphate), iron (III) sulphate ($Fe_2(SO_4)_3$ and also referred to as ferric sulphate) and lime ($Ca(OH)_2$).

Figure 3:
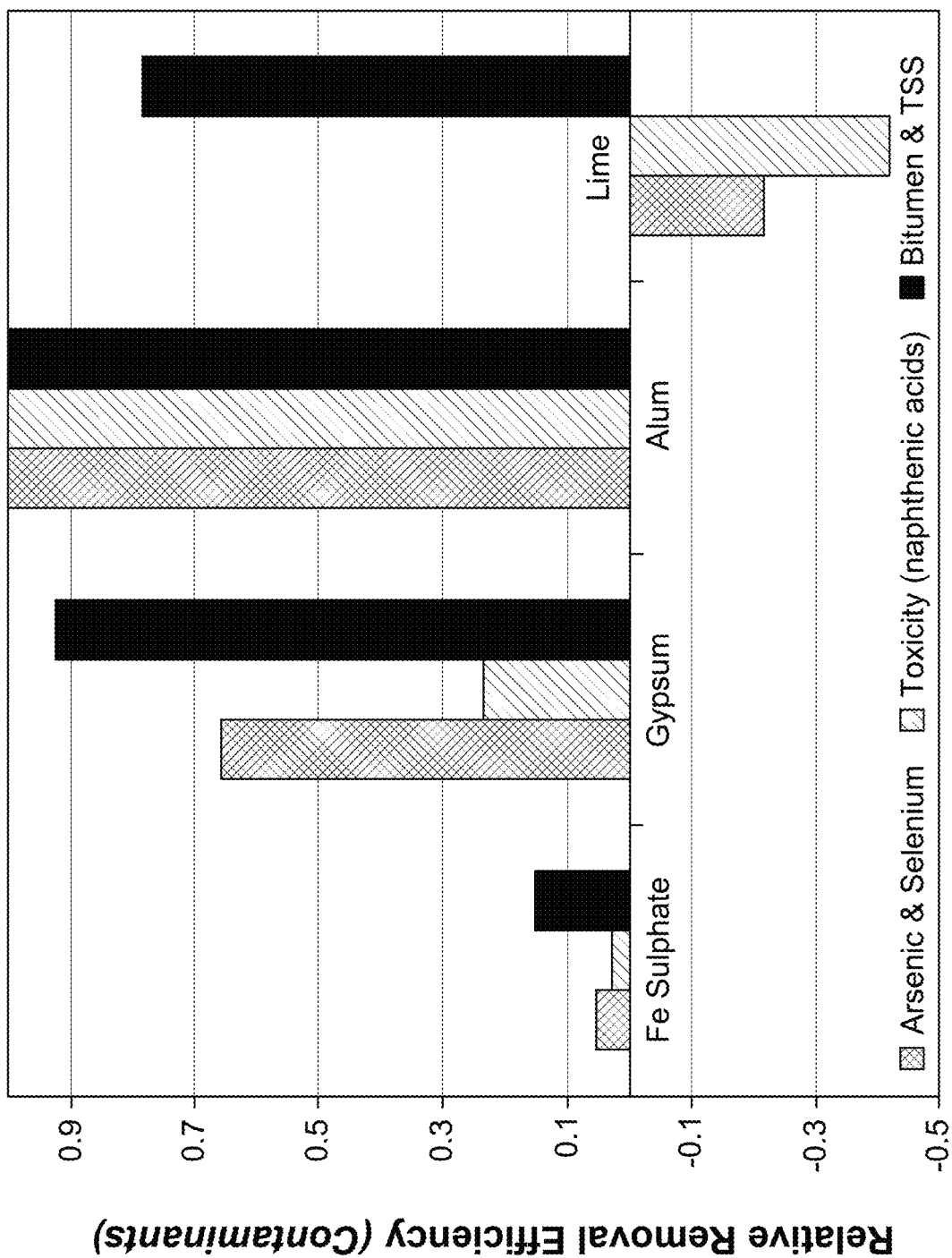
FIG. 3 is a graph of relative removal efficiency of different CoCs from MFT release water by using different chemicals.

FIG. 3 is a graph of relative removal efficiency in which immobilization several chemicals were tested at different concentrations and projected up to their saturation limits. FIG. 3 shows that alum was the most efficient chemical at removing the CoC of arsenic, selenium and naphthenic acids. Gypsum was also efficient at reducing total suspended solids (TSS) and removing bitumen at high concentrations, but was less effective in reducing naphthenic acids significantly. Given that gypsum can be produced on site at certain plants, such as an oil sands processing plant, both alum and gypsum were considered as preferred candidates for additional study.

Two sets of experiments were conducted to assess impacts of alum and gypsum on the release water. First, different chemical dosages were added to undiluted MFT with a solids content of about 38 wt %, homogenized and the entire suspension centrifuged for chemical analysis of the concentrate. The second set of tests was conducted by adding equivalent dosages (on a water basis) to the same MFT diluted with process effluent water (PEW) down to about 3 wt %. These diluted MFT samples were placed in settling columns and allowed to settle for 24 hrs prior to decanting the water for chemical analysis.

The MFT pore water and PEW were tested to determine concentrations of certain components. For the particular set of tests, it was observed that naphthenic acid concentrations appeared uniform between the MFT pore water and the PEW that were used, and that there was a difference between other CoCs (arsenic and selenium) between MFT pore water and the PEW. Thus, when PEW is used for dilution of the MFT and/or preparation of flocculant solution, it should be noted that potential differences and variations in water compositions can influence the immobilization and flocculation and, consequently, the dosages of the additives can be adapted accordingly. In addition, implementation of the process can include a step of determining by measurement or calculation a contaminant concentration in the tailings pore water and/or the PEW or other water source used to add the immobilization chemical and flocculant, in order to control the immobilization and flocculation steps (e.g., chemical dosages).

Alum

Figure 4A:
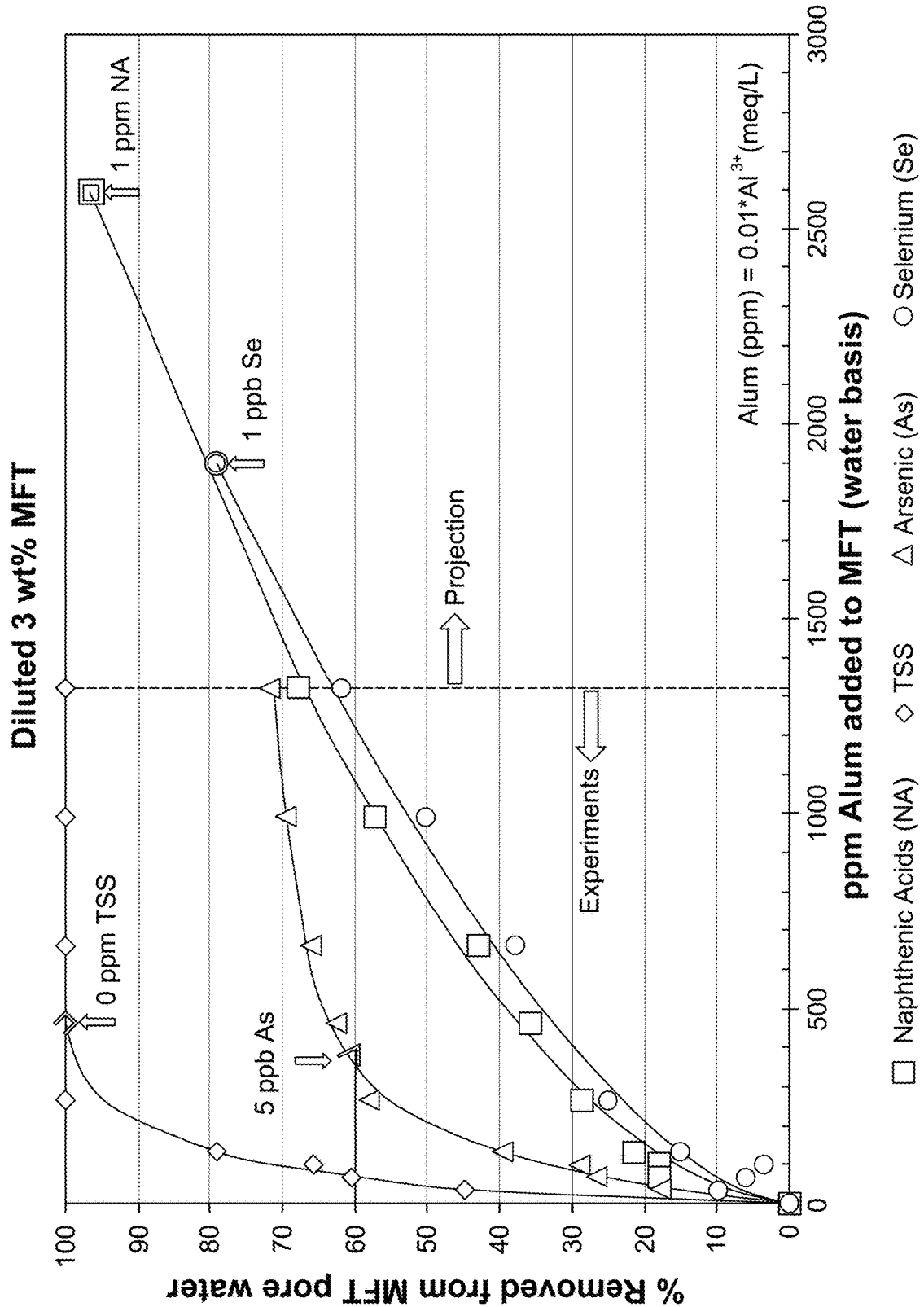
FIGS. 4a and 4b are graphs of removal percentage versus alum concentration for different CoCs.
Figure 4B:
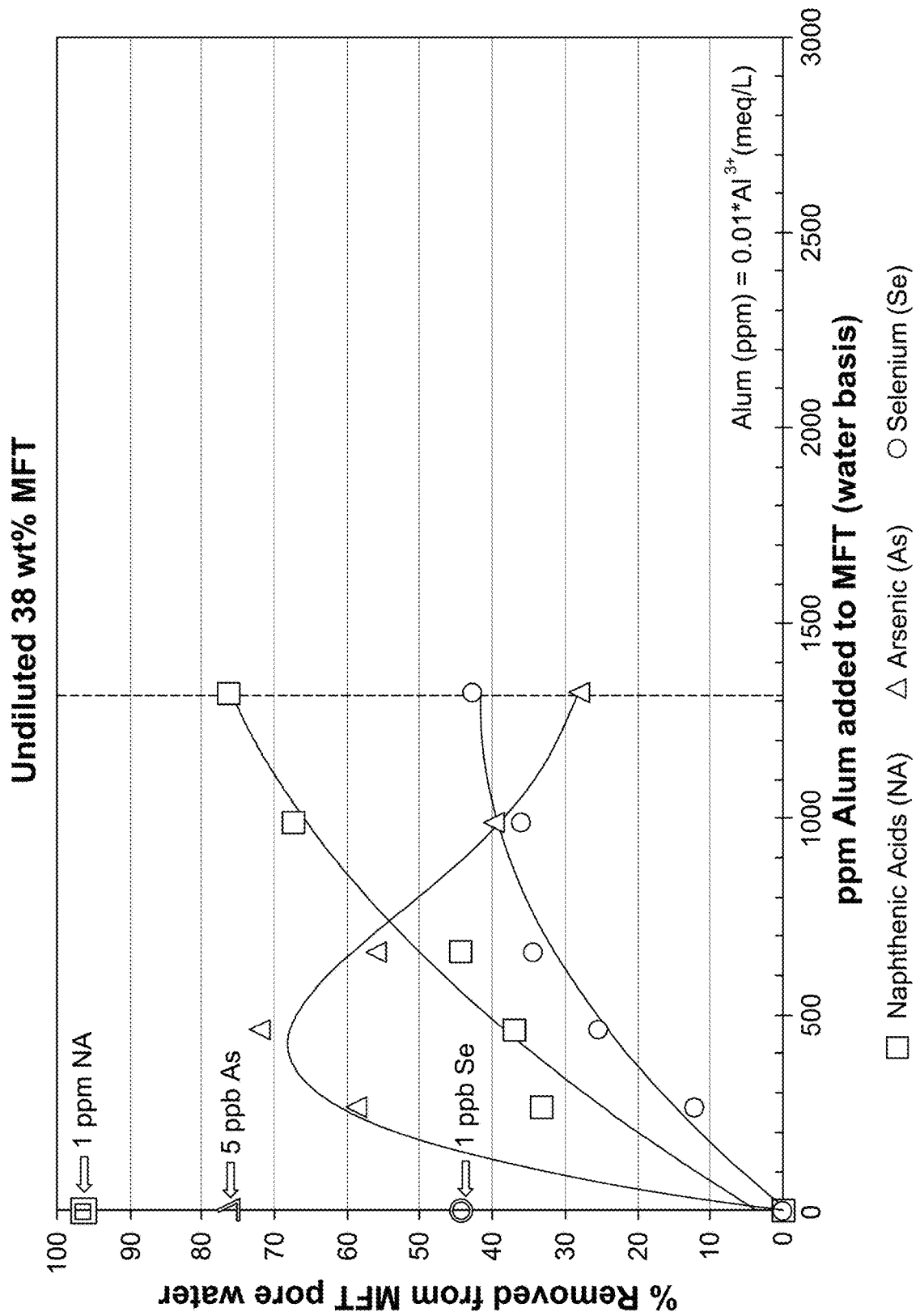

A summary of the effectiveness of alum at removing CoCs from the MFT pore water is presented in FIGS. 4a and 4b for both the diluted and undiluted MFT. The CoC in these tests were naphthenic acids, arsenic, selenium and TSS. Regardless of dilution, to bring CoC levels within the regulatory criteria, naphthenic acid required the most alum (>2500 ppm), while the other CoCs were removed at lower alum concentrations.

The lower arsenic reduction with higher alum concentration for the undiluted MFT can have been due to inadequate mixing at the higher alum dosages (duplicate errors were >50%). Typically, alum is hydrolyzed into $Al(OH)^{+(1,2,4)}$ within approximately one second where the hydrolysis species neutralize the charge on clay particles. At high alum doses and slower dispersion or mixing times, aluminum hydroxide precipitate can be formed and, in turn, can promote sweep flocculation. Given that the charge neutralization is the primary intent of alum addition, rapid high-shear mixing should be implemented to facilitate consistent performance.

Figure 5:
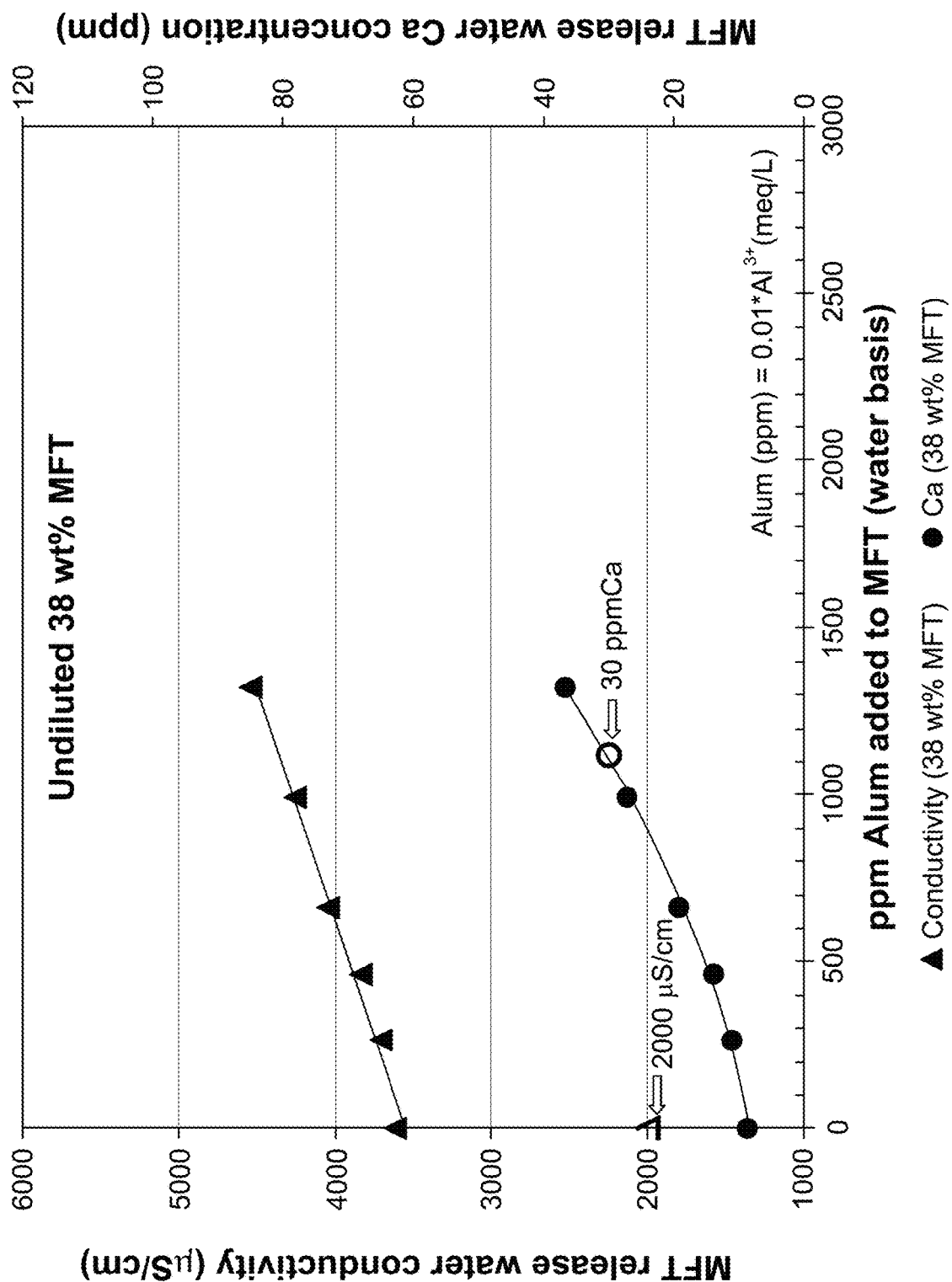
FIG. 5 is a graph of release water conductivity and calcium concentration versus alum concentration.

The removal of bitumen from the water column was visually observed to coincide with TSS removal (about 4.5 meq/L or 1.5 mM $Al^{3+}$). While it can be desirable to add enough alum to lower the naphthenic acid below 1 ppm, increasing alum can also increase the release water conductivity and calcium content in the release water. FIG. 5 illustrates an increase in release water conductivity and calcium content with alum addition. Note that the solubility limit of alum in water at room temperature is about 36 wt %. Calcium content in the release water can be relevant for various reasons, particularly when the water is recycled into extraction operations. For example, when the water is reused in extraction operations and is heated using heat exchangers in a hot process water circuit, the heat exchangers can have certain calcium content limits (e.g., can only tolerate a maximum of about 30 ppm calcium to prevent scaling at design conditions or capacity) which can depend on the use of anti-scaling compounds for example. The maximum alum concentration can be provided based on the calcium concentrations of the waters (MFT pore water, MFT dilution water and/or polymer solution water), and fresh water can be used for one or more of the water streams added to the process. For example, considering fresh water for dilution, the optimum alum concentration can be selected.

Gypsum

Figure 6A:
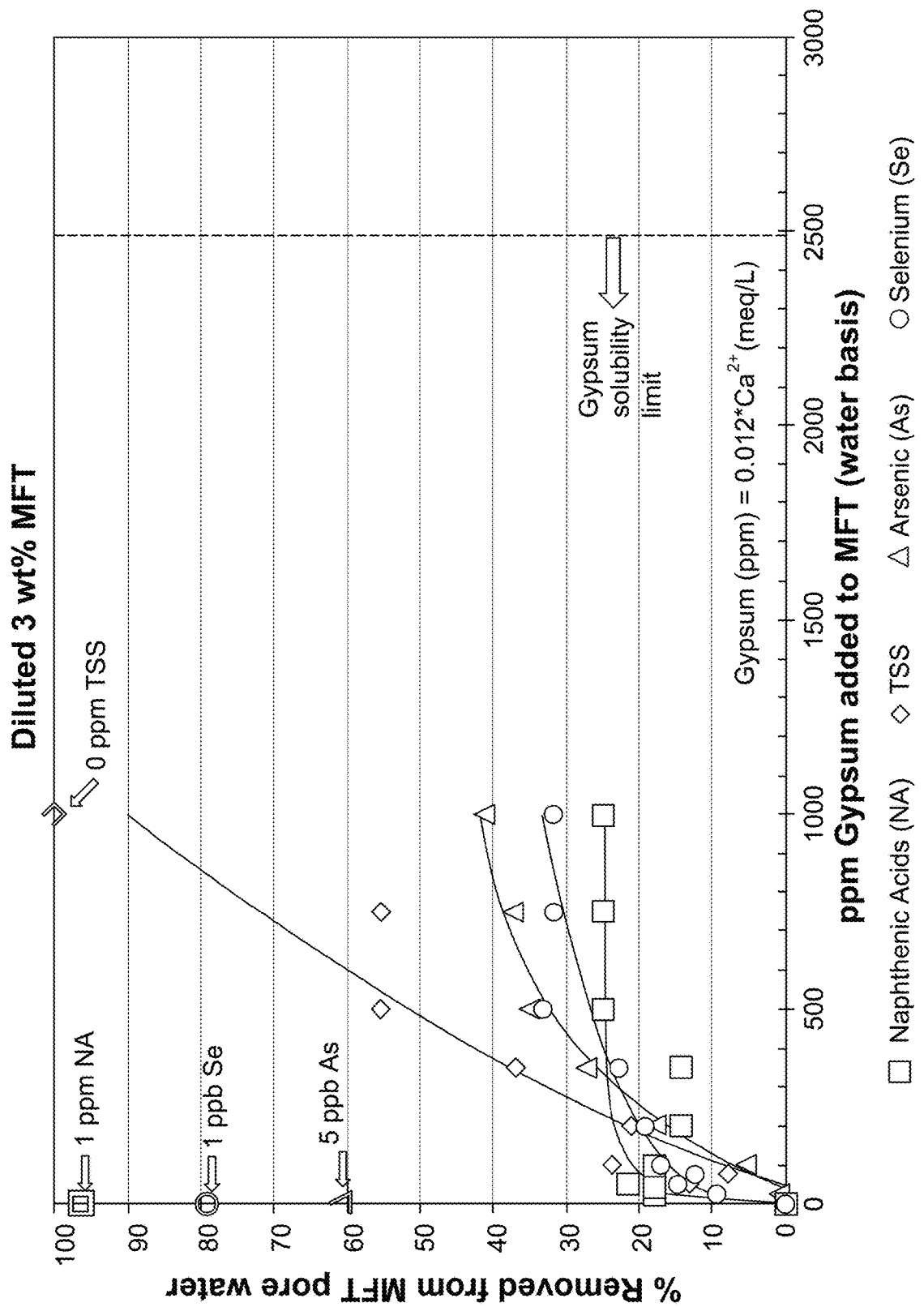
FIGS. 6a and 6b are graphs of removal percentage versus gypsum concentration for different CoCs.
Figure 6B:
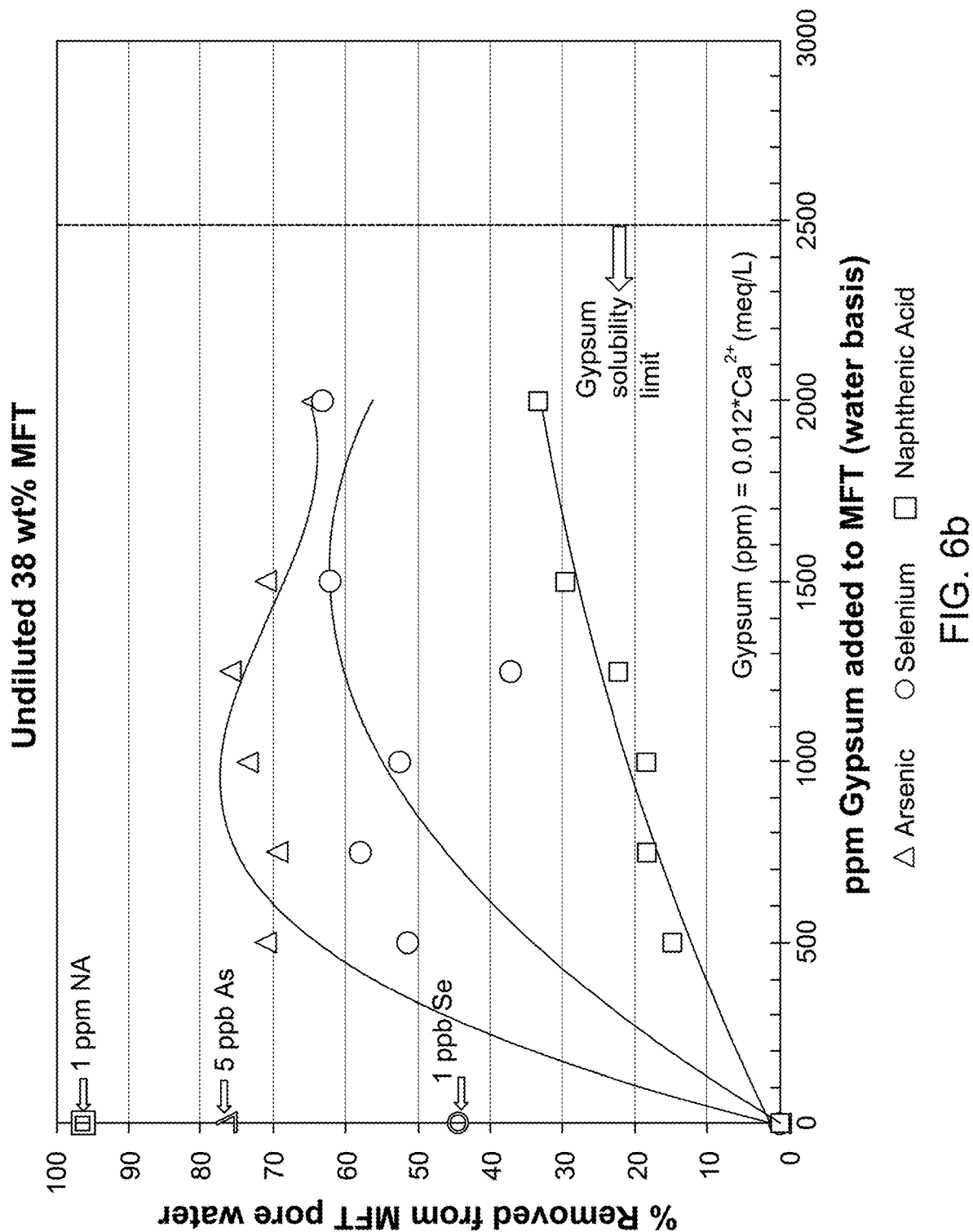
Figure 7:
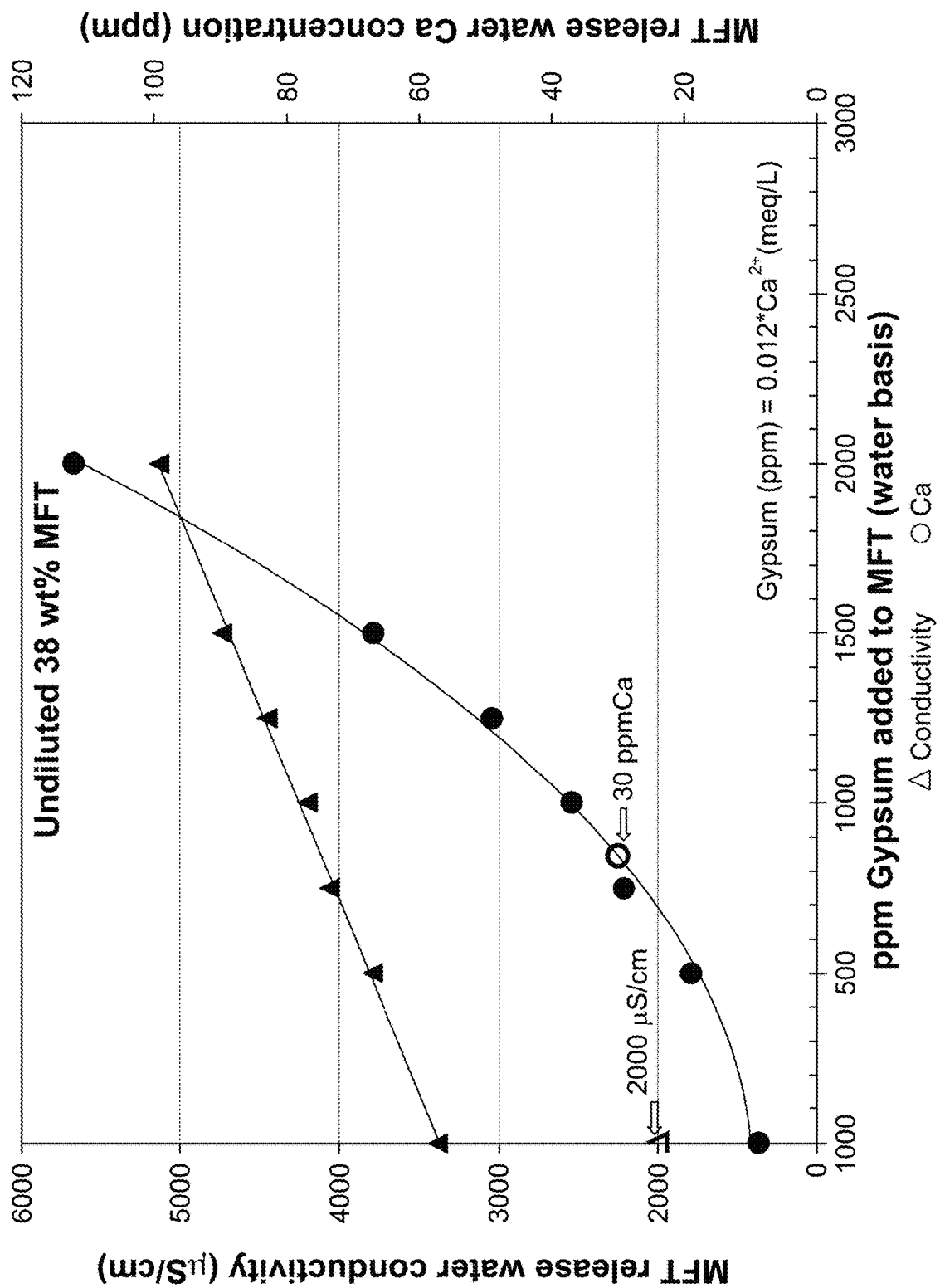
FIG. 7 is a graph of release water conductivity and calcium concentration versus gypsum concentration.

FIGS. 6a and 6b show the impact of gypsum on the residual CoC in the release water, illustrating the efficiency of gypsum at removing CoCs from MFT pore water (the open symbols are the performance targets). In the diluted MFT tests, gypsum immobilized the CoCs although not to the same degree as alum. TSS was removed at above 1000 ppm gypsum (about 12 meq/L or 6 mM $Ca^{2+}$). At saturation, bitumen should also be sequestered in the sediment. Some data inconsistency was observed in the 38 wt % undiluted MFT tests for As and Se and can be repeated. FIG. 7 shows an increase in release water conductivity and calcium with gypsum addition. According to water chemistry data, it was found that at certain immobilization chemical dosages, TSS, bitumen and metals could be adequately removed from the water column using alum or gypsum, and that naphthenic acid could be advantageously removed by using alum.

Another set of experiments was conducted to assess the quality of release water after MFT settling for 30 days, after the addition of the following screened immobilization chemicals: alum ($Al^{3+}$), ferric sulphate ($Fe^{3+}$) and sulphuric acid ($H^+$). These latter immobilization chemicals were screened for chemical immobilization because gypsum dosages above around 10 meq/L $Ca^{2+}$ (860 ppm gypsum in water) remove TSS below the 25 ppm threshold whereas alum, ferric sulphate and sulfuric acid removes TSS below the threshold at concentrations around 5 meq/L of their cation. Under test conditions, only alum and ferric sulphate removed arsenic to below the regulatory levels and gypsum had minimal arsenic reduction capability at saturation. Alum, ferric sulphate and sulphuric acid also seem to reduce naphthenic acids significantly, which would reduce the amount of fresh water dilution that can be required at closure of the PASS to safe levels that will ensure a self-establishment of aquatic biota or organisms.

A standard batch extraction unit (BEU) was used to simulate effects of oil sands derived MFT settling after addition of the screened immobilization chemicals. Results are presented in FIGS. 16 to 20. The tests were conducted at 55° C. with significant air sparging for bitumen flotation, and designed to maximize bitumen flotation so that the impact of different chemistries could be evaluated. An oil sand slurry (CWR=0.1) was conditioned at 1200 rpm for 20 minutes to ensure maximum bitumen liberation from sand grains. After conditioning, the immobilization chemical was added and mixed for 1 minute. Flood water (process water) was subsequently added and the mixing reduced to 400 rpm to ensure laminar flow. Air was added to the 1-L volume at approximately 7 mls/min while mixing for 10 minutes (primary flotation stage). The bitumen froth was collected after primary flotation followed by another round of mixing and air sparging for 5 minutes to collect the secondary froth. The flood water addition is expected to mimic bitumen flotation potential at the water cap-sediment interface during fresh water dilution or pond turnover. It should be noted that the test conditions represent a worst-case scenario for bitumen sequestration. FIGS. 16 to 20 show that all three acidic immobilization chemicals were effective at significantly reducing the organic and metal CoCs. Dosage levels below 10 meq/L $Al^{3+}$ can be tolerated for alum, ferric sulphate and sulphuric acid.

Pipeline Mixing

Impact of mixing intensity and time on pH and rheology of the coagulated thick fine tailings was assessed as follows.

Impact of Mixing Intensity and Time on pH

A series of experiments were conducted on two MFT types (CWR of 0.2 and 0.35). The tests were conducted with an alum dosage of 950 mg/L of MFT water and different mixer rpms. A pH reduction is expected when alum is added to MFT because alum is supplied in a sulfuric acid solution. However, the experiments were performed particularly to assess how rapidly the pH would buffer back to the equilibrium pH of the MFT. It should be noted that the time needed for pH bounce back (within seconds or minutes) can impact pipeline hydraulics as well as polymer flocculant dosage or shear sensitivity of the treated MFT (coagulated and flocculated).

FIG. 23 shows the impact of mixing time and intensity on pH changes of the coagulated MFT (which can also be referred to more generally as pre-treated MFT). In general, the pH drops rapidly as soon as alum is added and bounces back slowly over time, and more rapidly as the mixing intensity increases. The curves were noted to collapse to a critical mixing value of the mixer ($K_c$) given below and plotted in FIG. 24.

$$K_c = \frac{N^2 D^4}{V/t}$$

N—impeller rotational speed (rps)
D—Impeller diameter (m)
V—Liquid volume (m3)
t—Mixing time (s)

It should be noted that experimentation was conducted in an open vessel and therefore, the impact of $CO_2$ equilibration with air was unaccounted for. Iron and calcium carbonates in MFT are expected to dissolve with alum addition with the production of $CO_2$, which remain dissolved in a closed system but dissipated in the open system during mixing experimentation.

Impact of Mixing Intensity and Time on Rheology

A series of experiments was conducted on two MFT types (CWR of 0.2 and 0.3) for a mixer speed of 425 rpm and different alum dosages. Results are provided in FIGS. 25 and 26.

It should be noted that the rheology response is dependent on the alum dosage. The peak yield stress increases by up to 10 times with alum addition and coagulated MFT exhibits significantly higher thixotropic behaviour under constant shear rate as the alum dosage increases.

Figure 27:
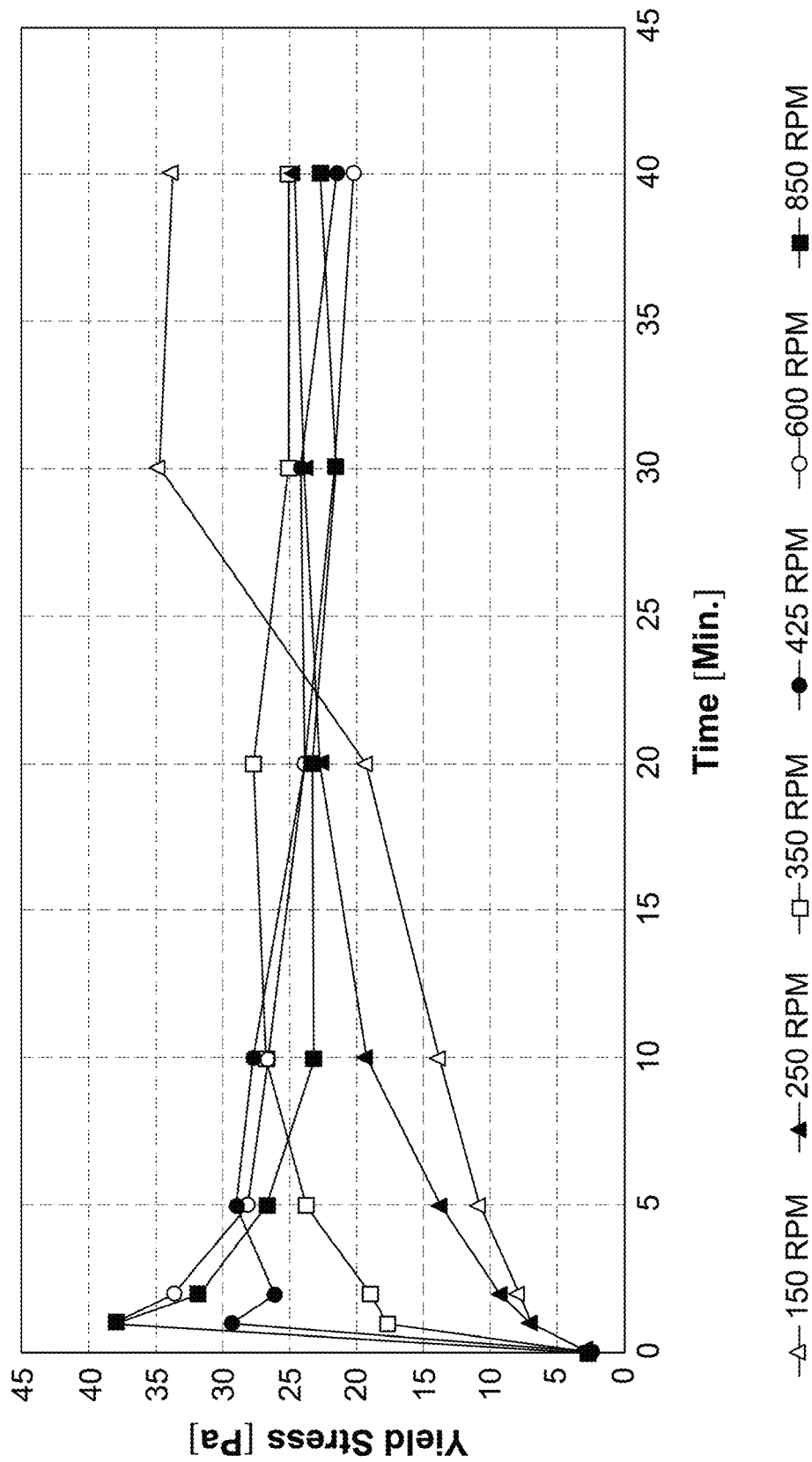
FIG. 27 is a graph of static yield stress versus mixing time for several mixing speeds.
Figure 28:
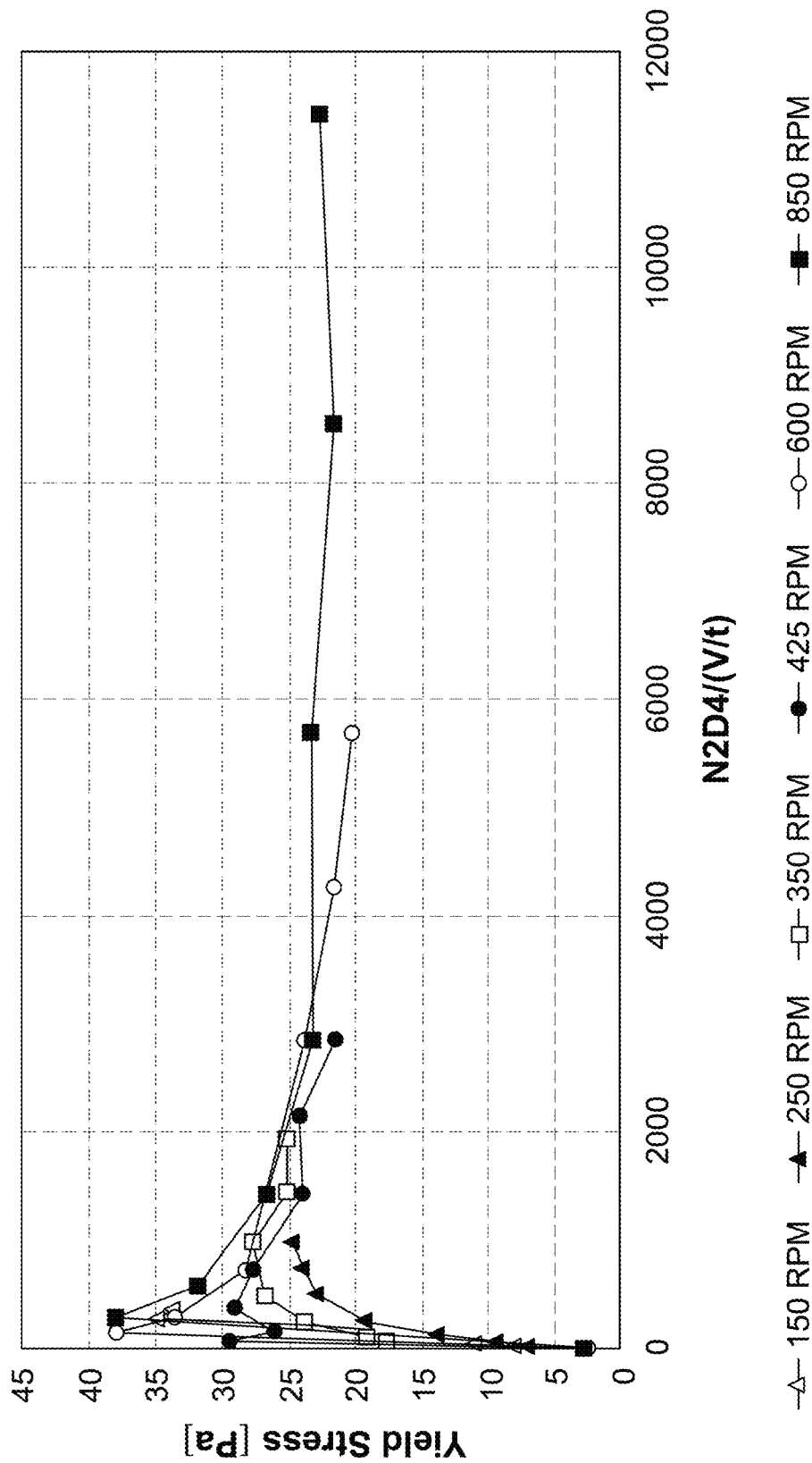
FIG. 28 is a graph of static yield stress versus $K_c$ for several mixing speeds.

Another series of experiments was conducted on one type of MFT (CWR of 0.35) with alum dosage of 950 ppm and different mixer rpms. Results are provided in FIGS. 27 and 28. Similar to the pH effect on mixing, the rheology of the coagulated MFT also changes with mixing duration and intensity (FIG. 27) and can be described by the mixer critical value (FIG. 28). FIGS. 27 and 28 show a significant variation in the rheology of coagulated MFT in a timescale within the expected residence time in the pipeline section between coagulation stage and deposition stage.

Immobilization Chemical to Flocculant Injection Distance (In Situ Operation)

A series of experiments was conducted with coagulated MFT of CWR from 0.1 to 0.35 in a 6"-diameter vessel, with a 5" by 1" paddle mixer, to assess the impact of immobilization chemical to flocculant injection distance on performance targets including water clarity and 28-day CWR. The tests used a total volume of about 750 ml, which included the combined volume of MFT, polymer solution and immobilization chemical solution.

Dewatering Performance of Low Shear Coagulated MFT

Figure 29:
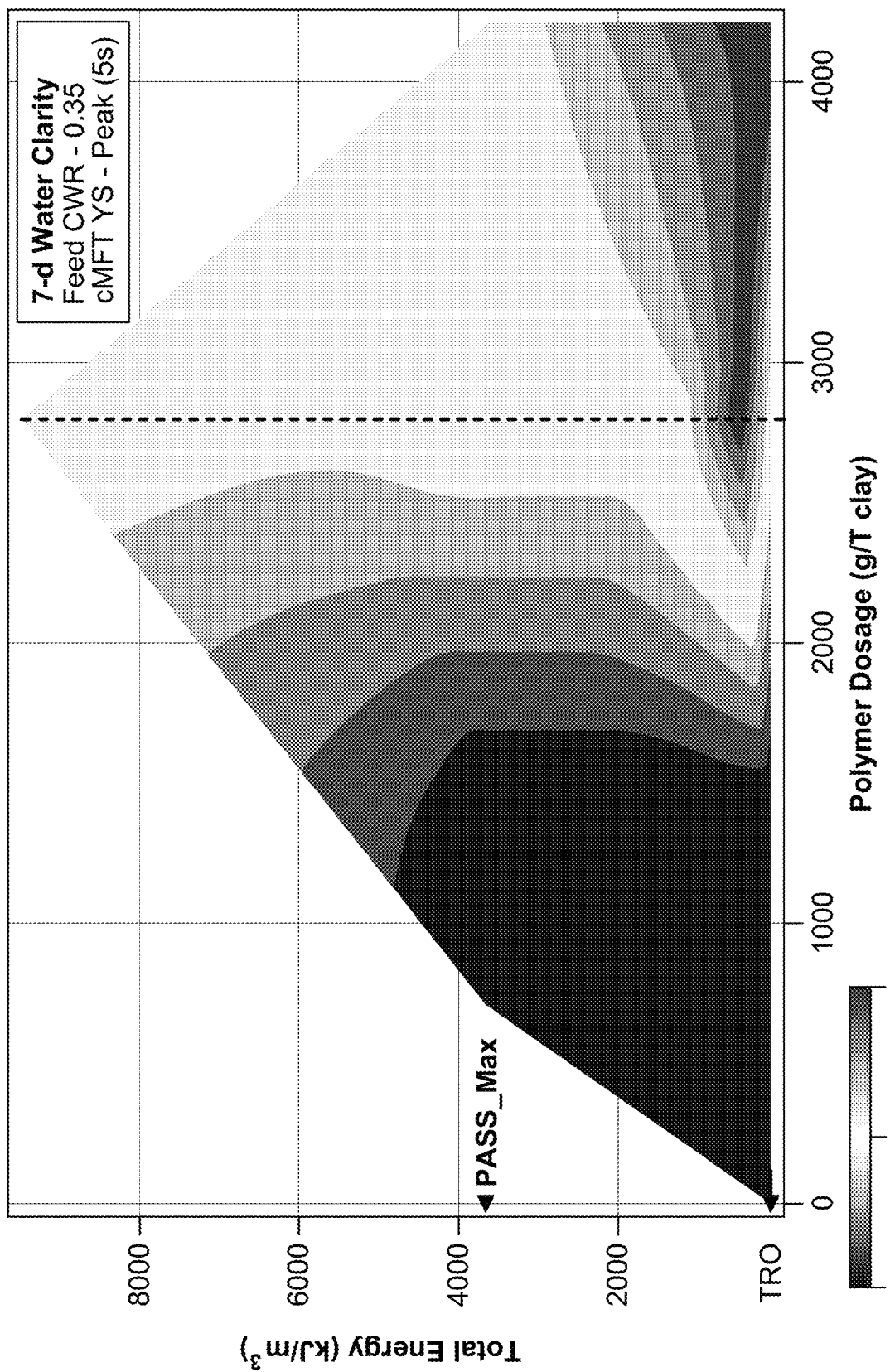
FIG. 29 is a graph of total mixing energy versus flocculant dosage and versus 7-day water clarity for pre-treated (which can be considered coagulated for this and other figures) MFT with feed CWR of 0.35 and exposed to a low-shear. The terms "cMFT" or "cTFT" can be considered shorthand for pre-treated and/or coagulated MFT or TFT, respectively.
Figure 30:
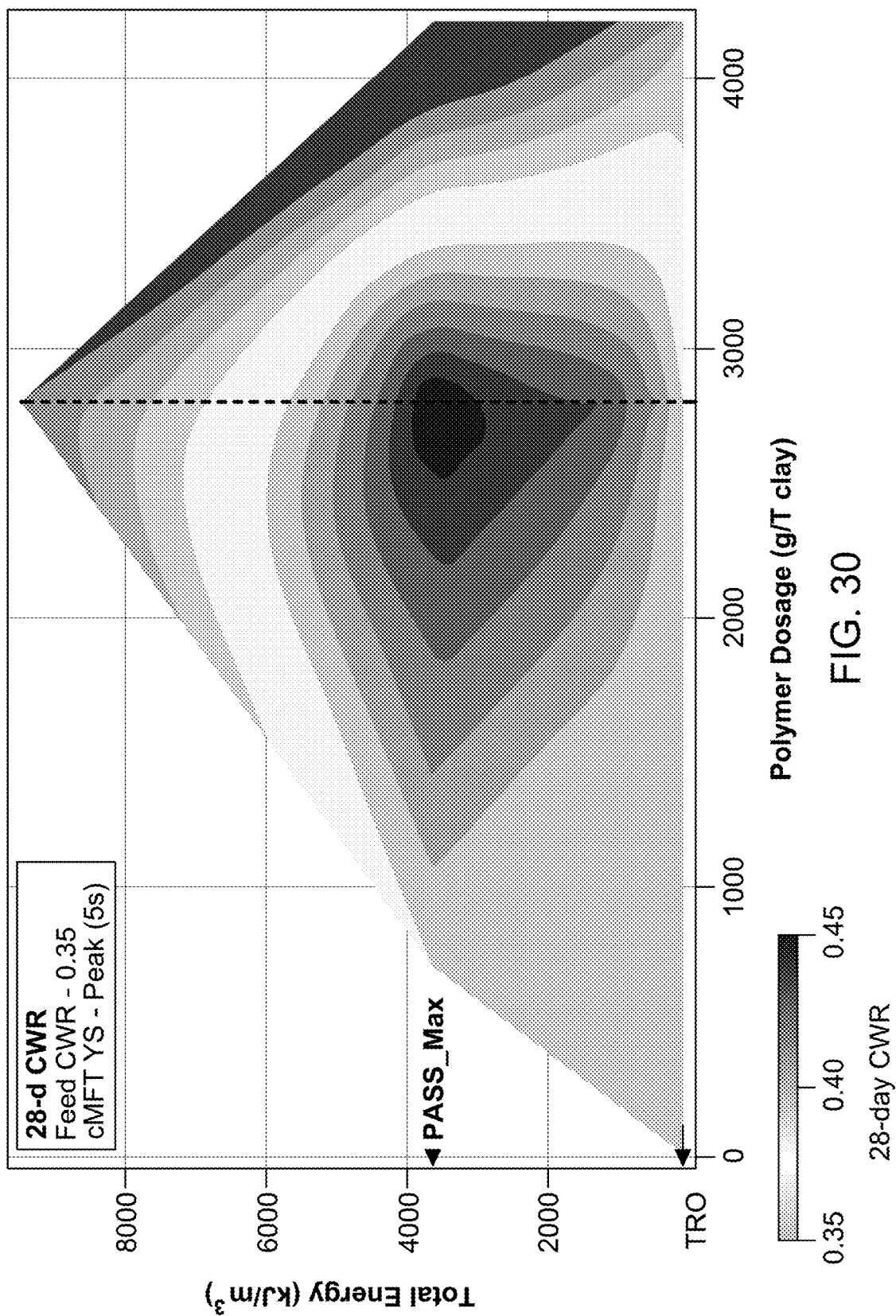
FIG. 30 is a graph of total mixing energy versus flocculant dosage and versus 28-day CWR for pre-treated MFT with feed CWR of 0.35 and exposed to a low-shear.

FIGS. 29 and 30 show an example of performance summary for release water quality and 28-day CWR for coagulated MFT with feed CWR of 0.35 and exposed to a low-shear during coagulation and prior to flocculation. Water clarity of "3" indicates very low suspended solids and "1" is very cloudy. The following could be concluded from the series of experiments:

the water clarity degrades with polymer overdose. For both feed CWRs, water clarity begins to degrade above approximately 2000 g/T of clay, for an alum dosage of 950 mg/L of water;

the polymer dosage at which water clarity degradation starts is dependent on the alum dosage (on a clay basis). Higher alum dosage (g/T of clay) will tolerate more polymer flocculant before water clarity is impacted. While the alum dose on a water basis was 950 mg/L of water in MFT, the alum dosage on clays vary. Alum dosage on a clay basis was 9500 g/T for 0.1 CWR, 4750 g/T for 0.2 CWR, and 2714 g/T for 0.35 CWR;

optimum polymer dosage for the low-shear coagulated MFT, defined as the highest 28-day CWR given high water clarity (3 on a 1-3 scale), varied between 2200 and 2800 g/T clay for CWR of 0.1 to 0.35; and at the optimum polymer dosage, deleterious impact of the coagulated and flocculated MFT mixing intensity on water clarity and 28-d CWR is minimal between 462 and 9508 kJ/m$^3$.

Dewatering Performance of High Shear Coagulated MFT

Figure 31:
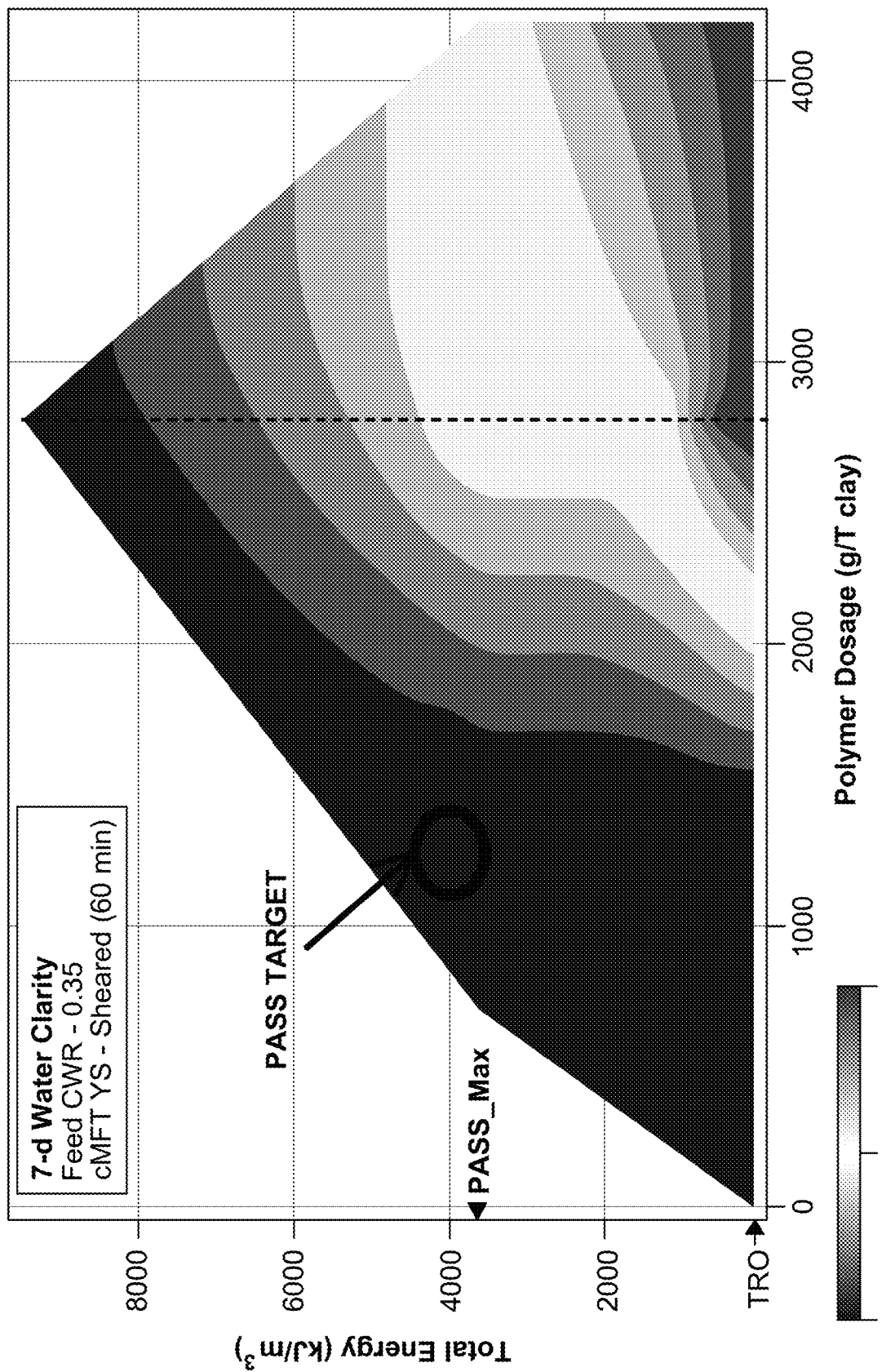
FIG. 31 is a graph of total mixing energy versus flocculant dosage and versus 7-day water clarity for pre-treated MFT with feed CWR of 0.35 and exposed to a high-shear.
Figure 32:
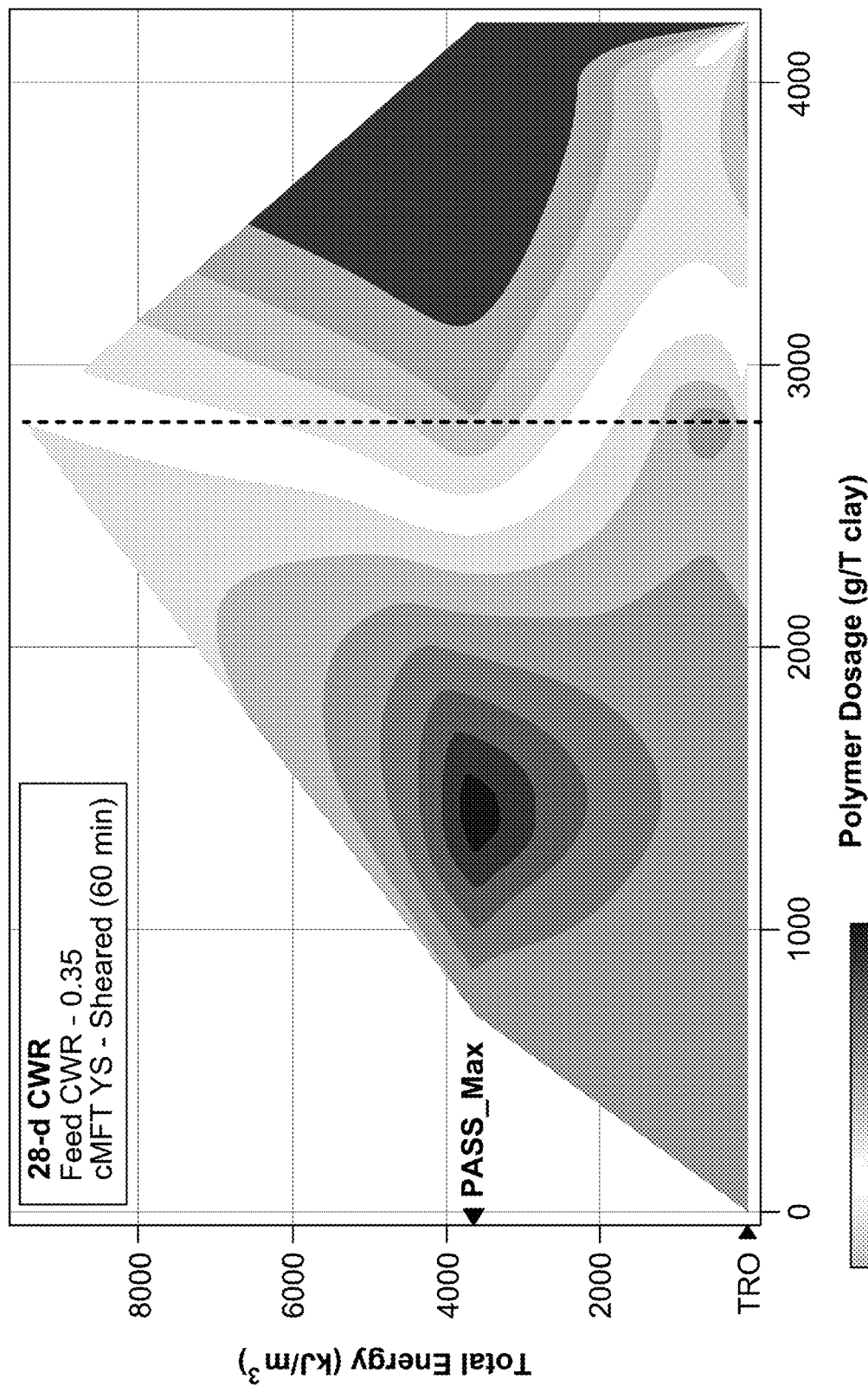
FIG. 32 is a graph of total mixing energy versus flocculant dosage and versus 28-day CWR for pre-treated MFT with feed CWR of 0.35 and exposed to a high-shear.

FIGS. 31 and 32 show an example of performance summary for release water quality and 28-day CWR for coagulated MFT with feed CWR of 0.35 and exposed to a high-shear during coagulation and prior to flocculation. The following could be concluded from the series of experiments:

the polymer overdose state is reached quicker for the high shear MFT than the low-shear MFT. Similar to the low-shear MFT, the water clarity degrades rapidly with polymer overdose. For both feed CWRs, water clarity begins to degrade above approximately 1500 g/T of clay, for an alum dosage of 950 mg/L of water;

the optimum polymer dosage for the high-shear coagulated MFT, defined as the highest 28-d CWR given high water clarity (3 on a 1-3 scale), varied between 1000 and 1500 g/T clay for CWR of 0.1 to 0.35; and at the optimum polymer dosage (1000-1500 g/T clay), the impact of coagulated and flocculated MFT mixing intensity on water clarity and 28-d CWR is also minimal between 462 and 9508 kJ/m$^3$.

Figure 33:
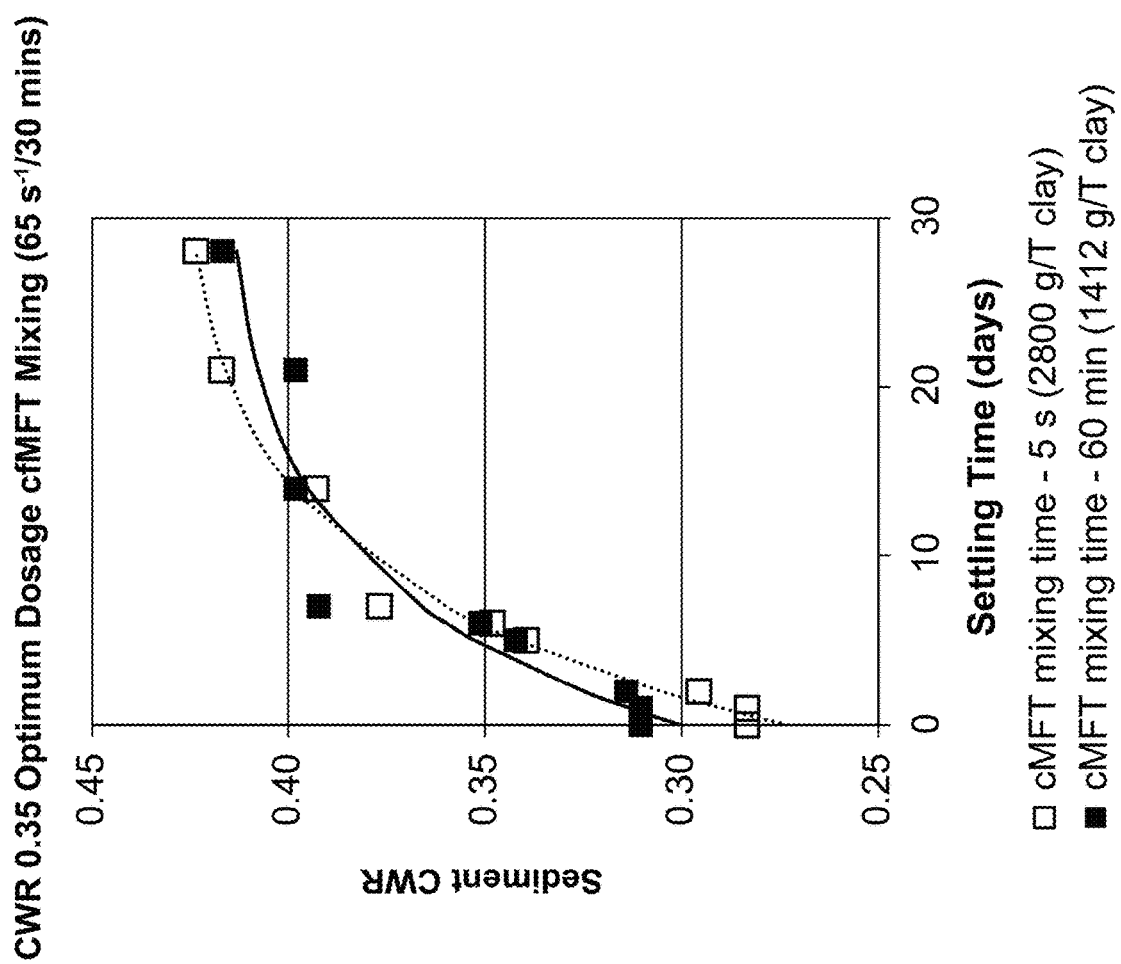
FIG. 33 is a graph of CWR versus settling time for two mixing time of pre-treated fine tailings.

FIG. 33 shows the settling profile expected when an optimum polymer dosage is added to coagulated MFT regardless of the coagulated MFT mixing time. While the initial settling rates are different, the settling profile follows a similar trend after a few weeks of settling. Therefore, considering that the rise rate expected at the PASS can be approximately 10 m per annum, self-weight consolidation can be expected to drive the annual CWR to at least 0.65.

The following conclusions can be derived from the above experiments:

The polymer injection can be performed after addition of the immobilization chemical such that mixing is within a critical mixing range. For impeller mixers, such critical mixing can correspond to ($K_c$) of 20 to 12,000. At the design alum dosages between 950 and 1200 ppm, the optimum polymer dosage decreases as the immobilization chemical to flocculant injection distance or $K_c$ increases. For example, the optimum dosage for coagulated MFT with 0.35 CWR mixed at a $K_c$ of 20 is approximately 2800 g/T of clay, while mixing at $K_c$ of 12,000 requires a polymer flocculant dosage of approximately 1400 g/T of clay.

For a given flocculant injector design and MFT, dosed between 950 and 1200 ppm alum, the polymer flocculant dosage can vary by as much as 20% between MFT with a CWR of 0.1 and 0.35. Once the mixing distance between coagulation and flocculation is fixed, the polymer flocculant dosage per m$^3$ of coagulated MFT is dependent on the coagulated MFT solids volume fraction (or CWR) and the alum dosage.

At the optimum polymer dosage, and treated MFT conditioning and conveyance energies tested (up to 9500 kJ/m$^3$), the deposited material meets the water clarity criteria (<25 ppm TSS) and CWR>0.65 within a year. The 9500 kJ/m$^3$ tested is equivalent to an average shear rate of 150 s$^{-1}$ for 30 minutes after flocculant addition to coagulated MFT. This approximates to a maximum of 6 km in a 20" pipeline at an average line velocity of 3.5 m/s that can be used in large scale operations.

Flocculation and Dewatering (In Situ Dewatering)

On a bench scale, flocculation and in-line dewatering processes were evaluated concurrently as it has been found that maximum dewatering can be coupled to optimum flocculation. The flocculation polymer selection is based on direct experience from thin lift drying technology in which polymeric flocculants react with minerals in the tailings through a number of mechanisms to remove minerals from the tailings suspension (e.g., MFT) by forming aggregates (flocs). However, in addition to the polymer flocculant properties, the extent of interaction between the flocculant and the mineral particles is also dependent on the thick fine tailings properties (e.g., particle size and shapes, pore water chemistry, rheology, and the slurry hydrodynamic condition during polymer injection). In the in situ dewatering option where the immobilization chemical is added before the flocculant, alum and gypsum can act as coagulants that destabilize the particles in the thick fine tailings through double-layer compression and modify the pore water chemistry. These effects can change the nature of the flocculant-particle interaction relative to a process utilizing only polymer flocculant.

Polymer Flocculant Screening

Screening tests were conducted to narrow down potential flocculants for MFT either untreated or previously coagulated with gypsum and alum. Three sodium-based anionic polyacrylamides (aPAMs) were tested: polymer A; polymer B; and polymer C. In addition, a deep deposit specialty chemical (DDSC) was tested, as well as a calcium-based anionic polyacrylamide (polymer D). A combination of alum and sodium aluminate was also tested.

Dewatering efficiency (24 hour CWR) was used as a screening parameter. At each immobilization chemical dosage (typically between 0 and ~10 meq/L for alum and gypsum) the optimum polymer dosage was determined, followed by determination of the 24 hour CWR, the suspended solids and water chemistry of release water. Selection was based on the lowest immobilization chemical dosage for maximum 24 hour CWR meeting operational criteria of 0.65. The quality of the water recovered from the 24-hour CWR (sieved through a 325-mesh screen) was used to represent the expected water quality at closure. The total suspended solids in the pore water can be at most 25 ppm, and the suspended bitumen on water cap of approximately 0 ppm.

Given the differences in the chemistry of the polymers, it was found that each polymer flocculant benefited from mixing control to maximize dewatering efficiency. The four aPAMs (polymers A to D) performed well in the screening tests and the three sodium-based aPAMs (polymers A to C) were further evaluated with respect to flocculation.

Tests were conducted with immobilization chemical addition either before or after flocculant addition. It was found that adding the immobilization chemical (which can also be referred to as coagulant here) prior to the flocculant facilitated achieving advantageous CWR level and TSS reduction. When the MFT was flocculated prior to adding the immobilization chemical in the in situ dewatering process, the resultant CWR was found to be notably reduced at the dosages required for low TSS in the water phase.

Tests generally showed that MFT with CWR of at most 0.2 can require a higher immobilization chemical dosage demand (but lower polymer dosage demand), while MFT with CWR of at least 0.35 will require lower immobilization chemical dosage demand but higher polymer dosage demand.

Flocculent Dosages for Alum- or Gypsum-Treated MFT

Figure 8A:
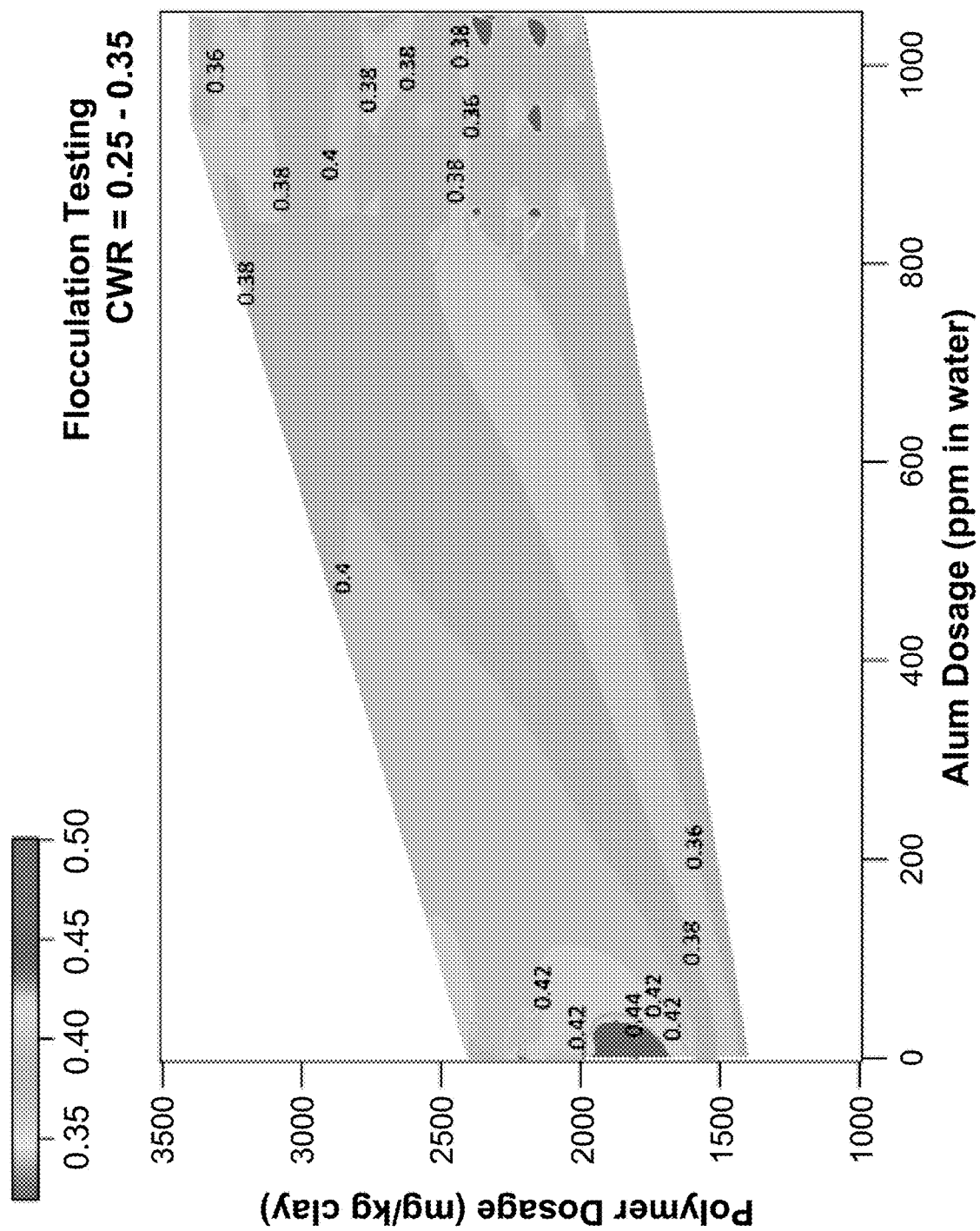
FIGS. 8a to 8c are graphs of polymer flocculant dosage versus alum dosage for the three aPAMs showing CWR responses.
Figure 8B:
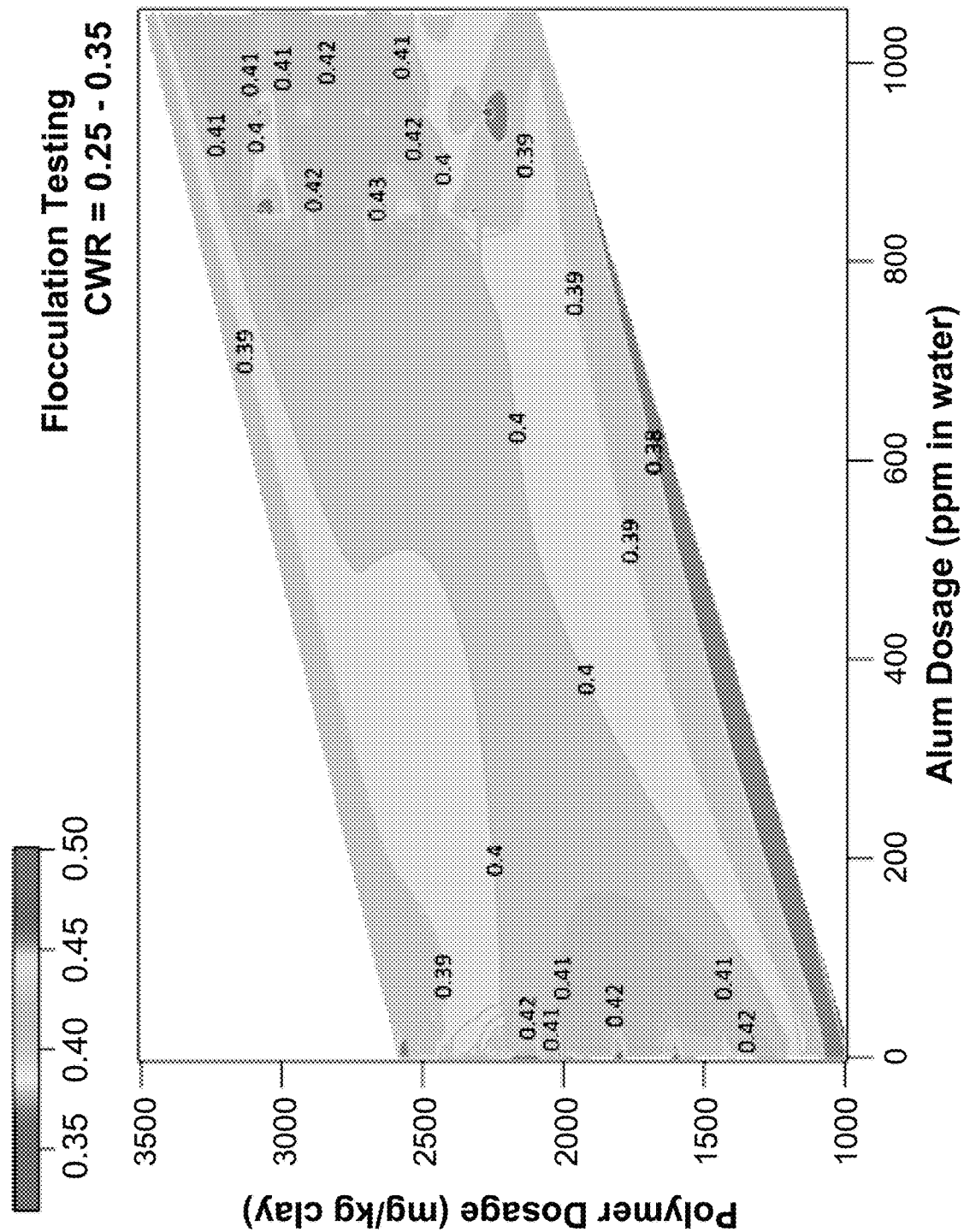
Figure 8C:
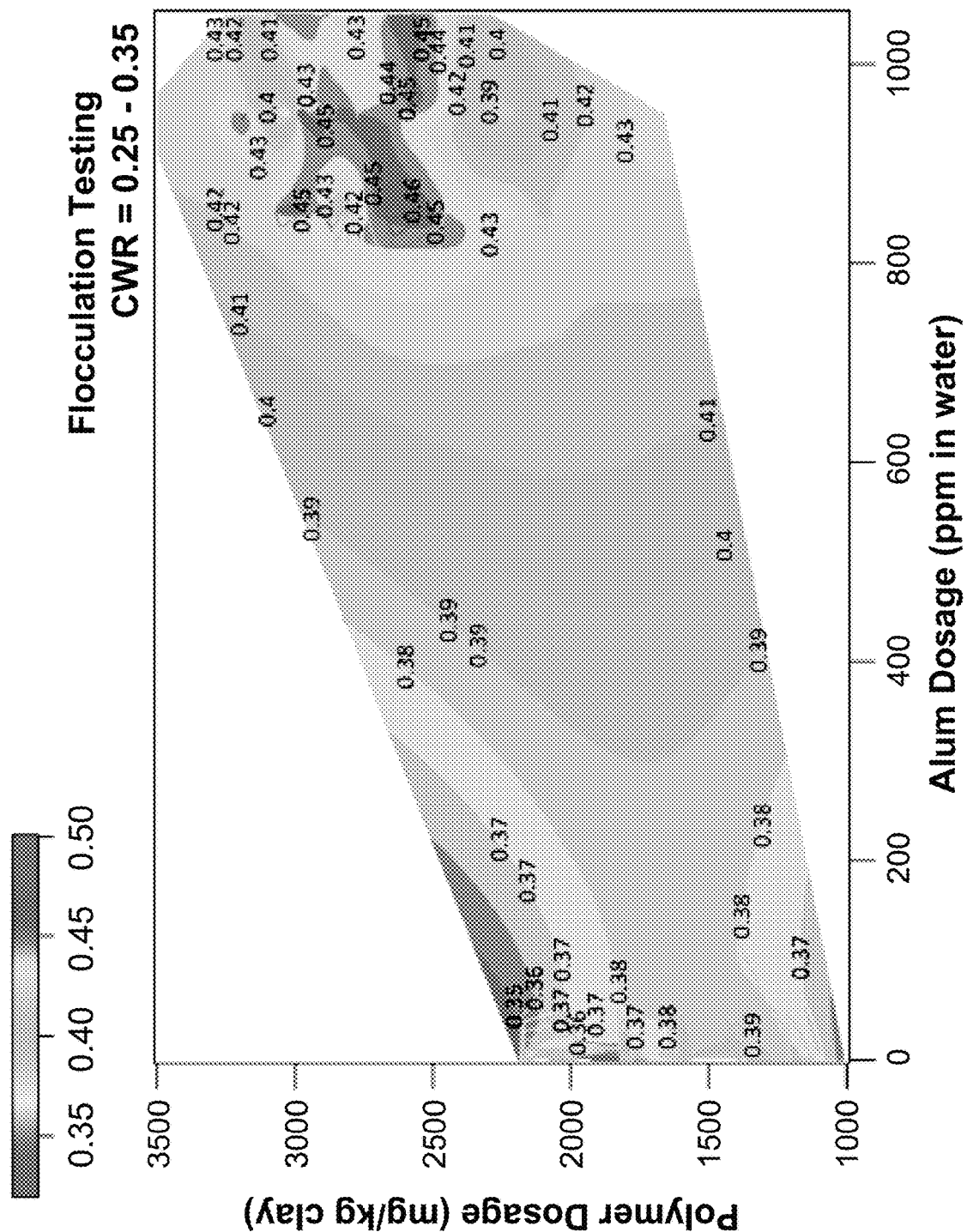
Figure 12A:
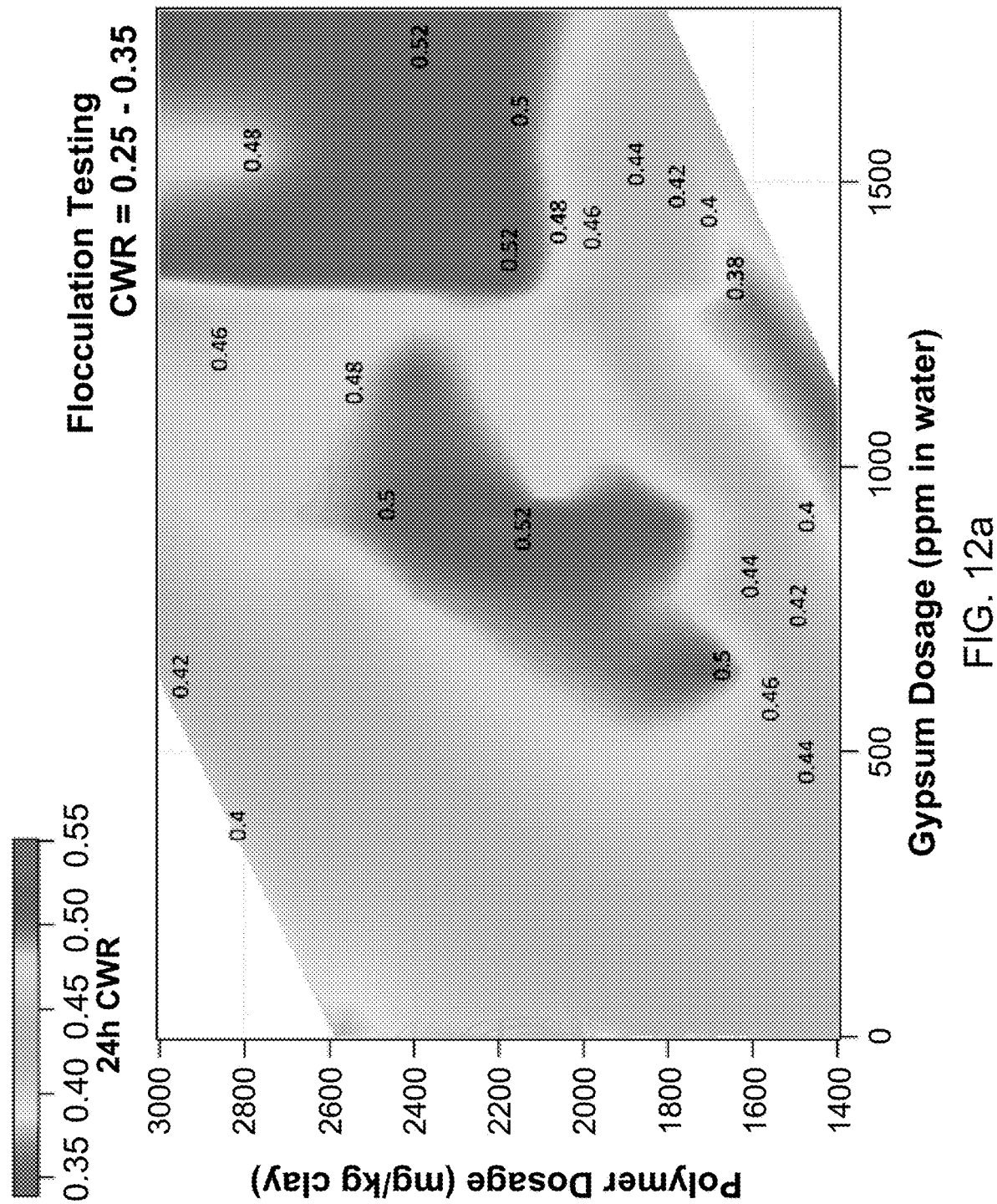
FIGS. 12a and 12b are graphs of polymer flocculant dosage versus gypsum dosage for aPAM polymers B and A respectively.
Figure 12B:
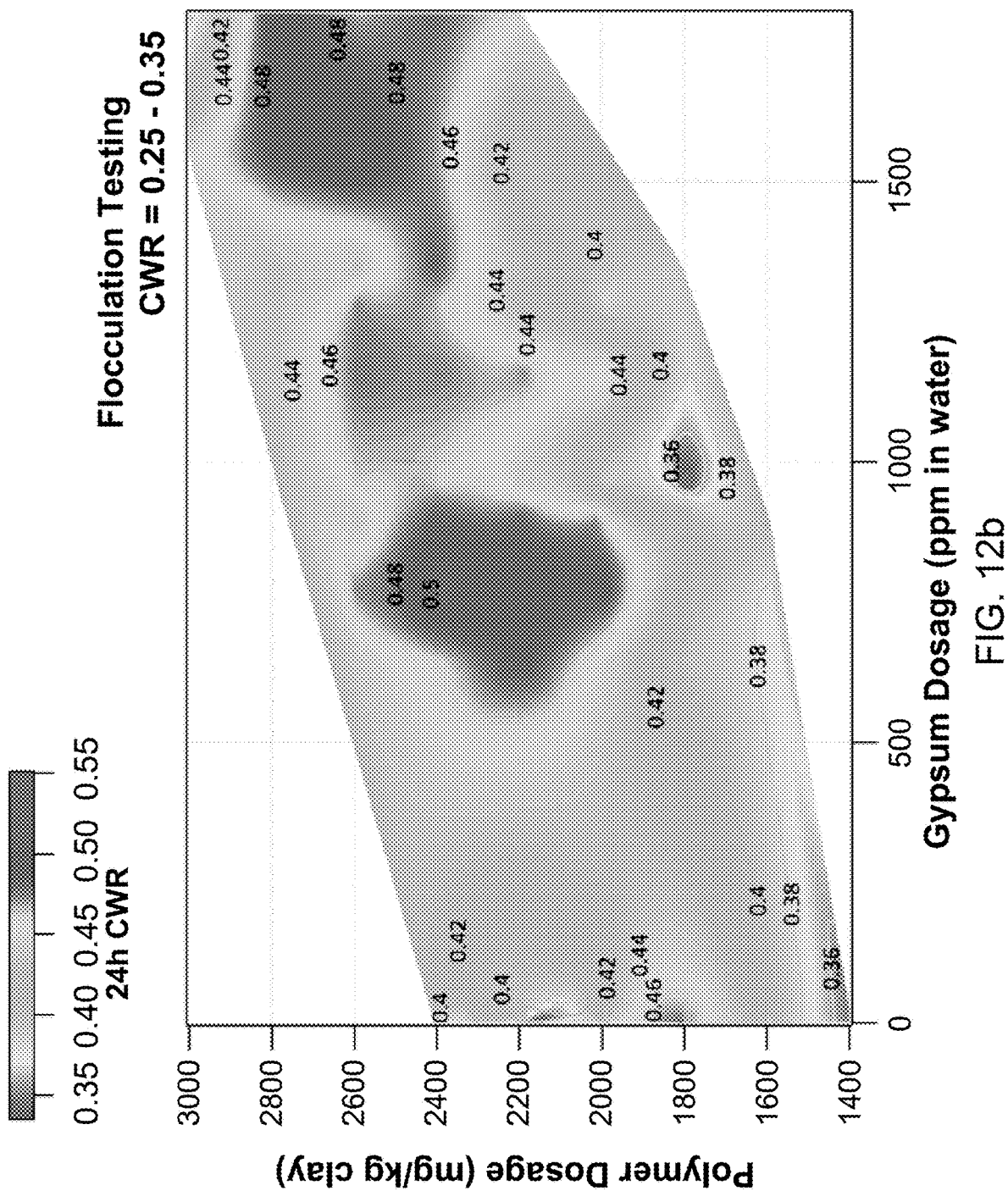

Using the same mixing parameters, the optimum dosages for flocculation (measured by the 24 hour CWR) were evaluated for the aPAM polymers A, B and C. As shown in FIGS. 8a to 8c, the polymer flocculant dosages for optimum flocculation and maximum dewatering tended to increase with alum or gypsum additions for all three aPAMs. In all cases, approximately 0.3 mg/kg-clay to 0.6 mg/kg-clay of additional polymer was required per ppm of alum addition, and slightly less polymer increase for gypsum additions. It should be noted that improvement of the mixing parameters for the immobilization pre-treated MFT should modify the polymer dosage relative to a baseline no-immobilization chemical scenario. FIGS. 12a and 12b show polymer dosage versus gypsum dosage for polymers B and A respectively.

Impact of Alum on MFT Dewatering Performance

Figure 9A:
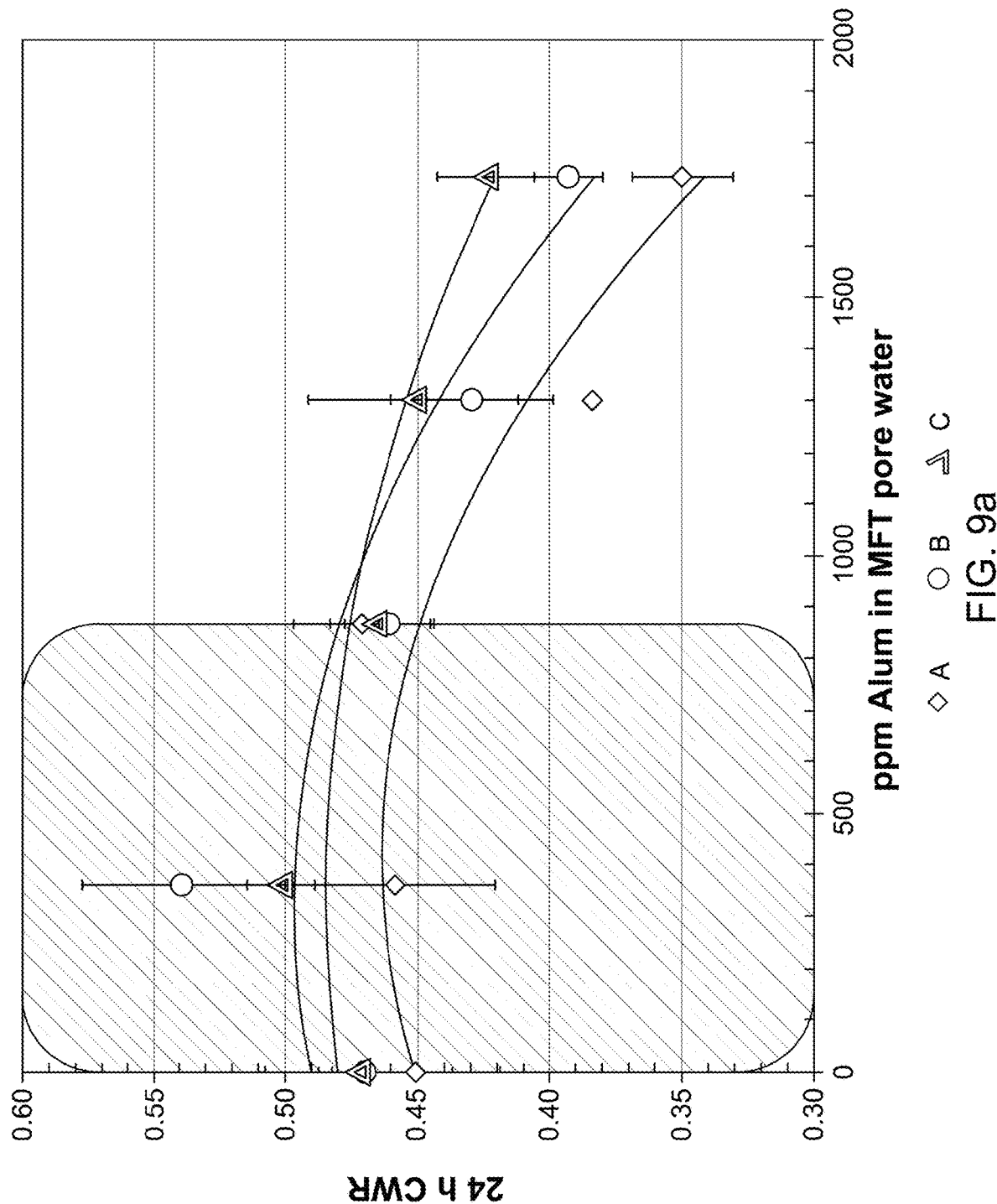
FIG. 9a is a graph of 25 hour CWR versus alum concentration for the three aPAMs.

Extensive investigation was conducted on the dewatering potential of alum-treated MFT at the respective optimum polymer dosages. Again, the mixing parameters were fixed at the optimum for the no-immobilization chemical case and could be enhanced. FIGS. 9a and 9b illustrate the impact of alum addition on dewatering potential and polymer dosage respectively. Below about 950 ppm alum (about 9.5 meq/L $Al^{3+}$), the 24-hour CWR was similar to the no-immobilization chemical case (baseline case) and the clay capture was better for all three aPAMs. Within this range, polymers B and C performed significantly better than polymer A, albeit at higher polymer dosages. At lower alum dosages, polymer C also required the lowest dosage for maximum water release. Referring to FIGS. 9a and 9b, the shaded area (left) is considered similar to the baseline case without immobilization chemical addition, while the unshaded area (right) is considered worse than the baseline case.

To achieve the desired CWR performance in the treatment of these MFT samples, it was found that the alum dosage should not exceed approximately 1000 ppm. At 950 ppm of alum, the TSS, bitumen and metals should meet the performance criteria, and naphthenic acid would be approximately 60% remediated to target levels. To confirm the geochemical performance, the release waters collected after flocculation and 24-hour dewatering were analyzed in a similar fashion to the procedure to obtain the data in FIGS. 4a and 4b. Details of the release water chemistry at alum dosages up to about 1750 ppm were obtained. The geochemical markers at 360 and 950 ppm alum were also obtained.

Referring to FIG. 9a, the CWR at 360 ppm alum is notably higher than the baseline (0 ppm alum) and at 950 ppm alum; however, the TSS and residual bitumen in the release water were found to be higher than desired. With polymer C in particular, the naphthenic acid reduction was approximately 40%. An alum dosage around a maximum CWR (e.g., 360 ppm in FIG. 9a) could be combined with saturated gypsum to maintain or improve the desired CWR while reducing the naphthenic acid concentration. Overall, addition of polymer flocculant appears to have reduced some of the immobilization benefits provided by alum. For example, in FIG. 4 most of the TSS is removed at about 470 ppm alum; but significant residual solids remained at 867 ppm alum especially when used with polymer C. It was also found that naphthenic acids and calcium were largely unaffected by the polymer.

The following Table A provides some release water chemistry results of MFT after flocculation and treatment with 360 ppm and 950 ppm alum:

TABLE A

|  | Base Case (polymers B and C) | Polymer B | | Polymer C | |
| --- | --- | --- | --- | --- | --- |
|  |  | 360 ppm | 950 ppm | 360 ppm | 950 ppm |
| 24 h CWR | 0.47 (±0.04) | 0.54 (±0.04) | 0.46 (±0.01) | 0.50 (±0.01) | 0.46 (±0.02) |
| TSS (ppm) | 3836 (±509) | 2312 | 0 | 1947 | 0 |
| Dissolved salts (conductivity) (μS/cm) | 3730 | 3920 | 4130 | 3720 | 4177 |
| Bitumen in water (ppm) | — | — | 0 | — | 0 |
| Naphthenic Acid (ppm) | 26 | 20 | 12 | 15 | 12 |
| Calcium (ppm) | 10 | 12 | 23 | 14 | 23 |

While a higher alum dosage (>10 meq/L $Al^{3+}$) can improve the release water clarity, it can result in levels of dissolved salts (including calcium and sulphate) higher than operational and closure threshold. Increasing alum dosage was found to increase the dynamic yield stress and viscosity of the MFT, and therefore the mixing intensity required for inline flocculation. Optionally, polymers that can achieve the operational and closure threshold at lower alum dosages can be chosen. Optionally, ferric sulphate and sulfuric acid can be used as alternative immobilization chemicals to alum.

Impact of Gypsum on MFT Dewatering Performance

Figure 10A:
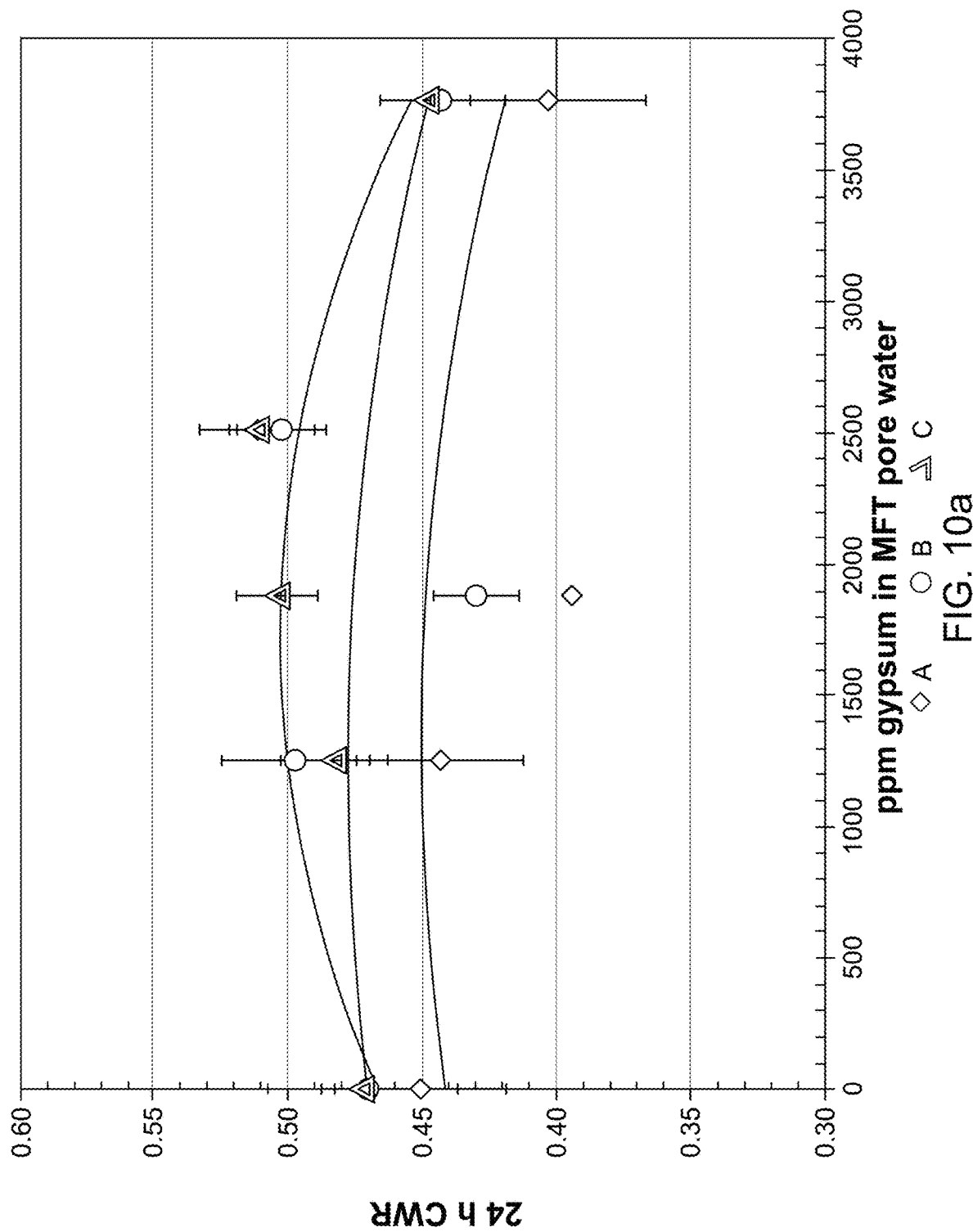
FIG. 10a is a graph of 25 hour CWR versus gypsum concentration for the three aPAMs.
Figure 10B:
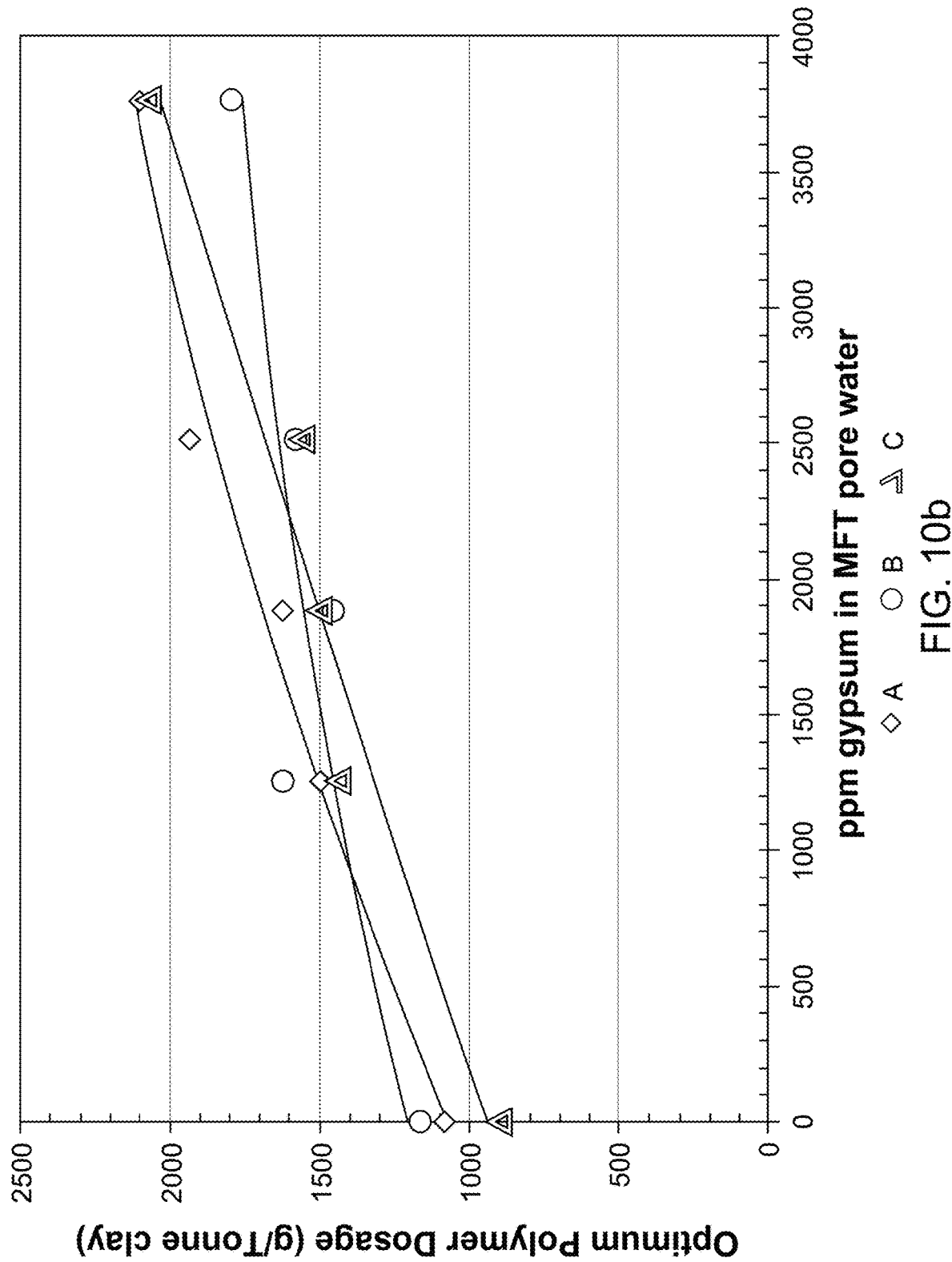
FIG. 10b is a graph of optimum polymer dosage versus gypsum concentration for the three aPAMs.

FIGS. 10a and 10b shows the impact of gypsum addition on the dewatering potential and optimum polymer dosage for MFT flocculated with the three aPAMs. For all the polymers, the 24 hour CWR increased with gypsum concentration up until saturation at about 2500 ppm. The polymer dosage is also notably higher with gypsum additions, but the increase would be reduced with enhanced mixing of the additives. Overall, polymer C displayed the best performance as the tested conditions with gypsum. Geochemical markers for saturated gypsum with polymers B and C are given in Table B:

TABLE B

| | Base Case (polymers B and C) | Polymer B | | Polymer C | |
|---|---|---|---|---|---|
| | | 1250 ppm | 2500 ppm | 1250 ppm | 2500 ppm |
| 24 h CWR | 0.47 (±0.04) | 0.50 (±0.03) | 0.50 (±0.02) | 0.48 (±0.02) | 0.51 (±0.02) |
| TSS (ppm) | 3836 (±509) | 691 | 0 | 636 | 0 |
| Dissolved salts (conductivity) (µS/cm) | 3730 | 4290 | 5010 | 4740 | 5260 |
| Bitumen in water (ppm) | — | — | 0 | — | 0 |
| Naphthenic Acid (ppm) | 26 | 21 | 19 | 23 | 20 |
| Calcium (ppm) | 10 | 33 | 77 | 52 | 113 |

The 24 hour CWR at saturated gypsum addition (2500 ppm) was consistently higher than the base case. Also, at these dosage levels, the TSS and bitumen are removed from suspension. Similar to the results shown in FIGS. 6a, 6b and 7, there is notably lower naphthenic acid removal by saturated gypsum solution from the release water compared to alum at 360 ppm or 950 ppm. The residual conductivity will also lead to higher dilution requirements at closure compared to alum or the base case.

Dewatering Optimization at 950 (±100) ppm Alum

Based on field experience in flocculation and dewatering operations of MFT as well as investigations into fundamentals of chemical mixing, the polymer dosage can be minimized and 24 hour CWR maximized through optimal mixing at mesoscale, i.e., the scale of the bulk of clay mineral particles in a dispersed slurry (between 0.1 µm and 1 µm equivalent spherical diameter). Addition of alum or gypsum changes the clay-aggregate scales and would benefit from optimization. To determine the required range of mixing on a bench scale, an optimized fractional factorial experiment (108) was conducted at two immobilization chemical dosages (0 ppm and 950 ppm alum), three mixer rotations per minute (RPM) (300 RPM (base case), 600 RPM and 900 RPM), three polymer injection rates, and two MFT clay-to-water ratios (0.25 CWR and 0.35 CWR). Polymers B and C, which had given the best results according to previous testing, were selected for this stage of testing.

Figure 11A:
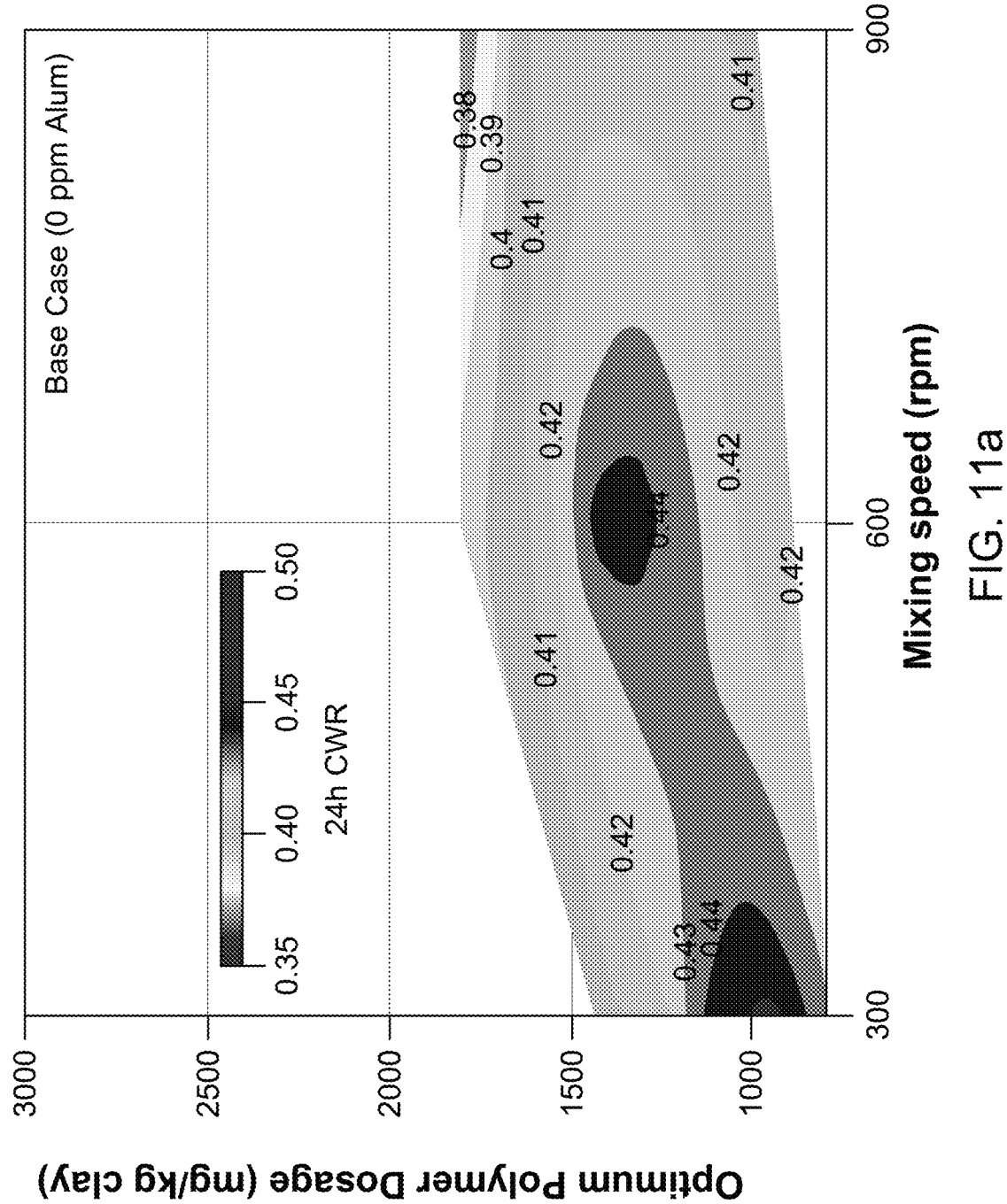
FIGS. 11a and 11b are graphs of optimum polymer dosage versus mixing speed for aPAM polymers B and C, with alum addition.
Figure 11B:
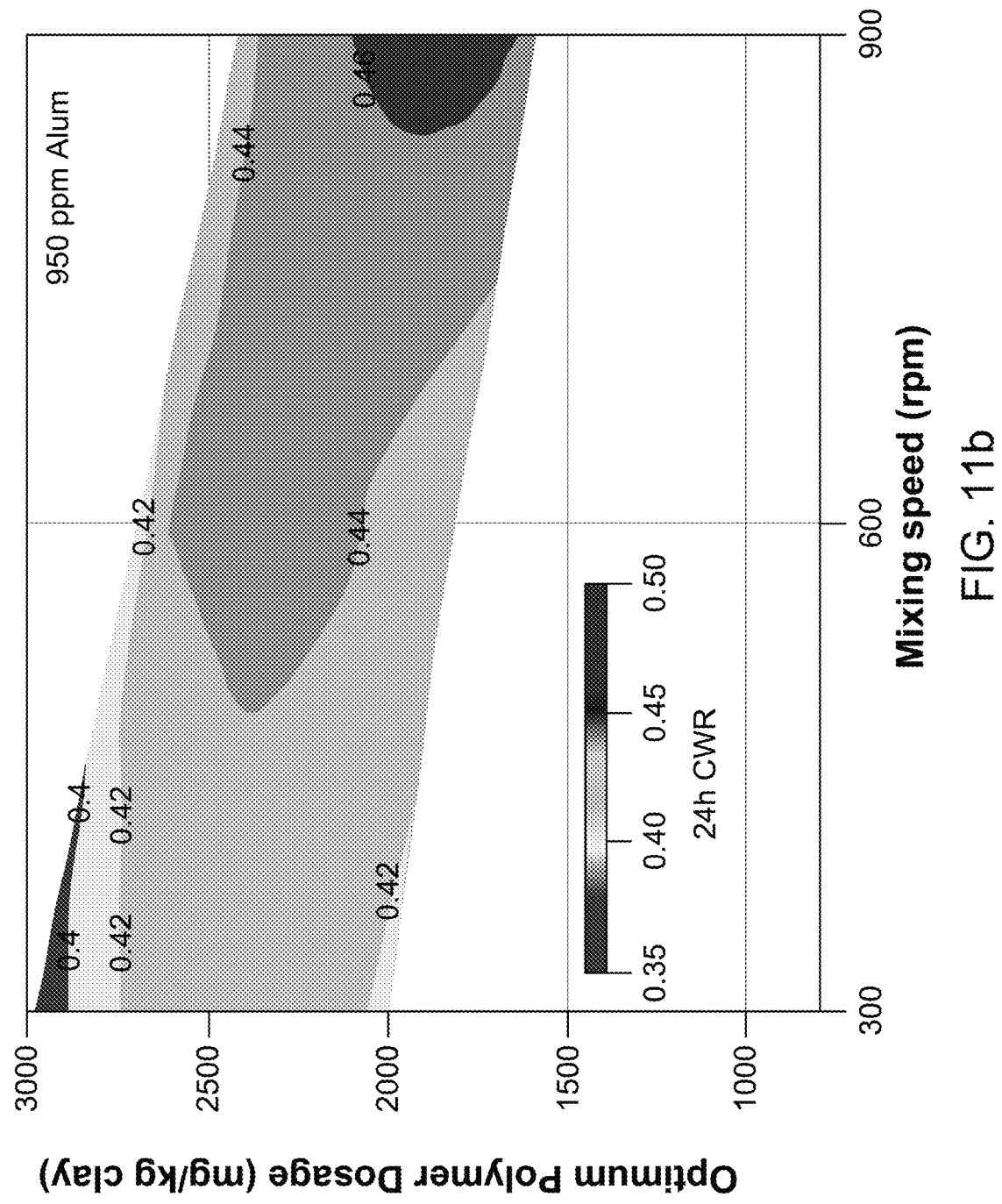

The polymer dosage was optimized at each test condition. FIGS. 11a and 11b show the results for polymer C with and without alum pre-treatment. The mixer was optimized for the base case (0 ppm alum) at 300 RPM with the lowest optimum polymer dosage (about 1000 mg/kg clay) and maximum water release (CWR of about 0.45). Dewatering became progressively worse at 600 RPM and 900 RPM with associated increases in optimum polymer dosage. The alum-treated MFT required higher pre-shear prior to polymer addition, and showed a maximum CWR and minimum dosage at 900 RPM.

It is noted that the mixing could be provided based on the particular immobilization chemical and polymer flocculant used in the process in order to enable greater dewatering and lower polymer dosages particularly for the larger scale operations. Mixing design and control could include, for example, special injector designs and/or dilution control.

Characteristics of PASS Performance Via In Situ Dewatering

Operational Performance

Certain aspects of the operational performance of the PASS are provided below.

Volume Reduction

The deposited or discharged treated MFT is expected to be at a steady state CWR≤0.65 during operations and continue to densify and consolidate after the end of mine life (EOML). The consolidation rate can be determined via additional bench scale studies and/or monitoring of a field prototype. Based on bench scale studies, the use of 950 ppm alum or saturated gypsum in the MFT slurry did not reduce the CWR achievable in the field relative to a base case in which no immobilization chemical is used.

Recycle Water Quality

At 950 ppm alum, the unmitigated residual calcium in the recycle water would be within the desired operating envelope for certain heat exchangers in which anti-scaling agents are used. For gypsum-treated MFT, the residual calcium is about 100 ppm and would benefit from additional mitigation within the operating envelope for certain heat exchangers. The calcium concentration in the release water and/or cap water can be monitored and calcium reduction can be implemented depending on the equipment (e.g., heat exchanger) or process requirements to which the water is recycled. Calcium levels can be reduced by dilution with other water streams, exchanging for sodium on clay surfaces, and/or precipitating as calcium carbonate prior to incorporation into certain equipment or unit operation of the extraction process.

In addition, an unmitigated increase in the total dissolved salts and reduction in bicarbonate of the recycled water could have a negative impact on bitumen recovery. Using water chemistry data, the bitumen recovery loss due to increased salt levels was estimated to be about 0.5 wt % for 950 ppm alum and about 2 wt % for MFT treated with saturated gypsum. The bitumen recovery losses can also become progressively greater with increasing clay content in the oil sands ore.

Closure Performance

Certain aspects of the closure performance of the PASS are provided below.

Suspended Solids

Without alum or gypsum addition, the water cap of the PASS is expected to contain significant amounts of suspended solids, which are currently difficult to mitigate at large scales. Suspended solids in the water column would also be exacerbated during the spring and fall pond turnover events. At 950 ppm alum and 2500 ppm gypsum, the TSS is expected to be close to zero. Pond turnover would generate suspended solids during the event, but would settle fairly rapidly depending on the aggregate sizes of the aggregated solids.

After closure, fresh water dilution provided would change the chemistry of the water cap of the PASS. Negative impacts of the chemistry change on suspended solids could be mitigated by controlling the dilution water (e.g., fresh or surface run off rather than process water with high bicarbonate content). In addition, capping the sediment layer with a coarse material (e.g., coke or sand) could mitigate against re-suspension of fine solids or bitumen during pond turnovers. The coarse material could be distributed over the water cap (e.g., via an aqueous slurried stream containing the coarse material pumped to the PASS) and the coarse material would then settle by gravity onto the lower layer of sediment. This intermediate layer could be used to cap the mud layer, which is the interface between water and the sediment, at the end of operation and start of reclamation. For example, coke could be slurried through the water cap and would be light enough to stay on top of the mud layer. The coke layer or another type of intermediate layer could facilitate minimizing the flux of CoCs between the lower deposit and the water cap. Coke could potentially adsorb some of the CoCs. Other particular material could also be used, particular those that are porous and have absorptive properties.

Bitumen in Suspension

Bench scale studies suggest that bitumen immobilization within the sediment tracks suspended solids removal. This can be at least partly due to negatively charged bitumen surface being able to coagulate with cations similar to the negatively charged clay surfaces. Calcium, magnesium or an aluminum hydroxyl complex could bridge destabilized clay particles to bitumen droplets, thereby chemically immobilizing bitumen within the sediment. This mechanism has been observed in primary bitumen extraction where overly high calcium content in the process or ore connate water can depress flotation of bitumen into the froth layer.

Microbial activity due to increased concentrations of sulphate and possible availability of easily degradable organic carbon (e.g., from aPAMs or bitumen light fractions) could generate gas. Gas bubbles can potentially refloat bitumen droplets into the water column if the bitumen is insufficiently immobilized. However, microbial activity further degrades bitumen and promotes mineral adsorption on bitumen surfaces, which, in turn, can inhibit bitumen flotation. Both alum and gypsum at the appropriate dosages should immobilize bitumen through to reclamation and inhibit substantial remobilization or flotation. The immobilization chemicals and polymer flocculant can be selected and dosed such that gas-induced floatation of bitumen is inhibited within the PASS.

Regulated Metals

Figure 13A:
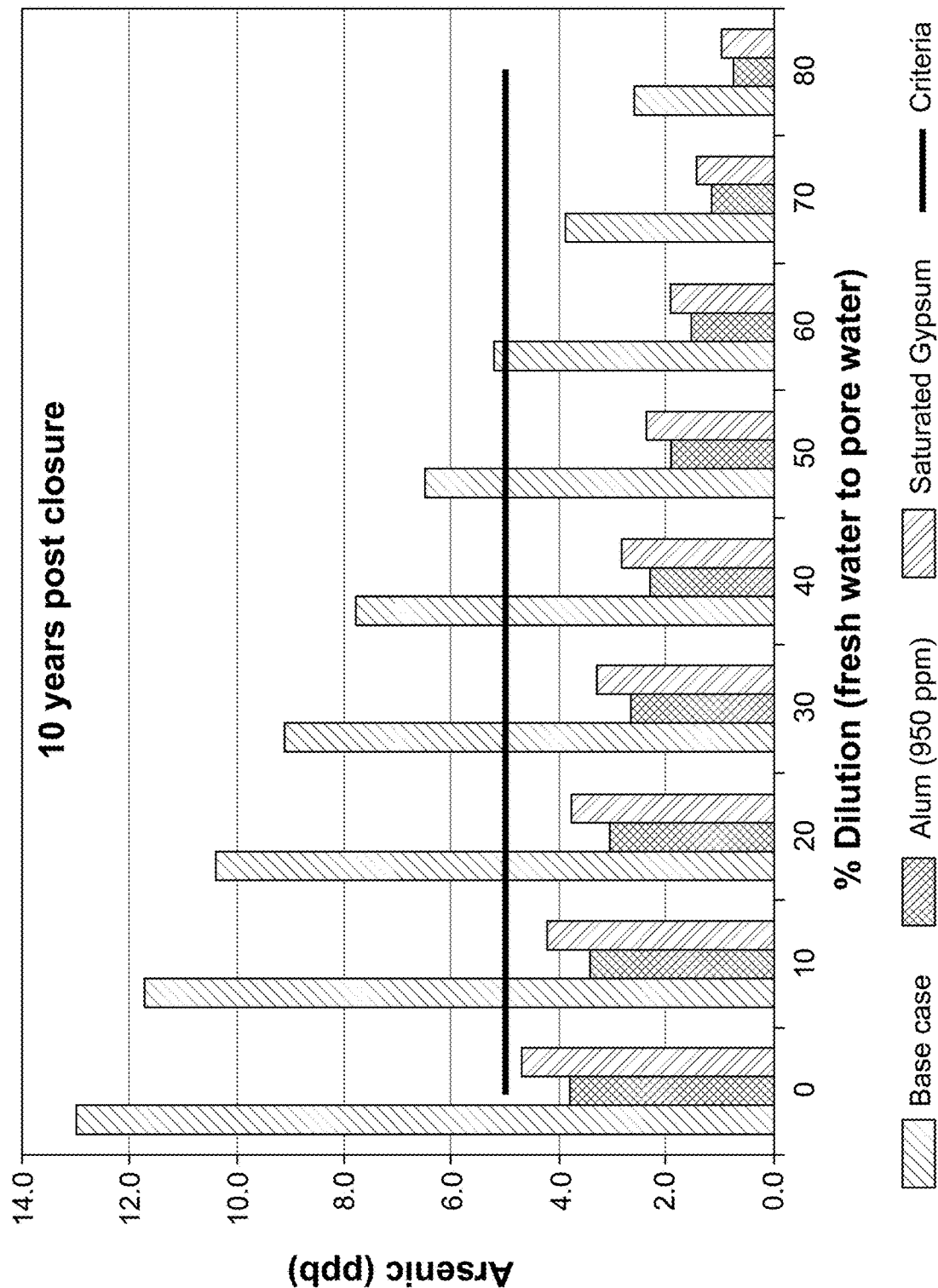
FIGS. 13a and 13b are graphs of metal concentration (arsenic and selenium) versus percentage of dilution with fresh water to reduce concentrations below target levels 10 years after PASS landform closure.
Figure 13B:
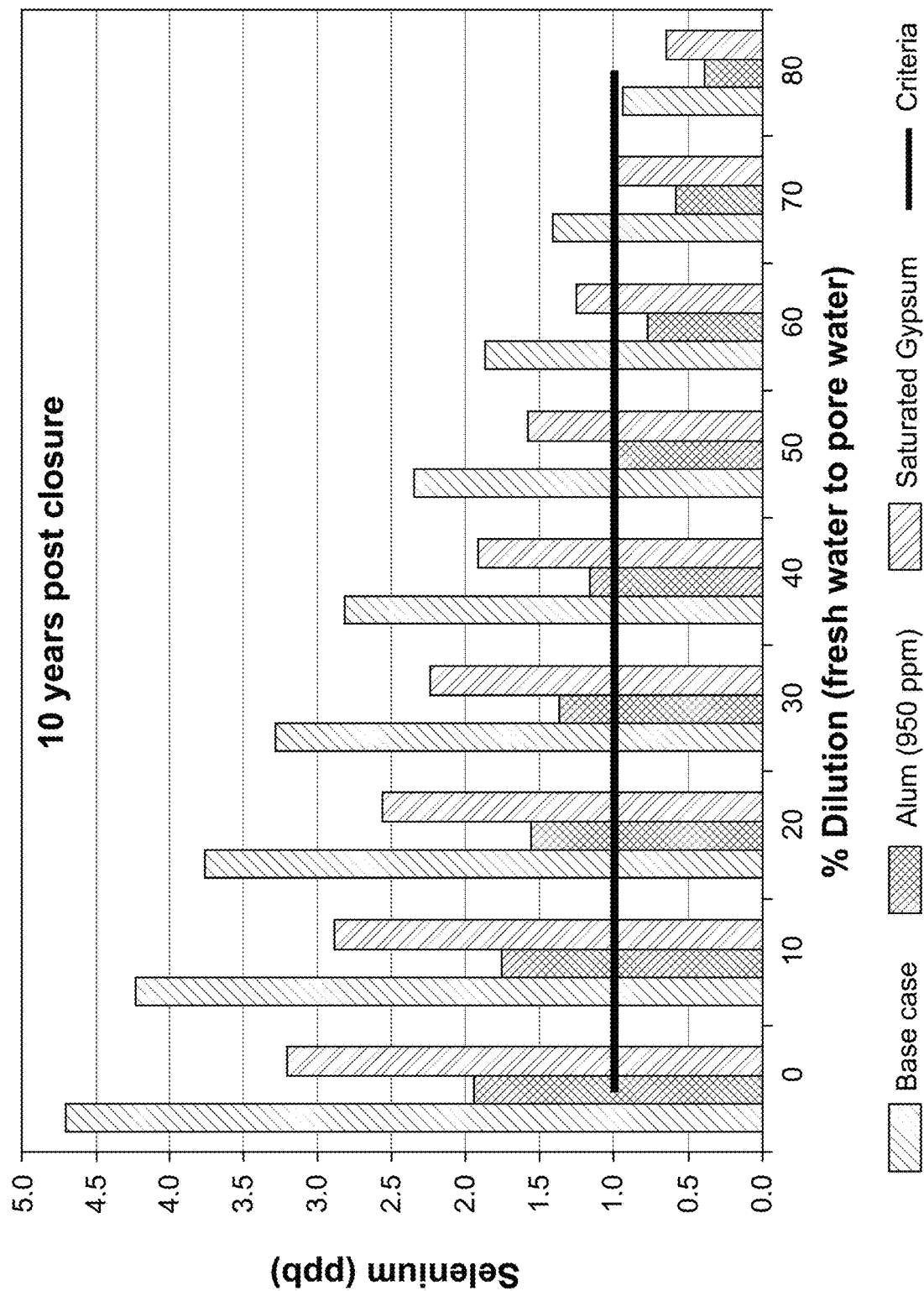

Arsenic and selenium are the primary metals in exceedance of fresh water guidelines for aquatic life for certain example MFT samples under study. Referring to FIGS. 13a and 13b, the dilution evaluation was based on the pore water chemistry of MFT samples obtained from a particular tailings pond and used in this study and on the process water used for MFT dilution. FIGS. 13a and 13b show the amount of fresh water dilution to bring the landform release water within the target limits for arsenic and selenium. Wth no immobilization chemical, approximately 80% fresh water dilution is required compared to 50% for 950 ppm alum and 70% for saturated gypsum, for example. It should be noted that these levels are derived from the 3 wt % MFT slurry. Lower selenium levels in the MFT pore water suggest that lower or no dilution would be required to bring selenium down to 1 ppb for undiluted cases.

Toxicity and Naphthenic Acid

Figure 14:
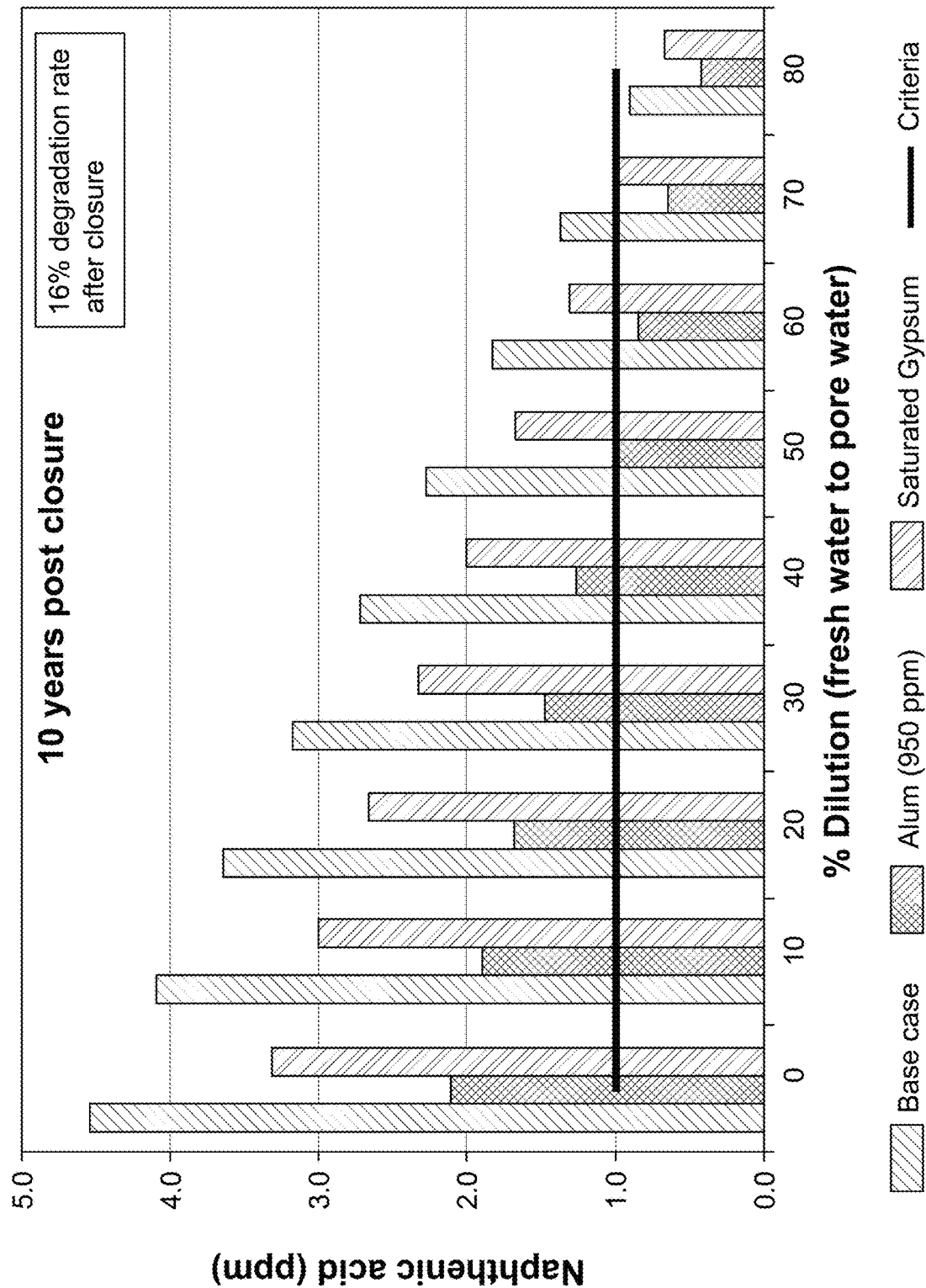
FIG. 14 is a graph of naphthenic acid concentration versus percentage of dilution with fresh water.
Figure 15:
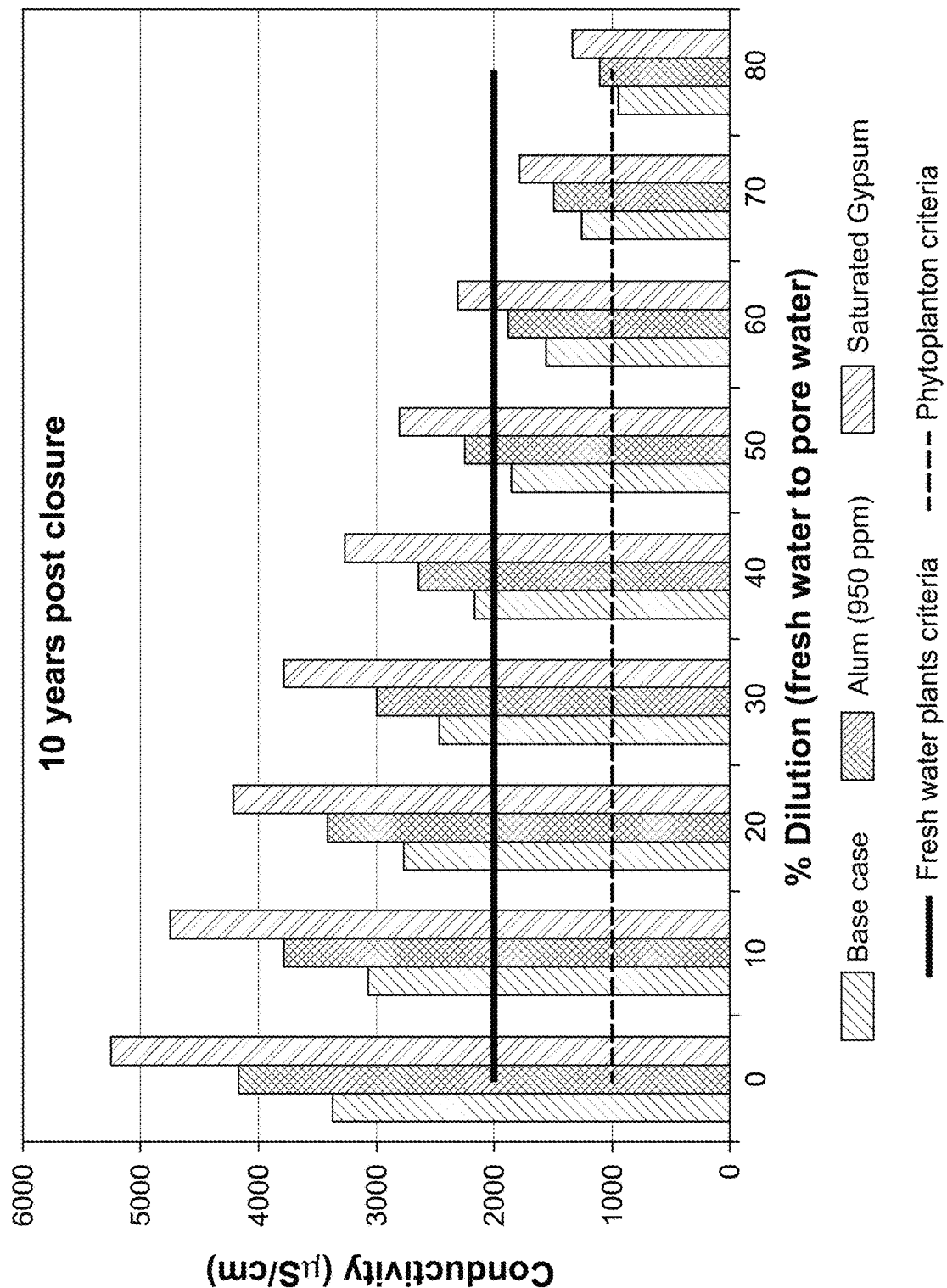
FIG. 15 is a graph of hydraulic conductivity versus percentage of dilution with fresh water.
Figure 16:
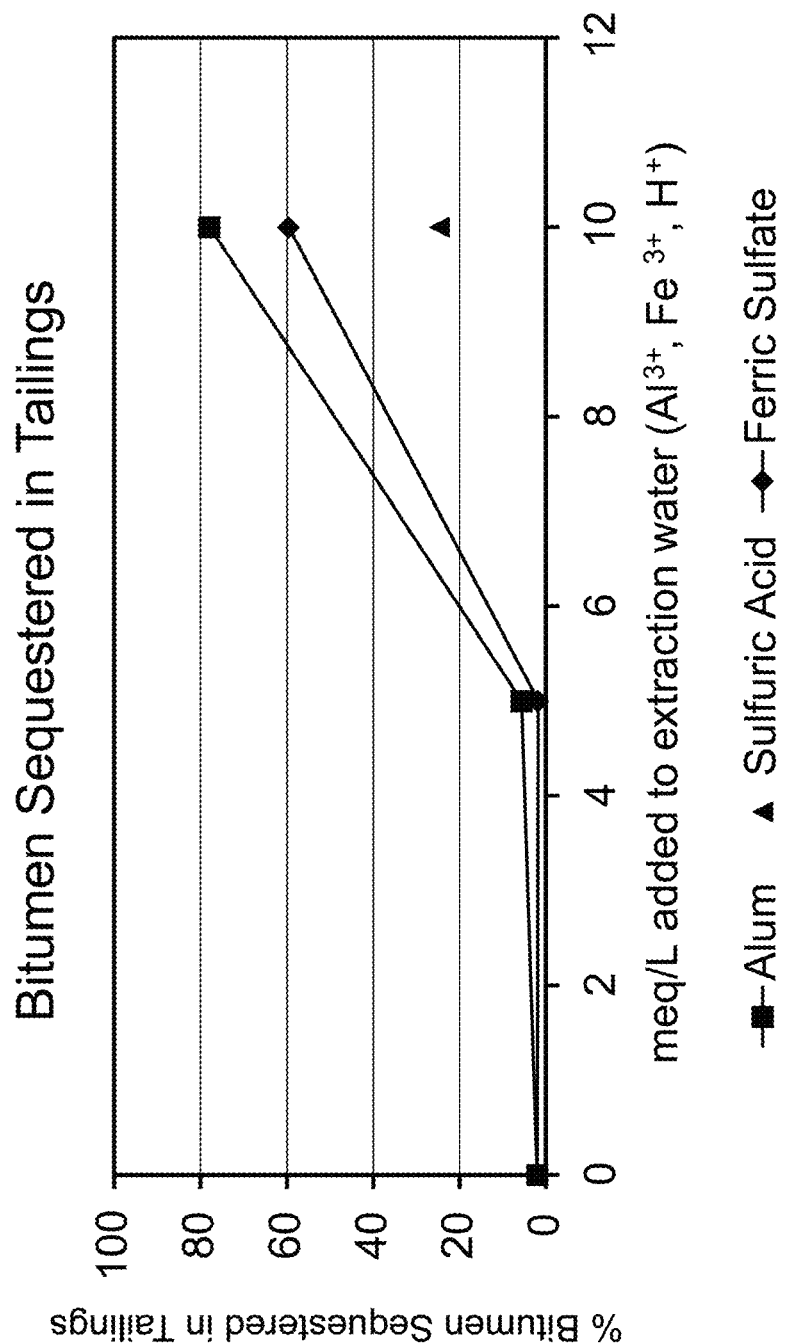
FIG. 16 is a graph of percentage of bitumen sequestered in tailings versus immobilization chemical dosage for alum, sulfuric acid and ferric sulphate.
Figure 17:
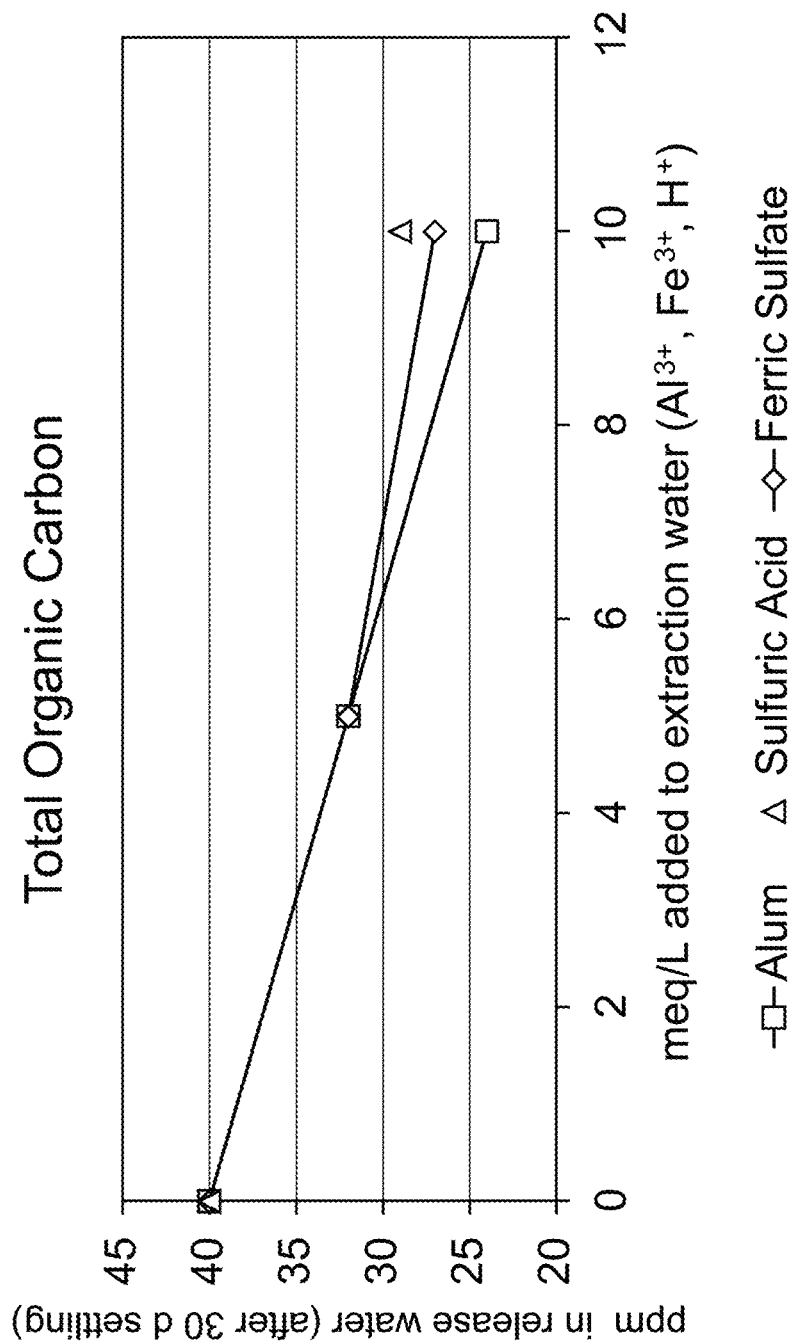
FIG. 17 is a graph of total organic carbon content in release water versus immobilization chemical dosage for alum, sulfuric acid and ferric sulphate.
Figure 18:
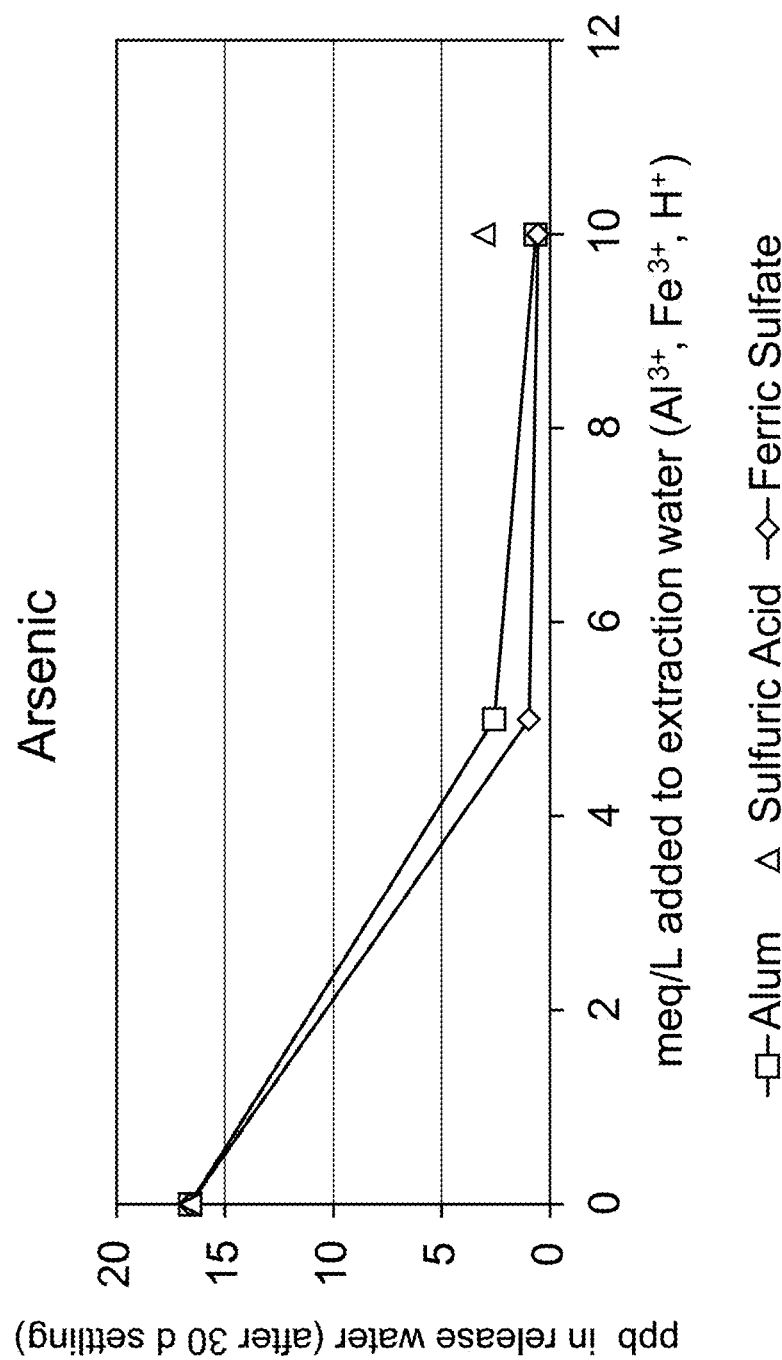
FIG. 18 is a graph of arsenic content in release water versus immobilization chemical dosage for alum, sulfuric acid and ferric sulphate.
Figure 19:
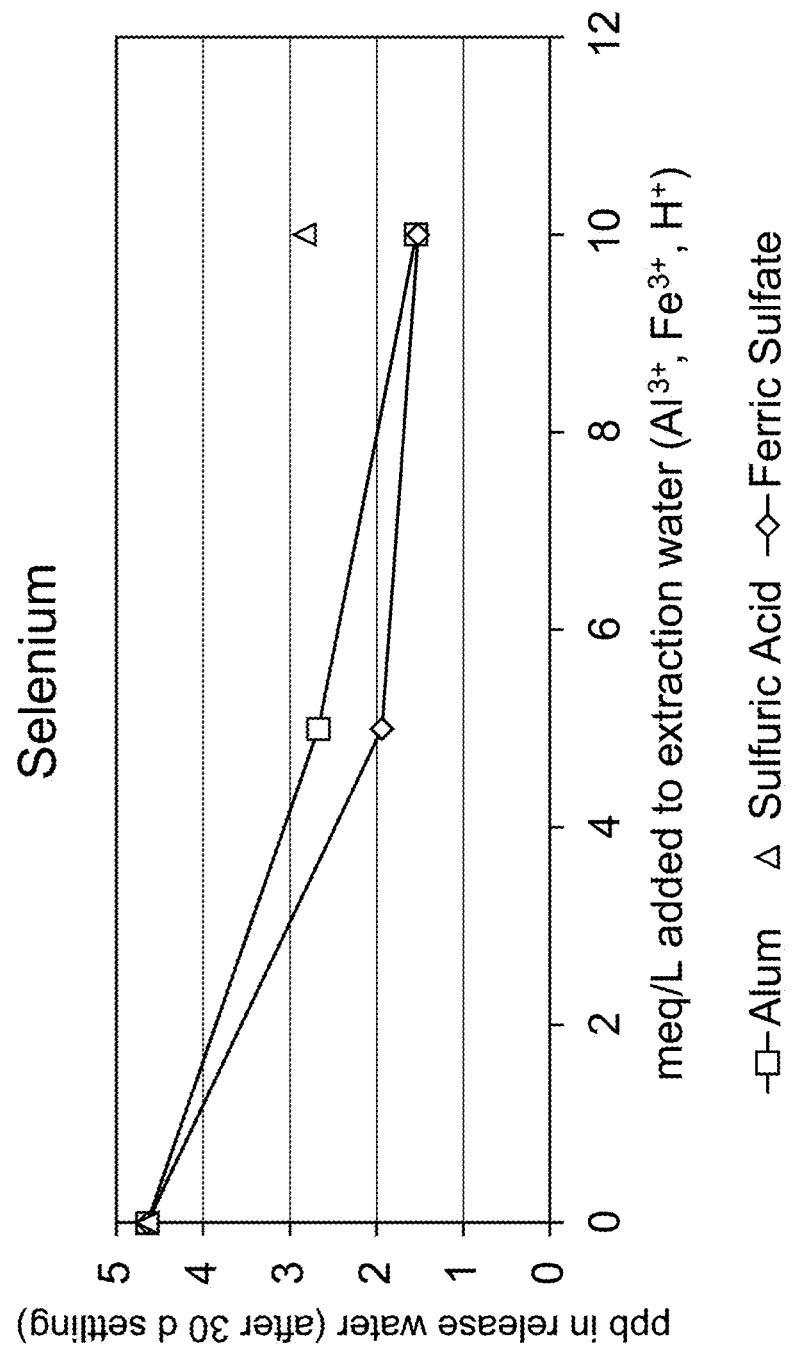
FIG. 19 is a graph of selenium content in release water versus immobilization chemical dosage for alum, sulfuric acid and ferric sulphate.
Figure 20:
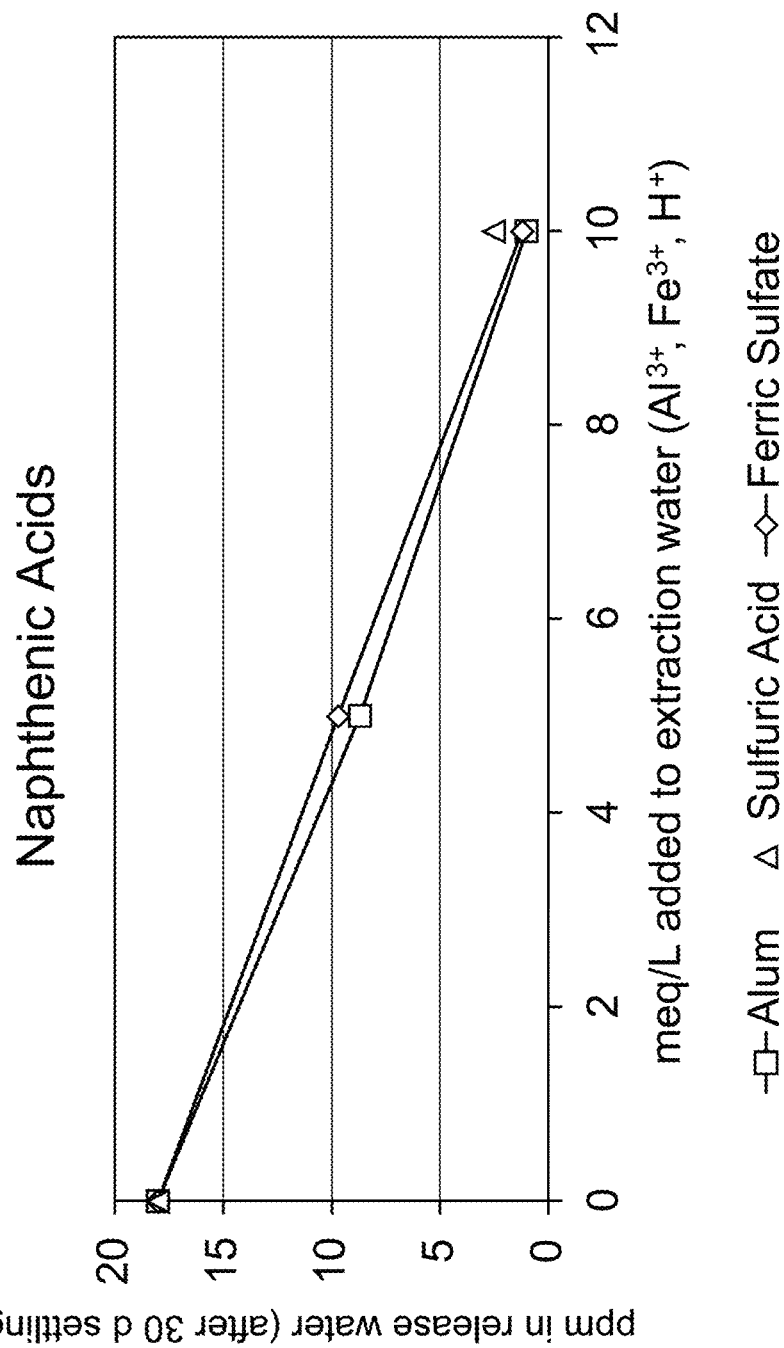
FIG. 20 is a graph of naphthenic acids content in release water versus immobilization chemical dosage for alum, sulfuric acid and ferric sulphate.

In some scenarios, certain CoCs or categories of CoCs can be used as a proxy for toxicity. For instance, for certain MFT materials naphthenic acid can be used as proxy for the toxicity. Unlike metals, naphthenic acids degrade at a notable rate (e.g., at about 16% per year in column tests and even more rapidly within years at larger commercial scale operations). Referring to FIG. 14, using the lower degradation rates for design prudence, ten years after PASS closure the concentration of naphthenic acid would be significantly reduced and would require minimal dilution with fresh water. Approximately 70% dilution would be required to remediate the saturated gypsum treated PASS landform to target levels. Alum treatment would require approximately 50% dilution. At faster naphthenic acid degradation rates that have been observed, the naphthenic acid concentration would be below 1 ppm within only 7 years with no immobilization chemical addition. In this regard, "dilution" percentage refers to the percentage fresh water with respect to the overall water. Thus, for 70% dilution, there is 70% fresh water and 30% from the original process affected water in the tailings. The dilution percentage is the volume percentage of fresh water to bring the water cap within target guidelines for a fresh water lake, and is primarily guided by the salt level which certain immobilization chemicals cannot remediate.

Dissolved Salts

Fresh water dilution is advisable to bring the dissolved salts down to levels that can support freshwater organisms. The electrical conductivity of 340 µS/cm was used for fresh river water in this analysis. At 2000 µS/cm, the release water can support freshwater plants, and below 1000 µS/cm phytoplankton can be supported. With no immobilization chemical, 50% and 80% dilutions are required to achieve the freshwater plants and phytoplankton criteria respectively. For alum additions at 950 ppm, a 60% dilution can be required for freshwater plants and up to 80% for phytoplankton, while about 70% dilution can be required to meet the freshwater plants criterion for gypsum, according to the example dosages obtained pursuant to the testing described herein. If, at maximum dilution rates, saturated gypsum treatment is not able to meet the phytoplankton criteria and/or the salt loading in the process water and the pore water of the MFT increase during the life of mine, water treatment can be implemented accordingly.

In summary, according to the studies based on example water and tailings properties, a 50% to 60% fresh water dilution of 950 ppm alum treated landform would meet geochemical criteria to support freshwater plants, and 80% fresh water dilution would ensure support for all freshwater aquatic organisms within a ten-year timeframe. For gypsum, fresh water dilution at the maximum 80% would meet all criteria except for freshwater aquatic organisms. In the corresponding base case, although an 80% dilution would meet the criteria for freshwater aquatic organisms, the suspended solids and bitumen migration in the water column would not be mitigated by fresh water dilution and would have to be dealt with via other means.

Impacts of Water Chemistry on Dewatering Operations

Studies were conducted to evaluate potential impacts of increasing process water ionic strength on MFT drying operations. The ionic strength increases that were investigated were from NaCl (ore connate water) and flue gas desulfurization (FGD) gypsum. Other additives, including reverse osmosis reject brine solutions or evaporator feed with high organic acids, were also tested.

In these studies, the NaCl or Flue Gas Desulfurization (FGD) gypsum salts were introduced into the polymer make-up water which was about 10% of the total water in MFT. Manipulating the salt content of the polymer make-up water was operationally less intrusive and offers greater process performance predictability than adding salt directly into the MFT flow. Other additives were also tested. A 0.45% polymer solution was created for each additive. Polymer A was used. A dose sweep was conducted to determine the optimum dose for the MFT sample. Optimally flocculated MFT was stacked in 2 cm lifts and allowed to drain for 24 hrs to determine the initial water release (or net water release) and the release water chemistry. Evaporation of the lifts was monitored over a week until completely dried.

In terms of the findings, the use of saturated gypsum, reverse osmosis reject brine solutions or evaporator feed with high organic acids did not significantly impact flocculation of MFT or the release water chemistry. Increases in PEW TDS to a maximum of about 5500 ppm in future operations would not significantly impact flocculation efficiency or release water chemistry, although polymer dosage can increase by about 10%. For a saturated gypsum make-up water, the optimum polymer demand increased by 15%. In addition, for polymer make up water saturated with gypsum, adsorption of $Ca^{2+}$ on clays limited the $Ca^{2+}$ in the 24-hour release water to below 30 ppm. The $Ca^{2+}$ concentration from recycle water resulting from the use of a saturated gypsum solution for polymer make-up, should not have a significant impact on pipe scaling or bitumen extraction. Furthermore, the $Ca^{2+}$ appeared to improve the initial evaporation rate of 2 cm lifts. In addition, run off from dried MFT with reverse osmosis brine and evaporator feed had TDS higher than PEW and varied with the TDS in the polymer water; high gypsum concentrations did not significantly increase TDS in the runoff; and runoff water quality can be better in the field compared to lab work as only exposed surfaces are impacted in field operations.

It was found that salts additives can reduce the maximum drying rate (including sub-aerial deposition cell utilization) determined for existing MFT drying operations. For FGD gypsum, this would indicate that large amounts of gypsum should not be stored in the dried MFT matrix; and for high NaCl make-up water, a mitigation strategy can be implemented to reduce NaCl content in the waters (MFT pore water and/or polymer make-up water) present in the MFT drying process, particularly as higher NaCl concentrations occur as PEW salts cycle up. Increased TDS in runoff water can also merit mitigation strategy to reduce the impact on recycled water that influences PEW chemistry. A reduction in the geotechnical stability of the deposit due to salt additions would also warrant assessment to reduce potential negative impacts on final reclamation on closure.

PASS Process Modelling and Experimentation

Additional experimentation and modelling were conducted regarding target steady-state CWR of the treated material in the PASS. An exemplary target was a CWR of at least 0.65 within one year of discharge into the PASS structure.

Process modelling strategy included evaluation of the parameters influencing the dewatering rate and the steady-state CWR. Dewatering rate is considered to vary according to the floc size distribution and the floc density of the coagulated and flocculated MFT, and therefore according to the CWR of the MFT, the immobilization chemical and flocculant dosage and the shear history. The steady-state CWR is considered to vary according to deposit depth (also referred to as total stress) and floc size distribution and density of the coagulated and flocculated MFT.

The following equation was used to empirically model the CWR as a function of time with a variable slope.

$$CWRt = CWR_{t=0} + \frac{(CWR_{t=\infty} - CWR_{t=0})}{\left(1 + \left(\frac{T_{50}}{T}\right)^{Rate}\right)}$$

$CWR_{t=0}$ and T (days) are independent variable $CWR_{t=\infty}$ is the final (steady state) CWR $T_{50}$ is the time to reach 50% of the total strain ($CWR_{t=\infty} - CWR_{t=0}$)

Rate is a dimensionless quantity to characterize the relative "deformation or strain rate". It is the slope of the logistic function—a logarithm slope. So, Rate <1 is very rapid initial settling and >1 is slower initial settling.

The above empirical model resulted from experimentation including columns tests filled with coagulated and flocculated MFT. The experimental matrix include varying the initial CWR, cMFT preshear, immobilization chemical and polymer dosages and several levels of cfMFT shear. Each output cfMFT is allowed to settle over a period of several months in columns between 10 cm to 200 cm tall, and the settling profile continuous monitored. Once the columns have reached steady state (from a few days to several months depending on the input variables), the sediment layer is sectioned and analyzed for density, clay content and pore water chemistry. Full geochemical and toxicology analyses are also conducted on the release water.

Steady-State CWR ($CWR_{t=\infty}$)

Figure 34:
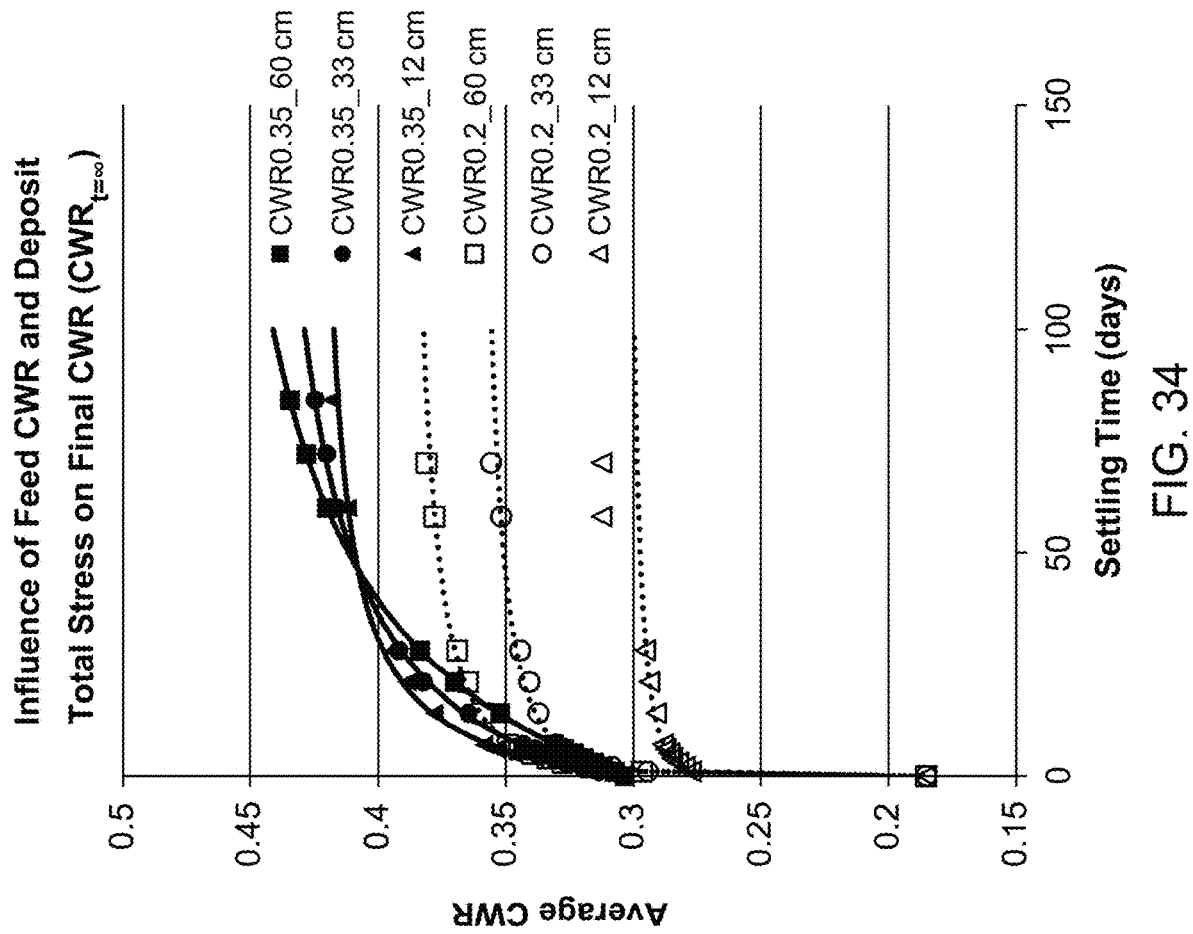
FIG. 34 is a graph of CWR versus settling time for two feed CWR and three deposit height.

Major variables influencing steady-state CWR include feed CWR and deposit height (also referred to as total stress). More precisely, $CWR_{t=\infty}$ increases as feed CWR increases (Floc density increases with feed CWR). In addition, $CWR_{t=\infty}$ increases with deposit height (self weight). Experimentation parameters and results for two columns with respective feed CWR of 0.35 and 0.2 are reproduced below in Table C and the modelled CWR reported in FIG. 34.

TABLE C

| Feed CWR_ Column ID | Column Height (cm) | cfMFT Shear Rate (1/s) | Alum Dosage (ppm) | Polymer Dosage (g/T) | Final $CWR_\infty$ | $CWR_{t=300\ d}$ |
|---|---|---|---|---|---|---|
| 0.35_R07 | 56 | 12 | 1200 | 1600 | 0.49 | 0.47 |
| 0.35_R07 | 33 | 12 | 1200 | 1600 | 0.46 | 0.45 |
| 0.35_R07 | 11 | 12 | 1200 | 1600 | 0.43 | 0.42 |
| 0.2_R15 | 56 | 12 | 950 | 1400 | 0.40 | 0.39 |
| 0.2_R15 | 33 | 12 | 950 | 1400 | 0.37 | 0.36 |
| 0.2_R15 | 10 | 12 | 950 | 1400 | 0.31 | 0.30 |

Figure 35:
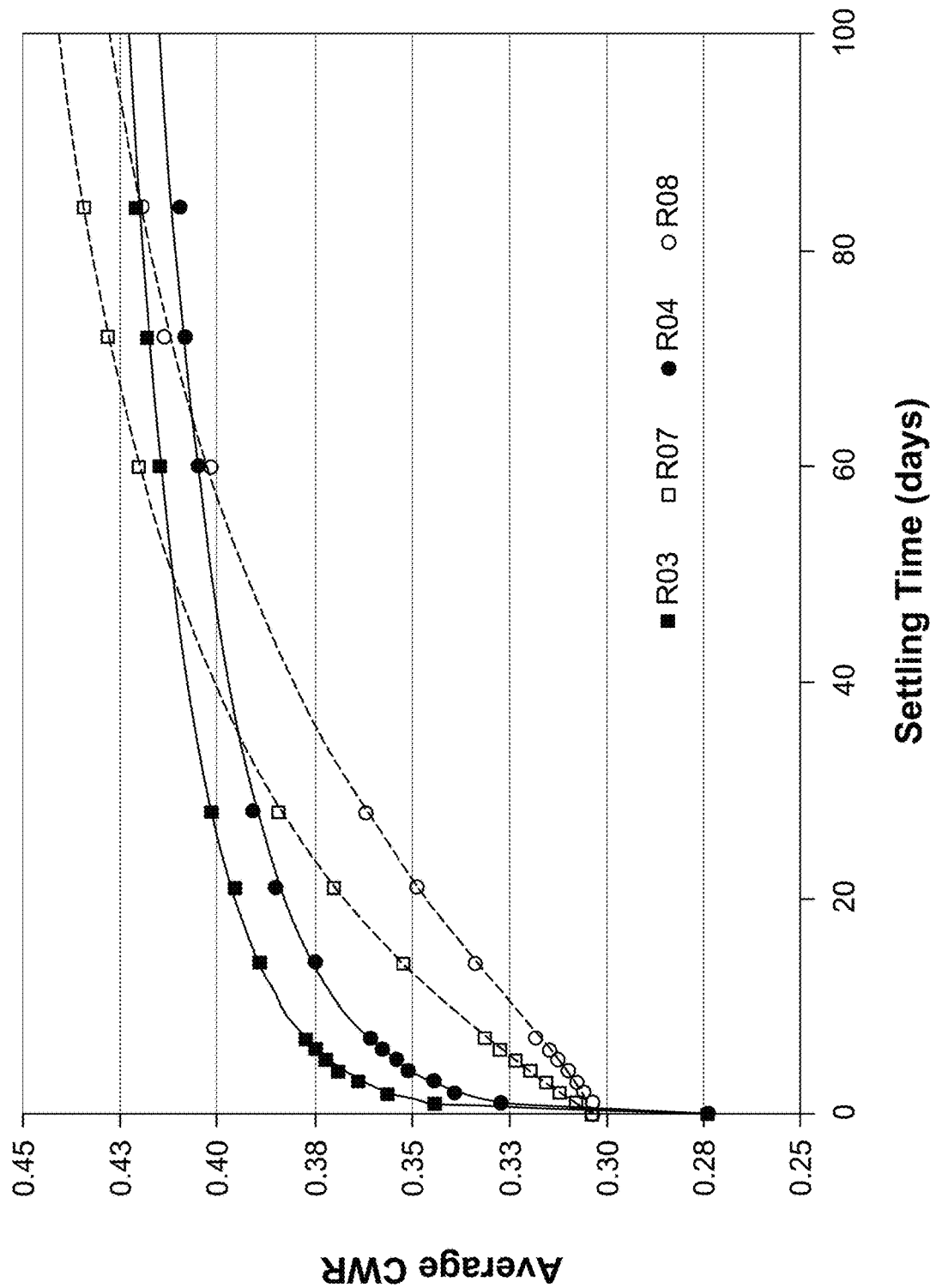
FIG. 35 is a graph of CWR versus settling time for two polymer dosages and two shear rates.

Minor variables influencing steady-state CWR include polymer dosage and shear rate. More precisely, experimentations showed that high polymer dosage and high shear rate reduce $CWR_{t=\infty}$. Longer shear duration appears to favor enhanced floc packing efficiency. Experimentation parameters and results are reproduced below in Table D and the corresponding modelled CWR illustrated in FIG. 35.

TABLE D

|  | Column ID | | | |
|---|---|---|---|---|
|  | R03 | R07 | R04 | R08 |
| Polymer (g/T clay) | 3200 | 1600 | 3200 | 1600 |
| Shear Rate (1/s) | 12 | 12 | 45 | 45 |
| Total Energy (kJ/m$^3$) | 377 | 413 | 1260 | 709 |
| CWR$_{300d}$ | 0.44 | 0.45 | 0.43 | 0.46 |
| CWR$_\infty$ | 0.51 | 0.49 | 0.48 | 0.48 |

Settlement Rate (Rate)

Figure 36:
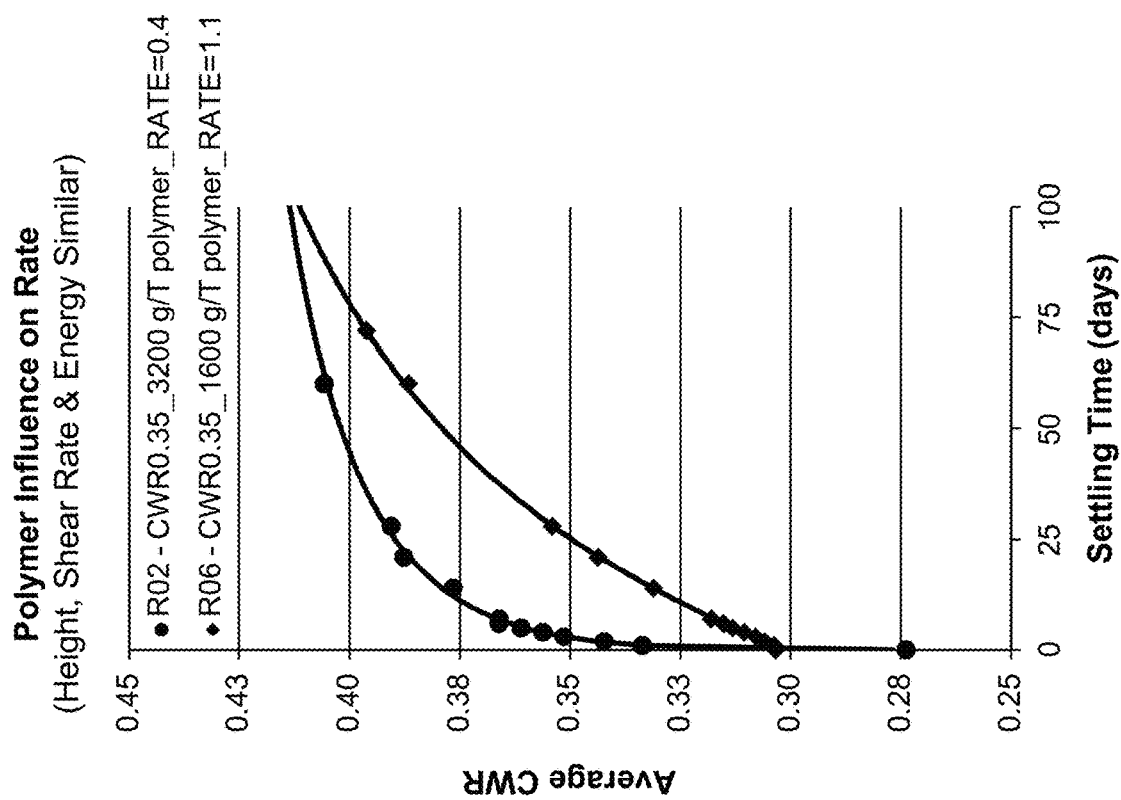
FIG. 36 is a graph of CWR versus settling time for two polymer dosages and two Rates.
Figure 37:
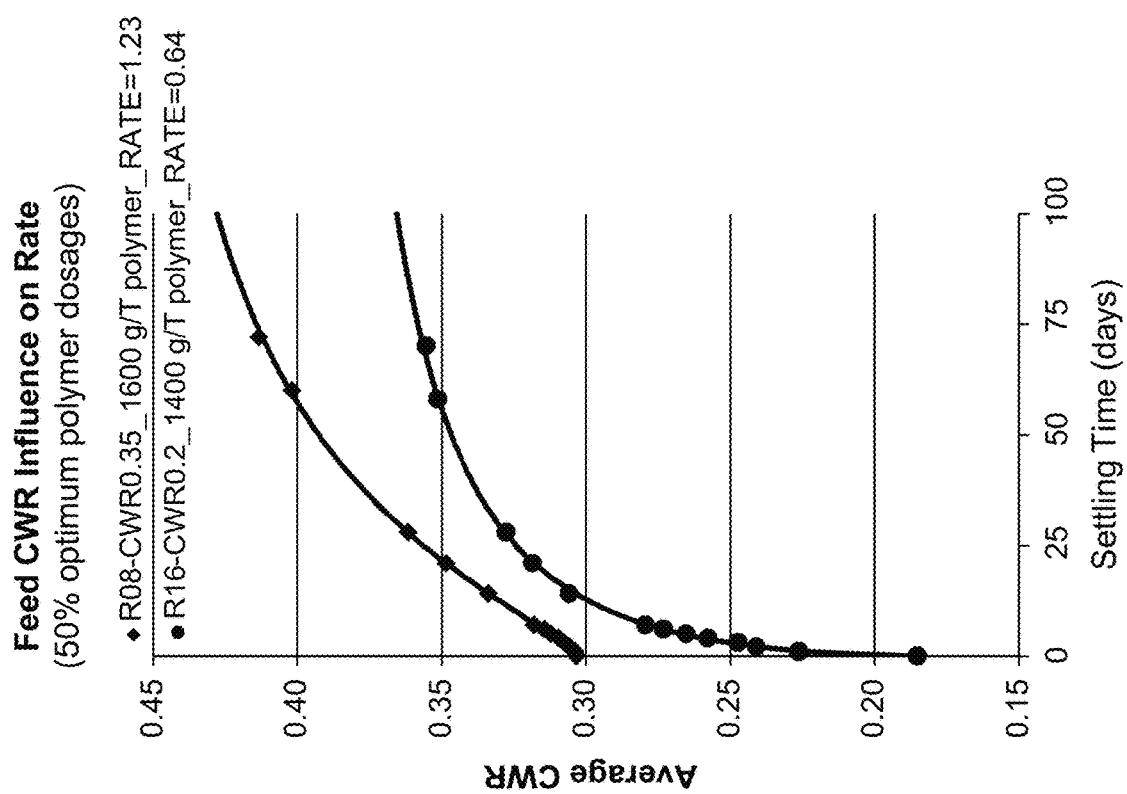
FIG. 37 is a graph of CWR versus settling time for two feed CWR and two Rates.
Figure 38:
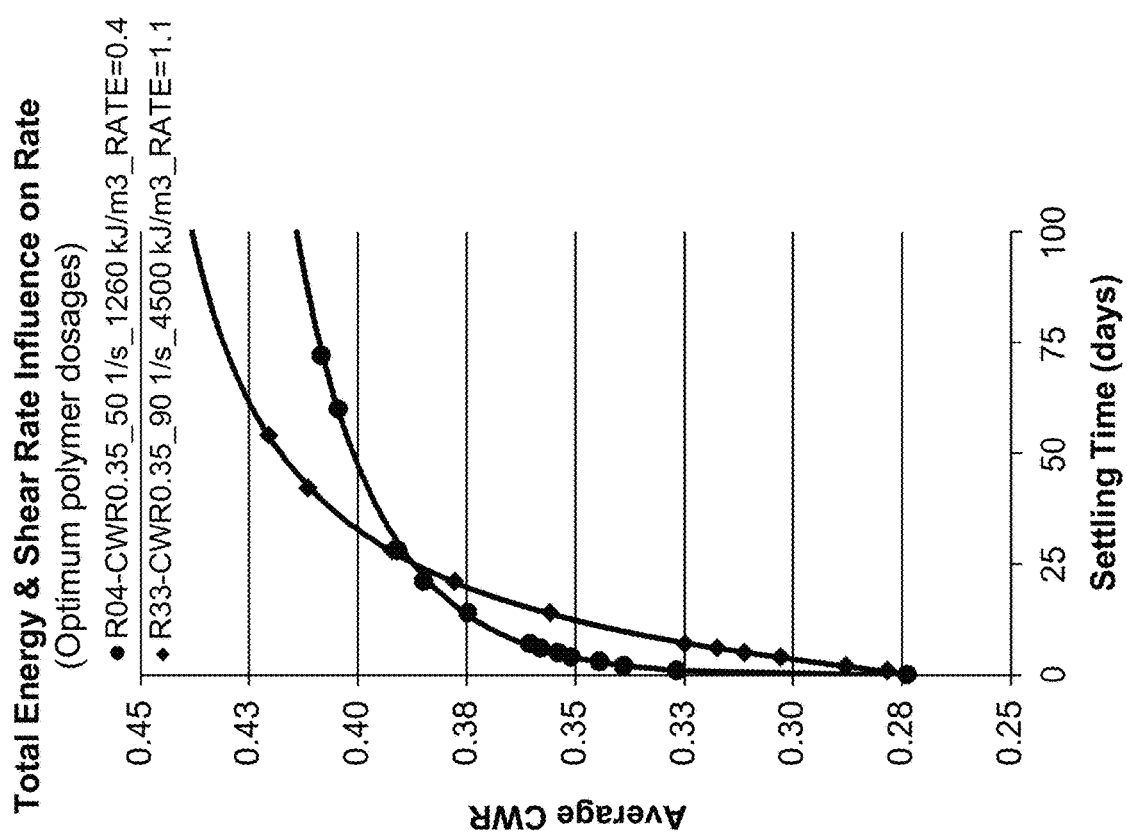
FIG. 38 is a graph of CWR versus settling time for two total energy, two shear rates and two Rates.

Referring to FIGS. 36 to 38, it has been found that major variables influencing initial settlement rate include polymer dosage, feed CWR, total energy and shear rate. More precisely, the settlement rate increases as polymer dosage increases (larger floc sizes with more polymer). Initial settlement rate decreases as feed CWR increases, which can likely be a consequence of better flocculation efficiency at lower CWR. Furthermore, initial settlement rate decreases as total energy and shear rate increase. Total energy can be seen as a combination of shear rate, shear time and coagulated/flocculated MFT (cfMFT) rheology. Both parameters contribute to smaller aggregate floc sizes.

Time to Reach 50% of the Total Strain (T$_{50}$)

Figure 39:
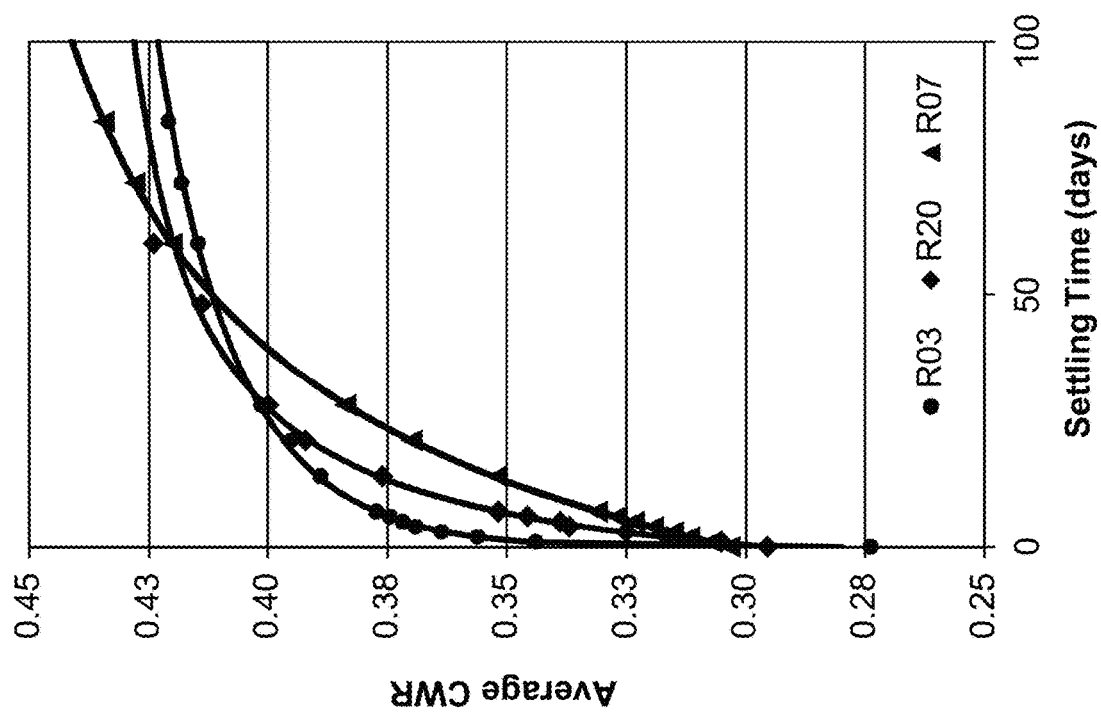
FIG. 39 is a graph of CWR versus settling time for three polymer dosage and three $T_{50}$.

Major variables influencing the time to reach 50% of the total strain (T50) include polymer dosage, feed CWR and total stress. More precisely, referring to FIG. 39, experimentations showed that T$_{50}$ increases as polymer dosage, which is correlated to the rapid initial settlement rate with increasing polymer dosage. In addition, T$_{50}$ increases as feed CWR increases, which is correlated to the slower initial settlement rate observed with increasing feed CWR. T$_{50}$ also increases as total stress increases, as greater self weight translates to a more prolonged strain. Experimentation parameters and results are reproduced below in Table E.

TABLE E

|  | Column ID | | |
|---|---|---|---|
|  | R03 | R20 | R07 |
| Feed CWR | 0.35 | 0.35 | 0.35 |
| Height (cm) | 55 | 46* | 55 |
| cfMFT Shear rate (1/s) | 13 | 12 | 12 |
| cfMFT Shear time (min) | 56 | 56 | 61 |
| Total Energy (kJ/m$^3$) | 377 | 329 | 413 |
| Polymer g/T clay | 3200 | 2000 | 1600 |
| CWR$_\infty$ | 0.51 | 0.44 | 0.49 |
| Rate | 0.3 | 1.0 | 1.1 |
| T$_{50}$ (days) | 14 | 11 | 35 |
| CWR$_{t=300\ days}$ | 0.44 | 0.44 | 0.47 |

Floc Size

Figure 40:
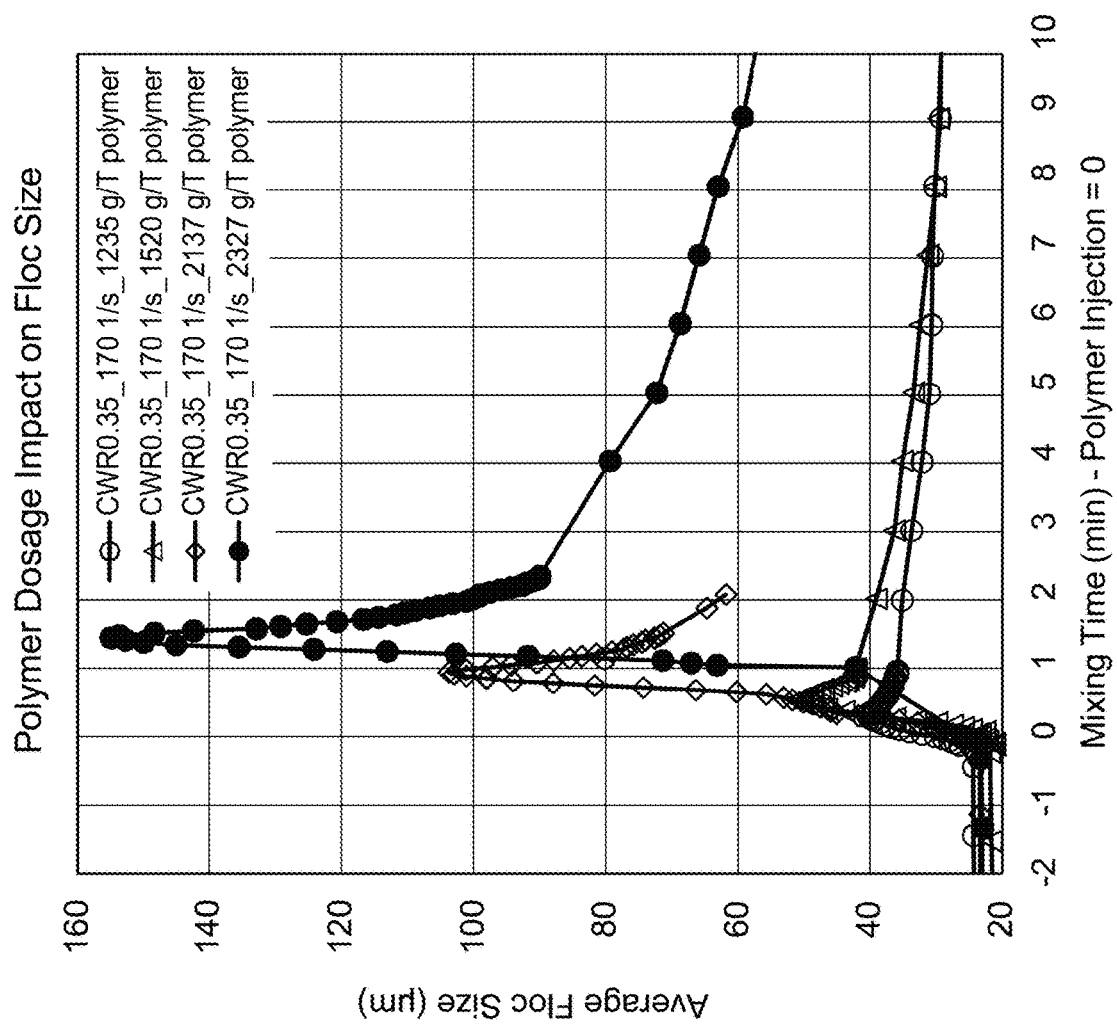
FIG. 40 is a graph of average floc size versus mixing time (before, during and after polymer injection) for four polymer dosage.
Figure 41:
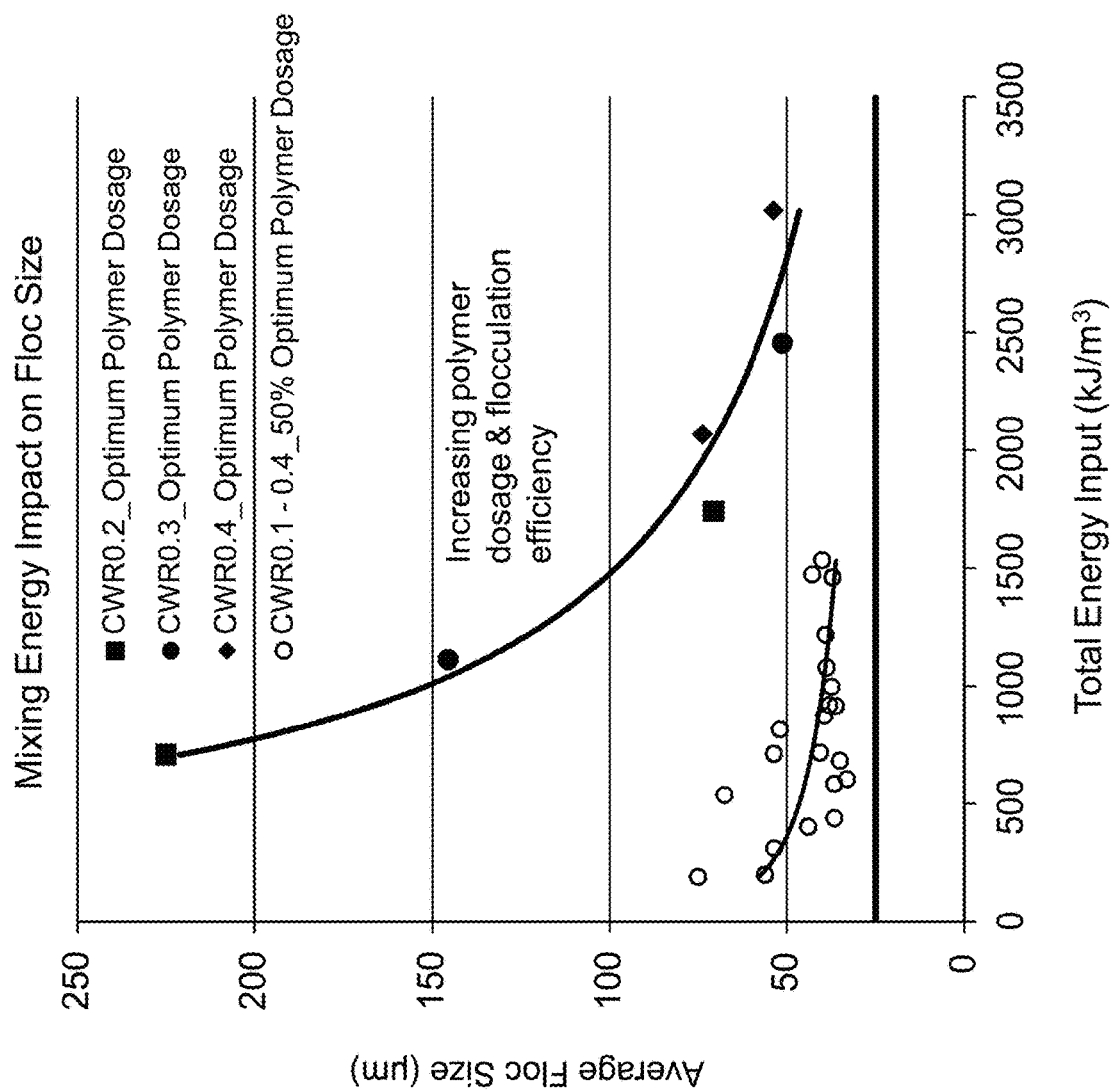
FIG. 41 is a graph of average floc size versus total energy for four feed CWR.

The average floc size is expected to drive the "initial settlement or deformation rate". Referring to FIGS. 40 and 41, major variables influencing the floc size are both the polymer dosage and the total energy (or mixing energy) similarly to the initial settlement rate. Unlike the initial settlement rate which is sensitive to the feed CWR, the small negative impact of higher CWR can likely be due to lower flocculation efficiency at higher CWR in the laboratory test.

Further tests showed that coagulation seems to promote greater resistance to floc attrition, so positive correlation of immobilization chemical dosage to floc size is not unexpected.

Shear

Figure 44:
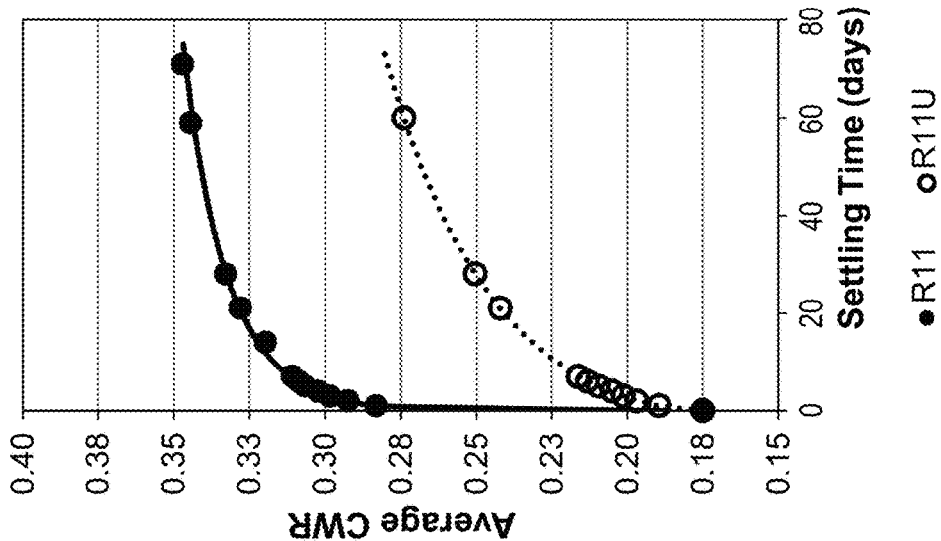
FIG. 44 is a graph of CWR versus settling time for two Rates at 950 ppm alum and 2800 g/T polymer.
Figure 43:
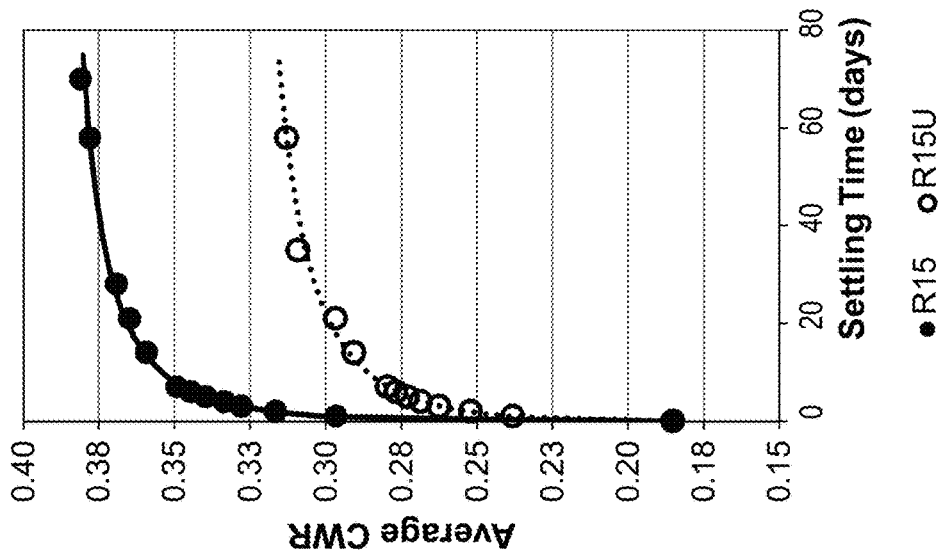
FIG. 43 is a graph of CWR versus settling time for two Rates at 950 ppm alum and 1400 g/T polymer.
Figure 42:
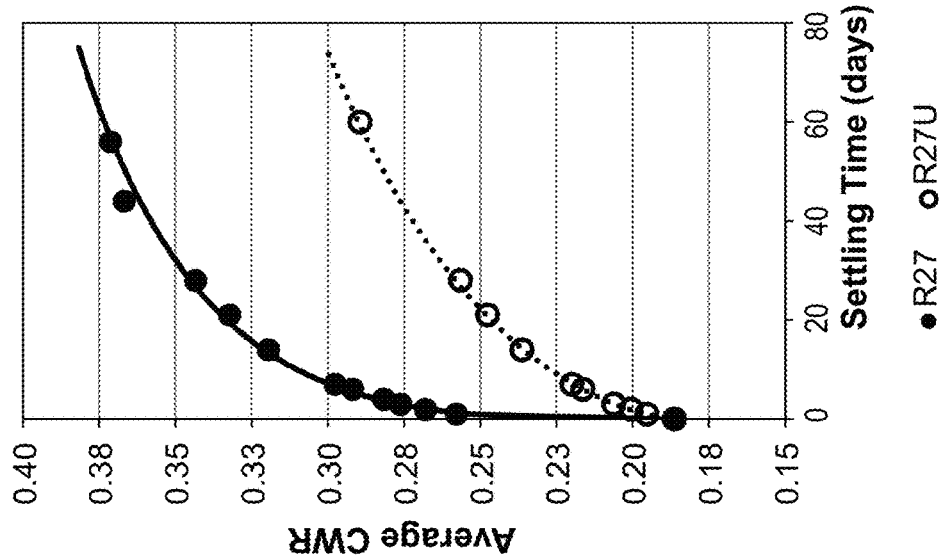
FIG. 42 is a graph of CWR versus settling time for two Rates at 0 ppm alum and 1300 g/T polymer.

Experimentation parameters and results are reproduced below in Table F, and the corresponding average CWR showed on FIGS. 42 to 44. Figures show that for similar column heights (or self-weight), a higher final CWR is achieved with increasing shear of the coagulated and flocculated MFT and lower immobilization chemical dosage.

TABLE F

| Column ID | R27 | R27U | R15 | R15U | R11 | R11U |
|---|---|---|---|---|---|---|
| Rate | 0.35 | 0.66 | 0.55 | 0.57 | 0.24 | 0.61 |
| T$_{50}$ (days) | 145 | 180 | 1 | 3 | 5 | 74 |
| CWR$_\infty$ | 0.63 | 0.51 | 0.40 | 0.34 | 0.44 | 0.39 |
| Polymer g/T clay | 1300 | 1300 | 1400 | 1400 | 2800 | 2800 |
| Alum Ppm | 0 | 0 | 950 | 950 | 950 | 950 |

Figure 45:
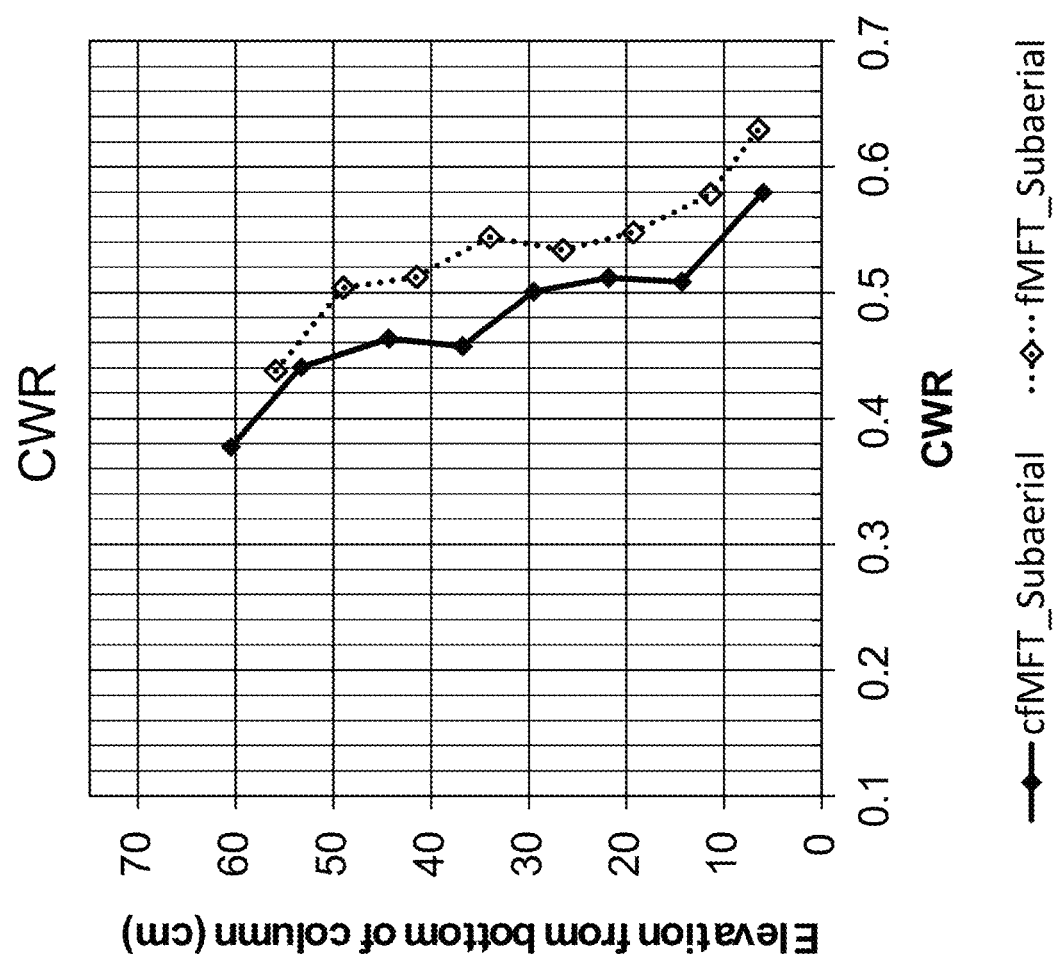
FIG. 45 is a graph of column elevation versus CWR for pre-treated and flocculated MFT and for flocculated MFT.
Figure 46:
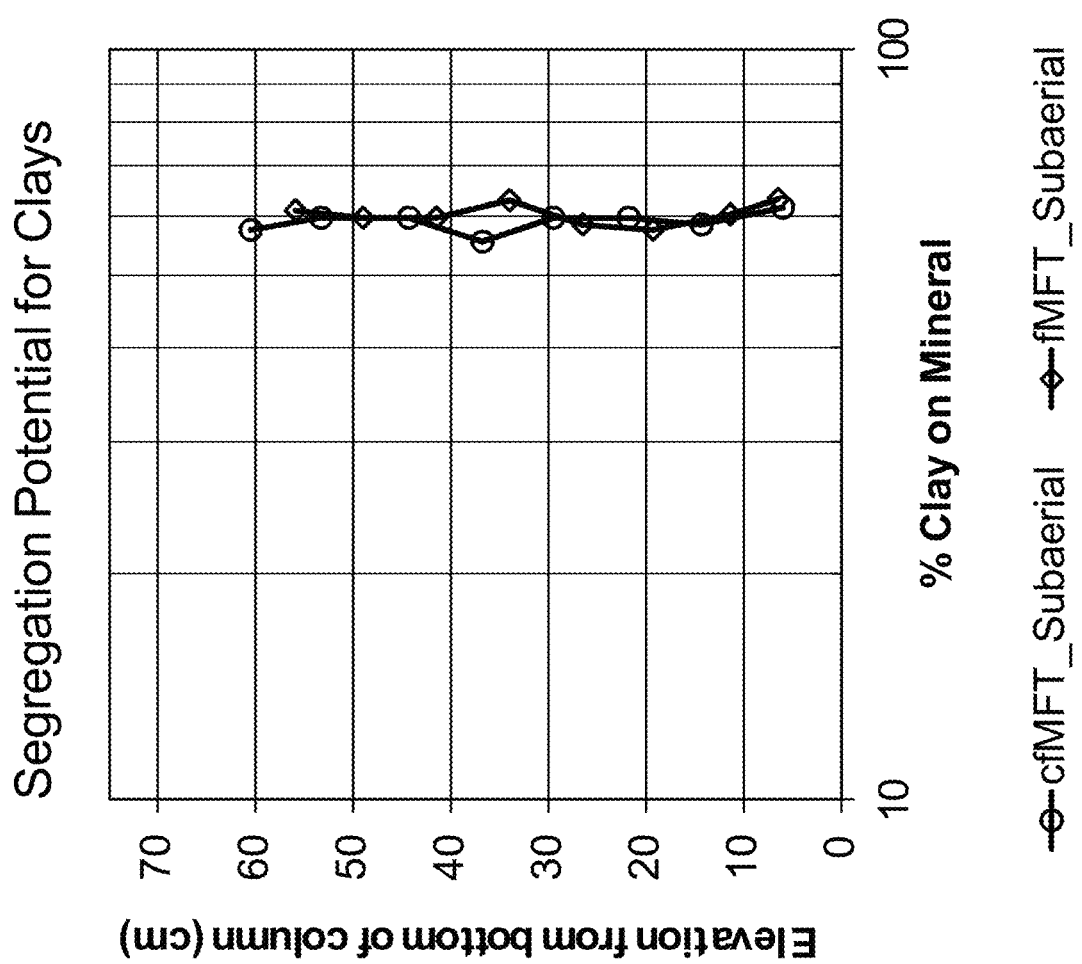
FIG. 46 is a graph of column elevation versus clay percentage on mineral for pre-treated and flocculated MFT and for flocculated MFT.

FIGS. 45 and 46 show the column profile after 3 months of settling at minimal shear from the bottom to the top of the column, for coagulated and flocculated MFT and for flocculated MFT. The average CWR seem to be more impacted by the coagulation than the segregation potential for clays.

The invention claimed is:

1. A process for treating mature fine tailings (MFT) derived from oil sands extraction and including contaminants of concern (CoCs) comprising bitumen, naphthenic acid, arsenic and selenium, the process comprising:
   retrieving MFT from a tailings pond;
   providing an in-line flow of the MFT;
   adding in-line an aqueous immobilization solution into the in-line flow of MFT and in-line mixing therewith, the aqueous immobilization solution comprising an immobilization chemical selected from multivalent inorganic salts, thereby producing a pre-treated tailings flow comprising:
      immobilized bitumen-clay complexes comprising multivalent cations forming cation bridges between negatively charged bitumen droplets and negatively charged clay particles;
      insolubilized naphthenic acid;
      insolubilized arsenic; and
      insolubilized selenium;
   adding in-line an aqueous flocculant solution into the pre-treated tailings flow to form a flocculating material;
   in-line conditioning of the flocculating material to produce a flocculated material in a water release zone;
   depositing the flocculated material onto a sub-aerial deposition area, allowing release water to separate from a solids-enriched material;
   forming a permanent aquatic storage structure (PASS) for retaining the solids-enriched material and a water cap, wherein the solids-enriched material:
      forms a consolidating solids-rich lower stratum below the water cap; and
      retains the immobilized bitumen-clay complexes, the insolubilized naphthenic acid, the insolubilized arsenic and the insolubilized selenium to inhibit migration of the CoCs into the water cap.

2. The process of claim 1, wherein the aqueous immobilization solution is neutral or acidic.

3. The process of claim 1, wherein the immobilization chemical is fully dissolved in the immobilization solution prior to the in-line addition into the in-line flow of MFT.

4. The process of claim 1, wherein the immobilization chemical comprises a divalent cation or a trivalent cation.

5. The process of claim 1, wherein the in-line addition and the in-line mixing of the immobilization chemical into the MFT are performed at concentration and mixing intensity to inhibit aggregation of multivalent cation hydroxides and promote charge neutralization between the negatively charged bitumen droplets and the negatively charged clay particles.

6. The process of claim 1, wherein the aqueous flocculant solution comprises an anionic polymer flocculant.

7. The process of claim 6, wherein the anionic polymer flocculant comprises a sodium-based or a calcium-based polyacrylamide-polyacrylate co-polymer.

8. The process of claim 6, wherein the anionic polymer flocculant is fully dissolved in the aqueous flocculant solution prior to addition to the pre-treated tailings flow.

9. The process of claim 1, wherein in-line conditioning of the flocculating material consists of pipeline shearing that is managed to increase a yield strength of the flocculating material to a maximum, and then decrease the yield strength to achieve the water release zone while avoiding overshearing.

10. The process of claim 1, wherein the immobilization chemical comprises or consists of gypsum, alum, ferric sulphate or a combination thereof.

11. The process of claim 1, wherein the immobilization chemical comprises an aluminum cation or a calcium cation.

12. The process of claim 1, wherein the immobilization chemical comprises a sulphate anion.

13. The process of claim 1, wherein the immobilization chemical is added in a concentration below water saturation thereof.

14. The process of claim 1, wherein the immobilization chemical is selected, formulated and/or added in a concentration so as to immobilize substantially all of the bitumen, naphthenic acid, arsenic and selenium present in the MFT.

15. The process of claim 1, wherein the immobilization chemical is selected, formulated and/or added in a concentration so as to avoid increasing flocculant dosage more than 20% or more than 10% to achieve a same clay-to-water ratio (CWR) as an equivalent process excluding addition of an immobilization chemical.

16. The process of claim 1, further comprising providing an intermediate layer of coke in between the water cap and the solids-rich lower stratum.

17. The process of claim 1, further comprising managing the PASS to render the water cap suitable to supporting aquatic life.

18. The process of claim 17, wherein the managing includes supplying fresh water into the water cap.

19. The process of claim 17, wherein the managing comprises construction and maintenance of reclamation landforms.

20. The process of claim 19, wherein the reclamation landforms comprise shorelines, littoral zones, water inlets and water outlets.

21. The process of claim 17, wherein the managing comprises monitoring composition of the water cap.

22. The process of claim 17, wherein the managing comprises controlling water levels of the water cap.

23. The process of claim 1, wherein the deposited solids-enriched material remains in-place after deposition and forms the consolidating solids-rich lower stratum of the PASS.

24. The process of claim 1, wherein the deposited solids-enriched material is not relocated after deposition.

25. A process for treating thick fine tailings that includes contaminants of concern (CoCs) and suspended solids, the process comprising:
    subjecting the thick fine tailings to chemical immobilization and polymeric flocculation to chemically immobilize the CoCs and polymerically flocculate the suspended solids, to produce treated thick fine tailings;
    dewatering the treated thick fine tailings to produce:
        an aqueous component depleted in the CoCs and the suspended solids; and
        a solids-enriched component comprising the chemically immobilized CoCs and the flocculated solids; and
    forming a permanent aquatic storage structure (PASS) for retaining the solids-enriched component, the PASS comprising:
        a water cap; and
        a consolidating solids-rich lower stratum below the water cap and inhibiting migration of the CoCs into the water cap.

26. The process of claim 25, wherein subjecting the thick fine tailings to chemical immobilization and polymeric flocculation comprises:
    subjecting the thick fine tailings to the chemical immobilization to immobilize the CoCs and produce a pre-treated tailings material; and
    subjecting the pre-treated tailings material to the polymeric flocculation to flocculate the suspended solids and produce a flocculated tailings material.

27. The process of claim 25, wherein subjecting the thick fine tailings to chemical immobilization and polymeric flocculation comprises:
    adding an immobilization chemical to the thick fine tailings to produce a pre-treated tailings; and
    adding a flocculant into the pre-treated tailings to form a flocculating material.

28. The process of claim 27, wherein the immobilization chemical and the flocculant are added in-line.

29. The process of claim 27, wherein the immobilization chemical is added as part of an aqueous immobilization solution, and the flocculant is added as part of an aqueous flocculant solution.

30. The process of claim 25, wherein the chemical immobilization includes insolubilization of dissolved or soluble CoCs, forming cation bridges between negatively charged CoCs and negatively charged mineral particles, or a combination thereof.

31. The process of claim 25, wherein the dewatering comprises depositing the treated thick fine tailings into a pit.

32. The process of claim 31, wherein the pit is a mine pit.

33. The process of claim 25, wherein the thick fine tailings comprise mature fine tailings derived from oil sands extraction.

34. A process for treating fine tailings that includes contaminants of concern (CoCs) that are water mobile and suspended solids, the process comprising:
    adding an immobilization chemical to the fine tailings to react with the CoCs and enable immobilization of the same;
    adding a flocculant to flocculate the suspended solids;
    producing a treated tailings material;

dewatering the treated tailings material to produce:
a water component; and
a solids-enriched component comprising:
the CoCs rendered water immobile; and
flocculated solids; and
forming a permanent aquatic storage structure (PASS) for retaining the solids-enriched component, the PASS comprising:
a water cap; and
a consolidating solids-rich lower stratum below the water cap and inhibiting migration of the CoCs into the water cap.

35. The process of claim 34, wherein the immobilization chemical comprises a divalent cation and/or a trivalent cation.

36. The process of claim 34, wherein the flocculant comprises an anionic polymer flocculant.

37. The process of claim 36, wherein the anionic polymer flocculant comprises a sodium-based or calcium-based polyacrylamide-polyacrylate co-polymer.

38. The process of claim 34, wherein the immobilization chemical comprises gypsum, alum, ferric sulphate or a combination thereof.

39. The process of claim 34, wherein the immobilization chemical and the flocculant are each added in-line.

40. The process of claim 34, wherein the immobilization chemical and the flocculant are each added dissolved in a corresponding aqueous solution.

41. The process of claim 34, wherein the immobilization chemical is selected to immobilize at least one of:
bitumen by cation bridging with suspended clays;
naphthenic acids;
arsenic; and
selenium.

42. The process of claim 34, wherein the dewatering comprises:
continuously discharging the treated tailings material into a pit to allow an initial water release from the solids-enriched component; and
compressing the solids-enriched component below subsequently deposited treated tailings and/or the water cap.

43. The process of claim 42, wherein the initial water release results in an initial clay-to-water ratio (CWR) in the solids-enriched component of at least 0.55 or at least 0.65.

44. The process of claim 42, wherein the treated tailings material is discharged so that the initial water release results in an initial clay-to-water ratio (CWR) in the solids-enriched component of at least 1.

45. The process of claim 34, further comprising managing the PASS to render the water cap suitable to supporting aquatic life.

46. The process of claim 45, wherein the managing includes supplying fresh water into the water cap; construction and maintenance of reclamation landforms; monitoring composition of the water cap; and/or controlling water levels of the water cap.

47. The process of claim 34, wherein the solids-enriched component remains in-place and forms the consolidating solids-rich lower stratum of the PASS.

48. The process of claim 34, wherein the PASS is contained in a mine pit.

49. The process of claim 34, wherein the treated tailings material is discharged to avoid overshearing flocs in the treated tailings material.

50. The process of claim 34, wherein the fine tailings comprise thick fine tailings, and the thick fine tailings comprise mature fine tailings derived from oil sands extraction.

51. The process of claim 34, wherein the addition of the immobilization chemical forms a pre-treated material, and the process comprises:
subjecting the pre-treated material to pipeline shear conditioning to form a conditioned pre-treated material, the pipeline shear conditioning being provided such that the conditioned pre-treated material has target rheological characteristics; and the flocculant being added to the conditioned pre-treated material to produce the treated tailings material.

52. The process of claim 51, wherein the pipeline shear conditioning is performed to modify a yield stress of the pre-treated material from an initial yield stress up to an upper crest yield stress, and then down to a lower yield stress that is in between the initial yield stress and the upper crest yield stress, such that the conditioned pre-treated material has the lower yield stress.

53. The process of claim 52, wherein the pipeline shear conditioning is performed so that the lower yield stress represents a reduction in the yield stress of about 30% to 80% from the upper crest yield stress.

54. The process of claim 52, wherein the pipeline shear conditioning is performed so that at least one of the following is met:
the lower yield stress is at least about 25 Pa lower than the upper crest yield stress;
the lower yield stress is between about 10 Pa and about 15 Pa; and
the lower yield stress is on a flat plateau of yield stress versus time.

55. The process of claim 51, wherein the pipeline shear conditioning is performed to:
produce a gel-state pre-treated material having increased yield stress; and then produce the conditioned pre-treated material having an ungelled state and a decreased yield stress compared to the gel-state pre-treated material.

56. The process of claim 51, wherein the pipeline shear conditioning is performed such that the conditioned pre-treated material has a turbulent flow regime upon addition of the flocculant thereto.

57. The process of claim 51, wherein adding the immobilization chemical to the fine tailings is performed in-line via a pipe junction; the immobilization chemical and the fine tailings are supplied through a static mixer to form the pre-treated material; and the pre-treated material is supplied through a conditioning pipeline in order to impart all of the pipeline shear conditioning to the pre-treated material prior to addition of the flocculant.

58. The process of claim 51, wherein the immobilization chemical comprises alum, gypsum, or ferric sulphate.

59. The process of claim 51, wherein the pipeline shear conditioning is controlled according to shear intensity, shear duration and/or total shear energy imparted to the pre-treated material.

60. The process of claim 51, wherein the immobilization chemical is added via an acidic solution having an initial tailing pH to form the pre-treated material having a reduced pH; and wherein the pipeline shear conditioning is provided such that the conditioned pre-treated material has at least a target pH that is greater than the reduced pH.

61. The process of claim 60, wherein the pipeline shear conditioning is performed such that the target pH is at least 7.5 or at least 8.

62. The process of claim 60, wherein the pipeline shear conditioning is performed such that the target pH is at least 15% above a lowest pH obtained for the pre-treated material after addition of the acidic solution; or such that the target pH is at least 25% above the lowest pH obtained for the pre-treated material after addition of the acidic solution.

63. The process of claim 60, wherein the pipeline shear conditioning is performed such that the target pH within 10% of the initial tailings pH.

64. The process of claim 60, wherein the pipeline shear conditioning is performed to achieve the target pH that is based on optimal activity of the flocculant.

65. The process of claim 60, wherein the acidic solution comprises sulphuric acid.

66. The process of claim 60, wherein the immobilization chemical is completely dissolved in the acidic solution prior to addition to the fine tailings.

67. The process of claim 60, wherein adding the acidic solution to the fine tailings is performed in-line via a pipe junction; the immobilization chemical and the fine tailings are supplied through a static mixer to form the pre-treated material; the pre-treated material is supplied through a conditioning pipeline in order to impart all of the pipeline shear conditioning to the pre-treated material prior to addition of the flocculant.

68. The process of claim 51, comprising supplying the immobilization chemical and the fine tailings to a mixer to form the pre-treated material, wherein immobilization chemical dosage is determined based on the mixer and density characteristics of the fine tailings.

69. The process of claim 68, wherein the immobilization chemical is added to the fine tailings via a pipe junction and the mixer is a static mixer located downstream and proximate to the pipe junction.

70. The process of claim 69, wherein the pipe junction is a T junction.

71. The process of claim 68, wherein the density characteristics of the fine tailings are measured on-line prior to adding the immobilization chemical, and on-line density measurements are used to control the immobilization chemical dosage.

72. A process for treating mature fine tailings (MFT) derived from oil sands extraction and including constituents of concern (CoCs) comprising bitumen, naphthenic acid, arsenic and selenium, the process comprising:
 retrieving MFT from a tailings pond;
 providing an in-line flow of the MFT;
 adding in-line an aqueous immobilization solution into the in-line flow of MFT, the aqueous immobilization solution comprising an immobilization chemical comprising ferric sulphate, and in-line mixing thereof with the MFT, thereby producing a pre-treated tailings flow comprising:
  immobilized bitumen-clay complexes comprising ferric cations forming cation bridges between negatively charged bitumen droplets and negatively charged clay particles;
  insolubilized naphthenic acid;
  insolubilized arsenic; and
  insolubilized selenium;
 adding in-line an aqueous flocculant solution into the pre-treated tailings flow to form a flocculating material;
 in-line conditioning of the flocculating material to produce a flocculated material in a water release zone;
 discharging the flocculated material into a pit and allowing release water to separate from a solids-enriched material;
 forming a permanent aquatic storage structure (PASS) in the pit for retaining the solids-enriched material and a water cap, the solids-enriched material:
  forming a consolidating solids-rich lower stratum below the water cap; and
  retaining the immobilized bitumen-clay complexes, the insolubilized naphthenic acid, the insolubilized arsenic and the insolubilized selenium to inhibit migration of the CoCs into the water cap.

73. A process for treating thick fine tailings that includes contaminants of concern (CoCs) and suspended solids, the process comprising:
 subjecting the thick fine tailings to polymeric flocculation to flocculate the suspended solids and produce a flocculated tailings material;
 subjecting the flocculated tailings material to chemical immobilization to immobilize the CoCs;
 dewatering the flocculated tailings material to produce:
  an aqueous component depleted in the CoCs and the suspended solids; and
  a solids-enriched component comprising the chemically immobilized CoCs and the flocculated solids; and
 forming a permanent aquatic storage structure (PASS) for retaining the solids-enriched component, the PASS comprising:
  a water cap; and
  a consolidating solids-rich lower stratum below the water cap and inhibiting migration of the CoCs into the water cap.

74. A process for treating thick fine tailings that includes contaminants of concern (CoCs) and suspended solids, the process comprising:
 simultaneously adding an immobilization chemical and a polymer flocculent into the thick fine tailings, in order to chemically immobilize the CoCs and polymerically flocculate the suspended solids;
 dewatering the thick fine tailings to which the immobilization chemical and the polymer flocculant were added to produce:
  an aqueous component depleted in the CoCs and the suspended solids; and
  a solids-enriched component comprising the chemically immobilized CoCs and the flocculated solids; and
 forming a permanent aquatic storage structure (PASS) for retaining the solids-enriched component, the PASS comprising:
  a water cap; and
  a consolidating solids-rich lower stratum below the water cap and inhibiting migration of the CoCs into the water cap.

75. A process for treating thick fine tailings that includes contaminants of concern (CoCs) and suspended solids, the process comprising:
 adding a polymeric compound to the thick fine tailings, the polymeric compound comprising multivalent cation groups and organic polymeric groups, the multivalent cation groups effecting chemical immobilization of the CoCs and the organic polymeric groups effecting the polymeric flocculation of the suspended solids;
 dewatering the thick fine tailings to which the polymeric compound was added to produce:

an aqueous component depleted in the CoCs and the suspended solids; and a solids-enriched component comprising the chemically immobilized CoCs and the flocculated solids; and forming a permanent aquatic storage structure (PASS) for retaining the solids-enriched component, the PASS comprising:

a water cap; and a consolidating solids-rich lower stratum below the water cap and inhibiting migration of the CoCs into the water cap.

* * * * *